(12) United States Patent
Tokunaka et al.

(10) Patent No.: US 8,782,523 B2
(45) Date of Patent: Jul. 15, 2014

(54) UNIT VIDEO REPRESENTING DEVICE, EDITING CONSOLE, EDITING SYSTEM, AND ANIMATION EDITING METHOD

(75) Inventors: Junzo Tokunaka, Kanagawa (JP); Kotaro Kashiwa, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1221 days.

(21) Appl. No.: 12/246,624

(22) Filed: Oct. 7, 2008

(65) Prior Publication Data
US 2009/0136200 A1 May 28, 2009

(30) Foreign Application Priority Data
Nov. 22, 2007 (JP) ................. 2007-303050

(51) Int. Cl.
*G06F 13/00* (2006.01)
*G06F 15/00* (2006.01)
(52) U.S. Cl.
USPC .......................................... 715/723; 715/719
(58) Field of Classification Search
USPC ......... 715/700, 713–715, 725–734, 716, 719, 715/720, 723, 737, 738; 345/723, 619
See application file for complete search history.

(56) References Cited

U.S. PATENT DOCUMENTS

| | | | |
|---|---|---|---|
| 5,930,446 A | 7/1999 | Kanda | |
| 8,095,294 B1 * | 1/2012 | Griffiths et al. | 701/103 |
| 8,095,394 B2 * | 1/2012 | Nowak et al. | 705/4 |
| 2002/0154158 A1 * | 10/2002 | Fukuda et al. | 345/723 |
| 2012/0079075 A1 * | 3/2012 | Glenn | 709/218 |

FOREIGN PATENT DOCUMENTS

| | | |
|---|---|---|
| JP | 6-295566 | 10/1994 |
| JP | 11-339059 | 12/1999 |
| JP | 11-341253 | 12/1999 |
| JP | 11-341348 | 12/1999 |
| JP | 2002-262151 | 9/2002 |
| JP | 2005-7862 | 1/2005 |
| WO | WO96/32722 | 10/1996 |

* cited by examiner

*Primary Examiner* — Cao "Kevin" Nguyen
(74) *Attorney, Agent, or Firm* — Oblon, Spivak, McClelland, Maier & Neustadt, L.L.P.

(57) ABSTRACT

A unit video representing device, which includes an input section inputting unit video information being information about unit video as an animation, a display section, a control section causing the display section to execute display representing contents of the unit video, on the basis of the unit video information inputted by the input section, and a self information notifying section capable of causing an external editing console to recognize self information when the self unit video representing device is placed on the editing console.

15 Claims, 49 Drawing Sheets

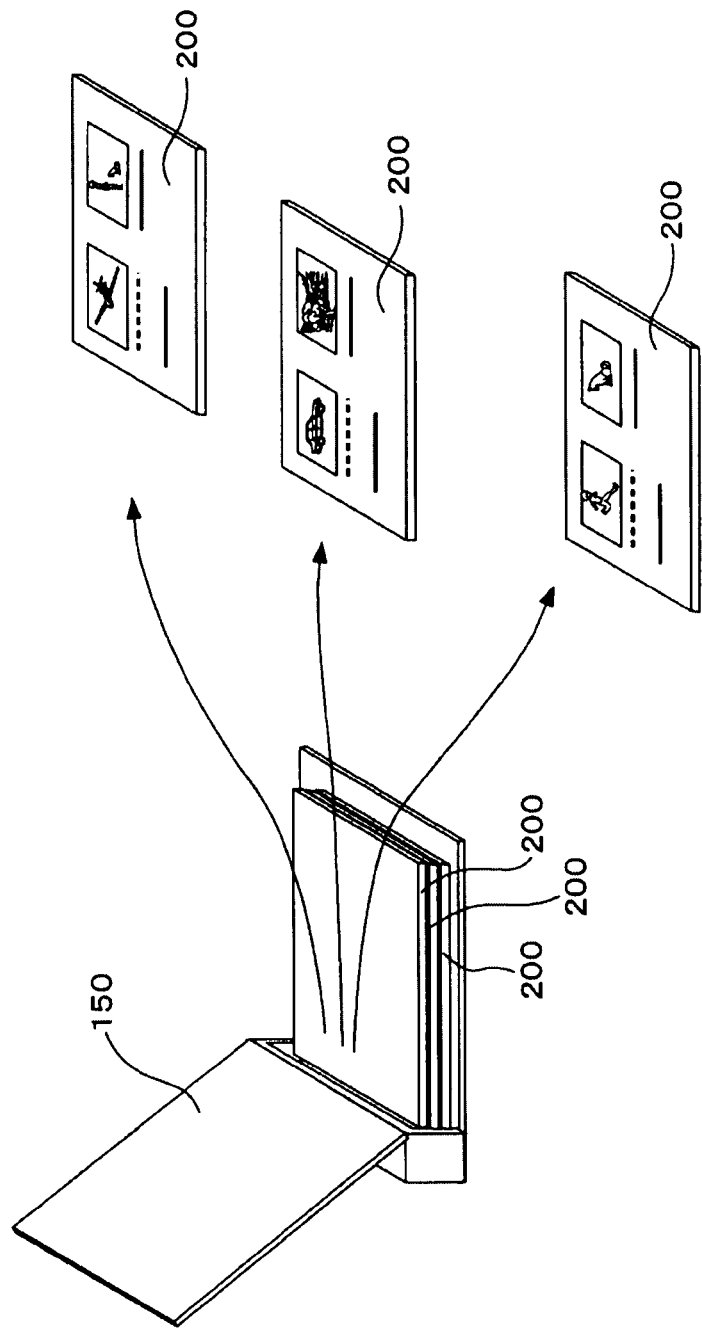

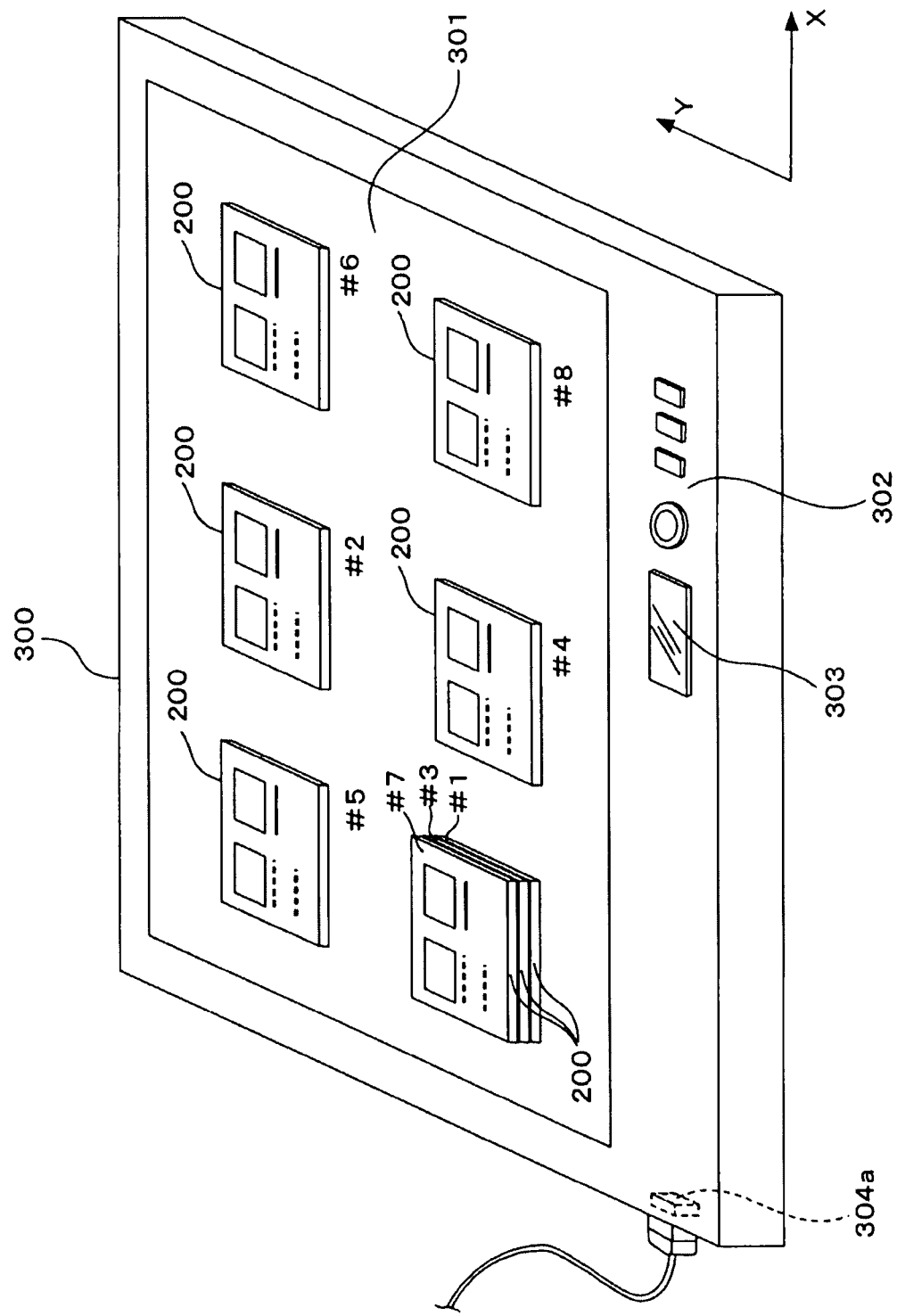

FIG. 5A
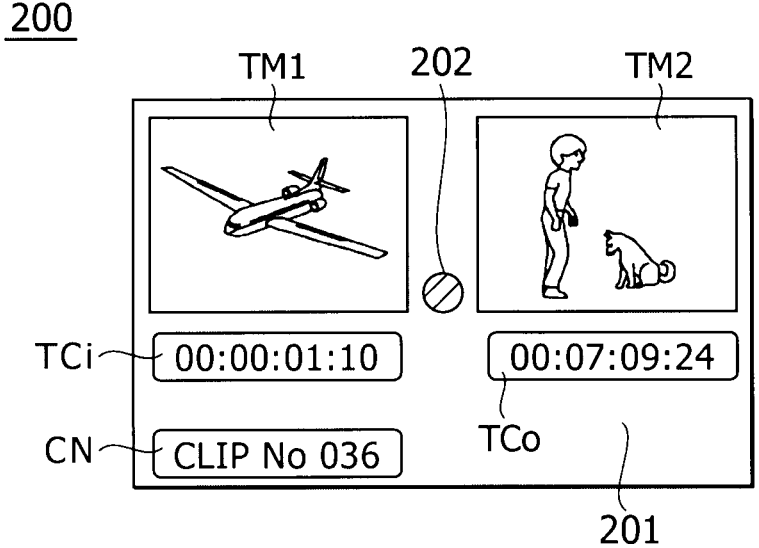
FIG. 5B
FIG. 5E    FIG. 5C
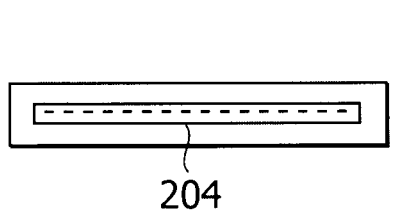 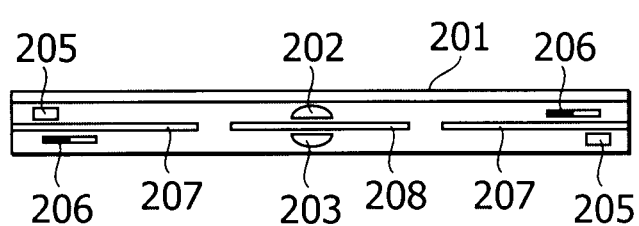
FIG. 5D
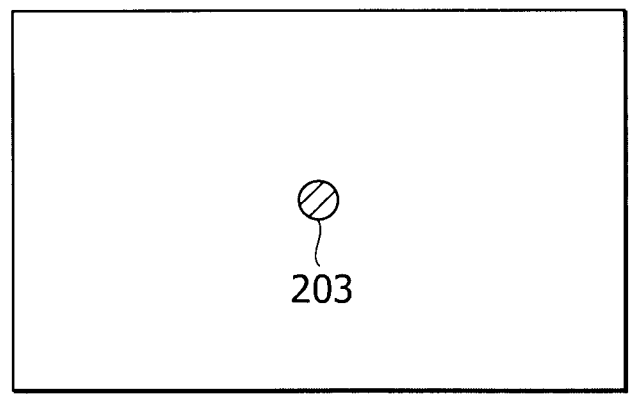

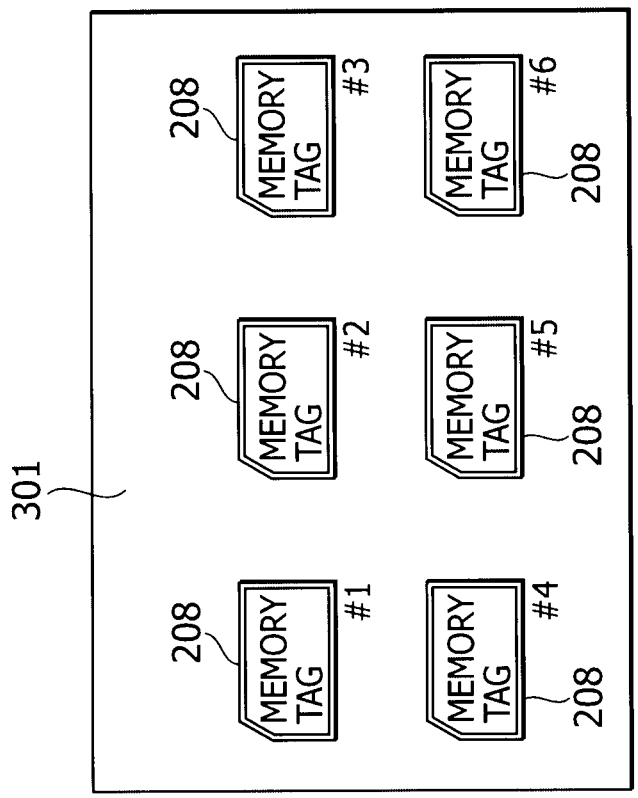
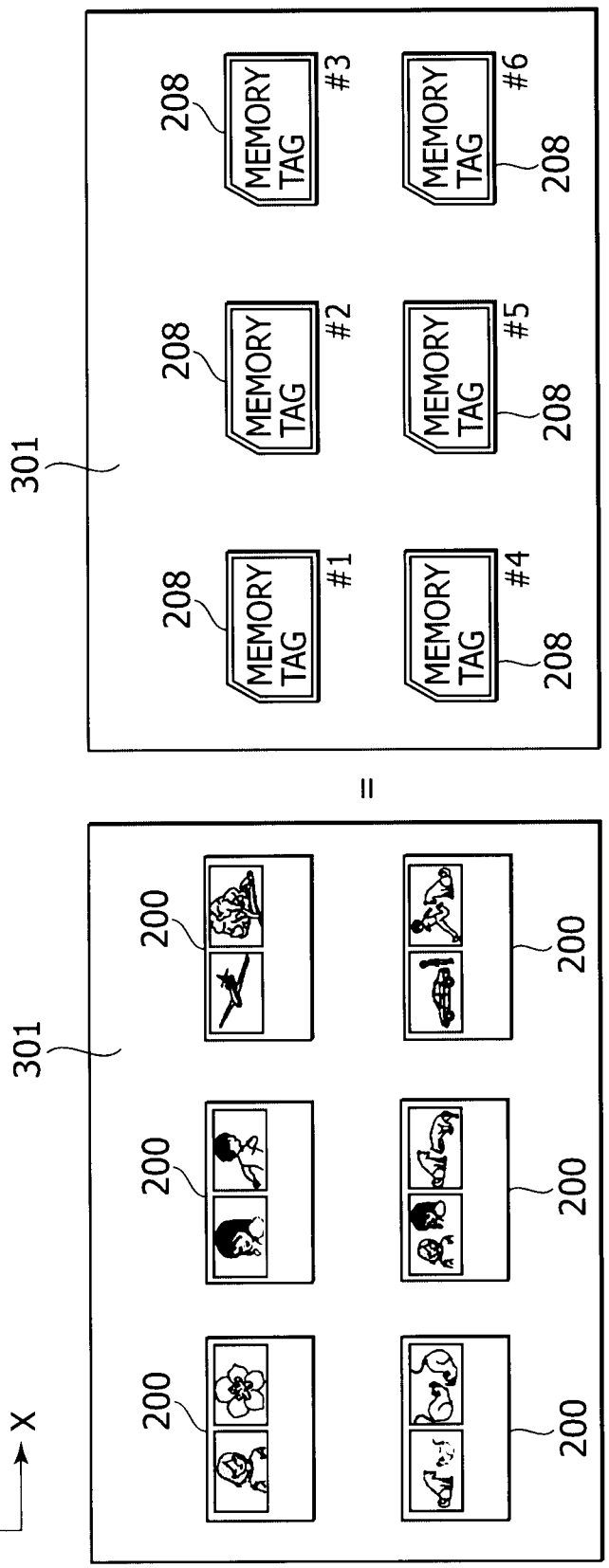

FIG. 16A
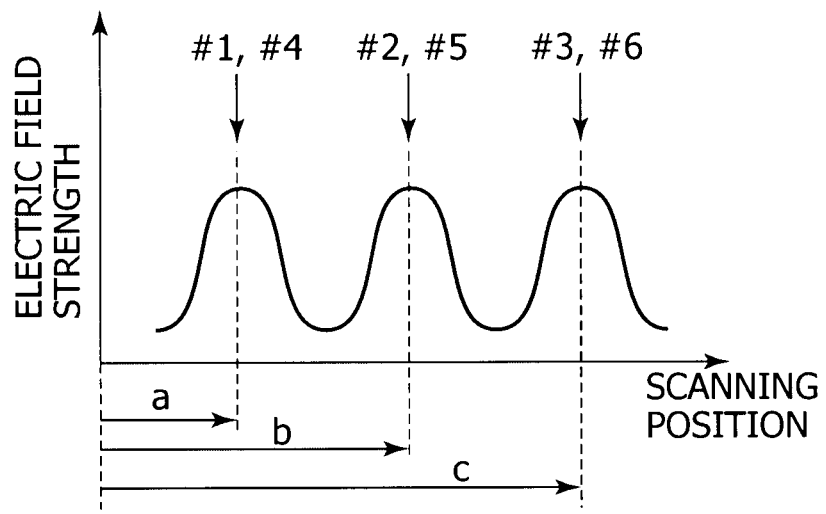
FIG. 16B
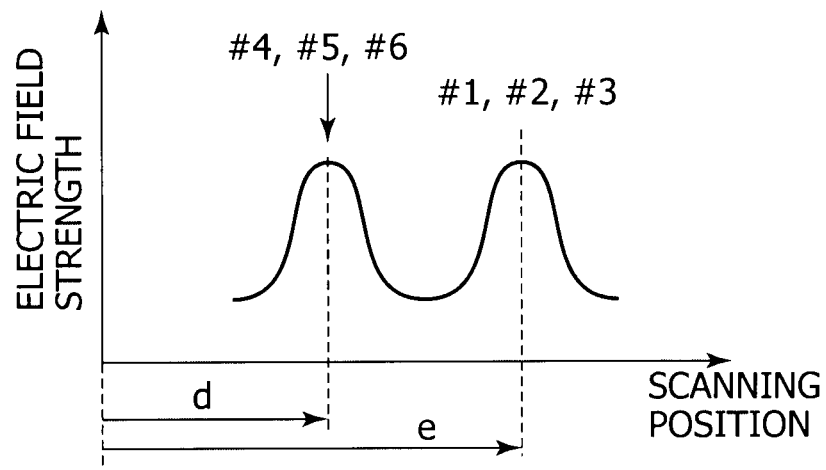
FIG. 16C
| ID | XY COORDINATES |
|---|---|
| #1 | (a, e) |
| #2 | (b, e) |
| #3 | (c, e) |
| #4 | (a, d) |
| #5 | (b, d) |
| #6 | (c, d) |

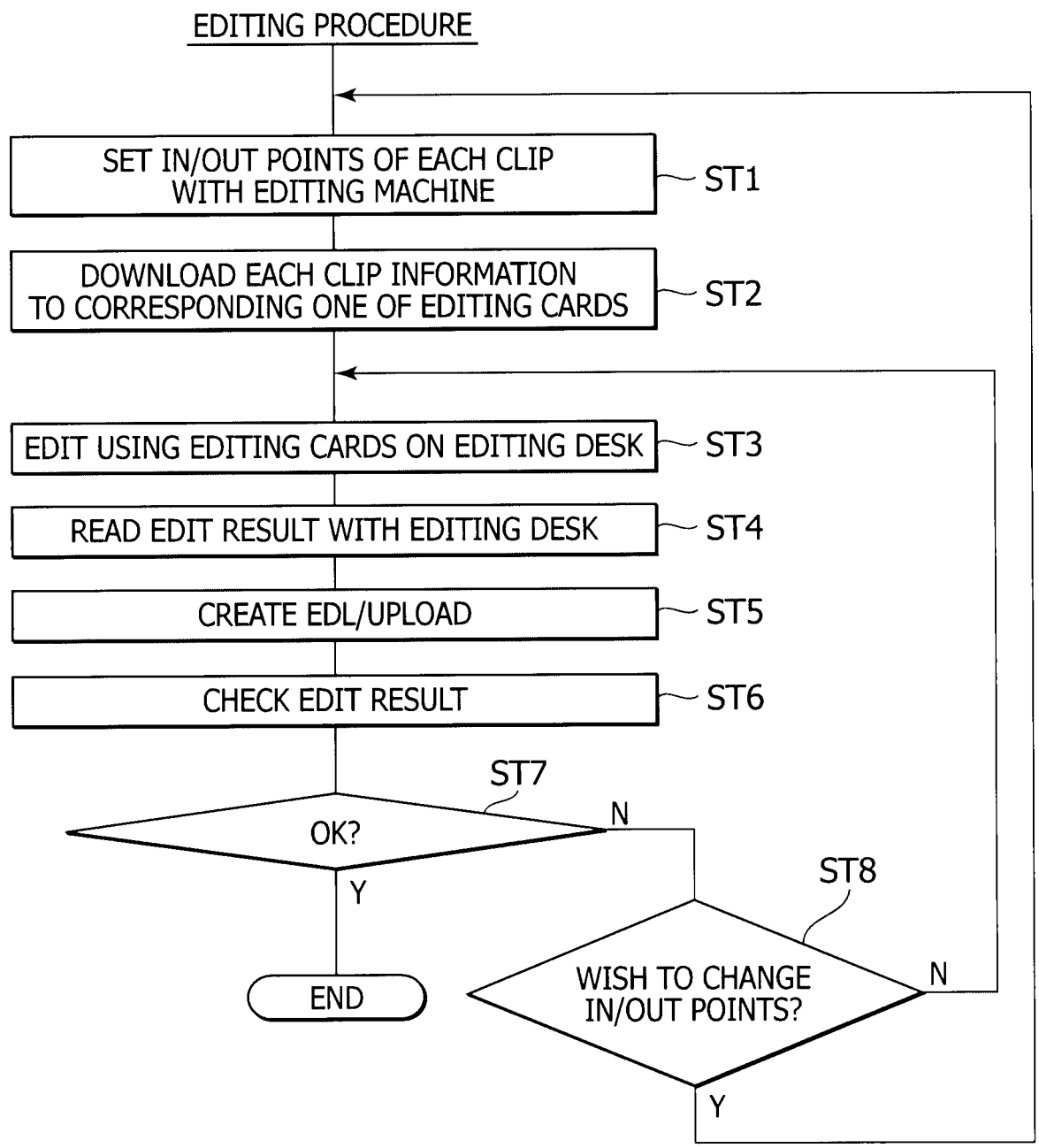

FIG. 26

| DOWNLOAD CLIP | CRAD ID |
|---|---|
| CL1 | #1 |
| CL2 | #2 |
| CL3 | #3 |
| CL4 | #4 |
| CL5 | #5 |
| CL6 | #6 |
| CL7 | #7 |
| CL8 | #8 |
| - | #9 |
| - | #10 |

UNIT VIDEO REPRESENTING DEVICE, EDITING CONSOLE, EDITING SYSTEM, AND ANIMATION EDITING METHOD

BACKGROUND OF THE INVENTION

1. Field of the Invention

The present invention relates to an editing system and an animation editing method for producing animated content by joining unit video as an animations one item after another, and to a unit video representing device and an editing console both constituting the editing system.

2. Description of Related Art

See, e.g., Japanese Patent Application Publications Nos. JP H11-339059 (Patent Reference 1), JP H11-341253 (Patent Reference 2), JP H11-341348 (Patent Reference 3), and International Publication pamphlet No. 96/32722 (Patent Reference 4))

Various animated video editing equipment has been provided for industrial, commercial, and other applications. Particularly in recent years, efficient animation editing with a higher degree of freedom has been realized by a so-called nonlinear editor that uses a dedicated equipment or general-purpose personal computer.

SUMMARY OF THE INVENTION

However, the related-art animated video editing equipment has required complicated operation, thereby entailing user skill.

Furthermore, in Patent References 1, 2, 3, techniques have been disclosed in which video is printed on cards, the cards are arranged on a board, the board having the cards arranged thereon is read to edit the video, in order to simplify editing operation.

However, these techniques involve extracting to-be-used video segments from clips as animated materials, and printing images on cards in a sequence of continuous time codes. To change any to-be-used video segment, printing need be redone. In addition, longer video segments require a proportionally larger volume of printing, thereby making handling complicated, and imposing cost and time problems. Furthermore, to change IN/OUT points, paper folding and/or paper-cutting/separating operations have been performed, thereby making handling as complicated as in film editing.

Furthermore, for reading, a camera or a scanner has been used to optically capture data by arranging the printed cards planewise on the board. Accordingly, editing a full-length material has required a number of plates each having boards arranged thereon, and thus a board having a huge area would be required to compose and check the whole edit results, thereby making operation difficult.

Accordingly, it is desirable to provide a device enabling an operator to execute editing of animated video with intuitive operations and without requiring cumbersome preparations.

In one embodiment of the present invention, there is provided a unit video representing device which includes an input section inputting unit video information being information about unit video as an animation, a display section, a control section causing the display section to execute display representing contents of the unit video on the basis of the unit video information inputted by the input section, and a self information notifying section capable of causing an external editing console to recognize self information when the self unit video representing device is placed on the editing console.

Furthermore, the unit video representing device is assumed to be formed into a shape such that a plurality of unit video representing devices can be piled.

Furthermore, the unit video representing device further includes a piling position detecting section detecting, in a pile of the plurality of unit video representing devices, where the self unit video representing device is positioned; lowermost, uppermost, or in between.

Furthermore, the unit video representing device further includes a self information up-and-down communication section notifying, in the pile of the plurality of unit video representing devices, the self information to another unit video representing device in the pile. The self information up-and-down communication section is formed as an optical communication device section.

Furthermore, the self information notified to the editing console is an identification information of the self.

Alternatively, the unit video information inputted by the input section includes an identification information of the unit video as the animation, and the self information is assumed to be the identification information of the unit video inputted by the input section.

Furthermore, the self information notifying section is configured to be formed as a noncontact wireless communication device section performing noncontact wireless communication with the editing console.

Furthermore, the unit video information inputted by the input section includes information about a starting point and an end point of the unit video as the animation, and the control section causes the display section to display the information about the starting point and the end point of the unit video as the display representing the contents of the unit video.

Furthermore, the display section is assumed to be formed by electronic paper which maintains the display even without power supply.

Furthermore, the unit video representing device is to be approximately box-shaped, such as being, e.g., card-, block-, plate-, or brick-shaped.

Alternatively, the unit video representing device is to be formed by binding a cover section having the display section and a plurality of sheets formed as flexible paper-like display devices along a spine, and is supposed to have a book structure in which the sheets form pages.

In this case, the unit video information inputted by the input section includes frame image data forming the unit video, and the control section generates display image data for the sheets using the frame image data, and causes the sheets to execute still-image display based on the generated display image data.

Furthermore, each of the sheets is to be formed of electronic paper which maintains the display even without power supply.

In another embodiment of the present invention, there is provided an editing console which includes an editing surface on which a plurality of unit video representing devices, each executing display representing contents of unit video as an animation, can be arranged, an arranging sequence detecting section detecting an arranging sequence of the plurality of unit video representing devices arranged on the editing surface, and an edit information generating section generating edit information in which a time sequence is set, on the basis of the arranging sequence detected by the arranging sequence detecting section.

Furthermore, the arranging sequence detecting section detects an arranging sequence of the plurality of unit video representing devices arranged in a horizontal direction on the editing surface.

Furthermore, the arranging sequence detecting section detects an arranging sequence in a vertical direction of the plurality of unit video representing devices piled on the editing surface.

Furthermore, the arranging sequence detecting section is formed as a noncontact wireless communication device section performing noncontact wireless communication with the unit video representing devices arranged on the editing surface.

In still another embodiment of the present invention, there is provided an editing system which includes a plurality of unit video representing devices and an editing console. Each of the unit video representing devices includes an input means inputting unit video information being information about unit video as an animation, a display means, a control means causing the display means to execute display representing contents of the unit video, on the basis of the unit video information inputted by the input section, and a self information notifying means capable of causing an editing console to recognize self information when the self unit video representing device is placed on the editing console. Furthermore, the editing console includes an editing surface on which the plurality of unit video representing devices can be arranged, an arranging sequence detecting means detecting an arranging sequence of the plurality of unit video representing devices arranged on the editing surface, and an edit information generating means generating edit information in which a time sequence is set, on the basis of the arranging sequence detected by the arranging sequence detecting means.

In yet another embodiment of the present invention, there is provided an animation editing method by an editing system which includes a plurality of unit video representing devices and an editing console. The animation editing method includes a step of inputting unit video information about each of a plurality of unit video being animations, to a corresponding one of the plurality of unit video representing devices, thereby allowing each video representing device to represent single unit video, a step of detecting an arranging sequence in a state where the plurality of unit video representing devices arranged on the editing surface of the editing console, and a step of generating edit information in which a time sequence is set, on the basis of the detected arranging sequence.

In the above embodiments of the present invention, it is configured to represent single unit video with a unit video representing device that is, e.g., card-shaped or book-shaped. The unit video includes a unit called, e.g., a clip or a scene as an animated video material, and a unit in which a plurality of clips are joined timewise and thus edited. Hence, the "unit" is not limited. However, the unit is timewise continuous animated video, and thus a unit should be a part of animated content or a broadcasting program to be finally created by editing.

The unit video representing device represents single video unit. It is configured to input each unit video information to each of a plurality of unit video representing devices, and allow each unit video representing device to visually represent the corresponding single unit video using a technique such as a display of thumbnail pictures display.

By arranging these unit video representing devices in the horizontal direction and/or piling them vertically on the editing surface of the editing console, it is configured to specify a time sequence of the respective unit video. That is, the editing console reads a sequence of the unit video representing devices arranged in the horizontal/vertical directions to generate edit data. This edit data is recognized as a final sequence of unit video represented by the respective unit video representing devices. That is, this becomes edit data obtained by joining a plurality of unit video (e.g., clips).

According to the above embodiments of the present invention, through very intuitive operations such as arranging and/or piling unit video representing devices each representing unit video on the basis of inputted unit video information, on the editing console, an editing operator can perform animation editing for joining the unit video along a time axis. That is, the editing operator may only have to perform the arranging operation in sequence while merely recognizing the contents of video on the unit video representing devices without complicated operation, and thus the operator can perform video editing without specific skill for the equipment. This allows the operator to concentrate exclusively on the contents of the video and the contents of editing.

Furthermore, the unit video representing devices can be arranged not only in the horizontal direction but also in the vertical direction by piling. Thus, not so large an area is required as the editing surface of the editing console. In addition, production of full-length video content can be accommodated.

Furthermore, since the unit video representing device makes a display representing the contents of unit video on the basis of the inputted unit video information, the device requires no cumbersome preparation, such as preparing, e.g., image-printed cards, nor entails waste such as discarding the printed cards after editing as these cards are no longer needed, thereby reducing time, cost, and environmental loads.

BRIEF DESCRIPTION OF THE DRAWINGS

FIG. 3 is a diagram illustrating the card binder and editing cards according to the embodiment;

FIG. 4 is a diagram illustrating an editing desk according to the embodiment;

FIGS. 5A-5E are a plan view, a front view, a schematic internal structure view, a bottom view, and a left side view of an editing card according to the embodiment, respectively;

FIGS. 12A, 12B are diagrams illustrating recognition of memory tags by the editing desk according to the embodiment;

FIGS. 16A-16C are diagrams illustrating another scan operation by the editing desk according to the embodiment;

FIG. 23 is a flowchart for an editing procedure according to the embodiment;

FIG. 26 is a diagram illustrating association of clips with card IDs according to the embodiment;

DETAILED DESCRIPTION OF THE EMBODIMENTS

An embodiment of the present invention will now be described in the following sequence.
<I: Outline of Editing System>
<II: Editing System Including Editing Cards and Editing Desk>
　[II-1. System Constituting Devices]
　[II-2. Editing Card Structure]
　[II-3. Card Binder Configuration]
　[II-4. Editing Desk Structure]
　[II-5. XY Scan by Editing Desk]
　[II-6. Recognizing Pile of Editing Cards and Their up-Down Communication]
　[II-7. Editing Procedure]
　[II-8. Clip Downloading Operation to Editing Cards]
　[II-9. Operation During Editing by Editing Desk]
　[II-10. Checking Clip Video During Use of Editing Desk]
<III: Editing System Including Editing Books and Editing Desk>
　[III-1. System Constituting Devices]
　[III-2. Editing Book Structure]
　[III-3. Clip Editing by Editing Master Book]
　[III-4. Editing Procedure]
　[III-5. Clip Downloading Operation to Editing Books]
　[III-6. Operation During Editing by Editing Desk]
<IV: Advantages and Modified Examples of the Embodiment>

I: Outline of Editing System

Figure 1A:
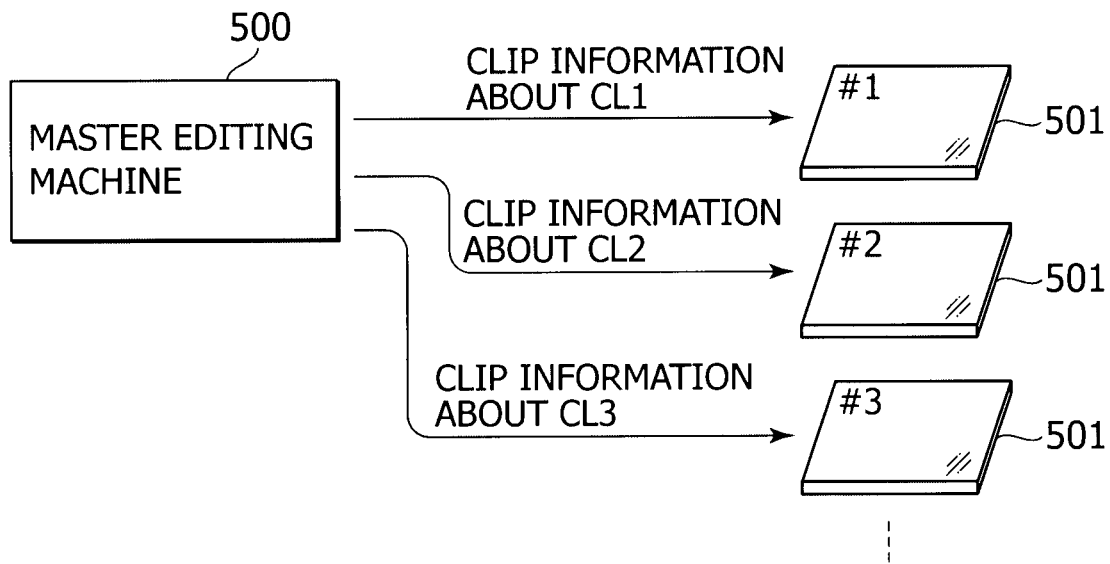
FIGS. 1A, 1B are diagrams illustrating a configurational concept of an editing system according to an embodiment of the present invention.
Figure 1B:
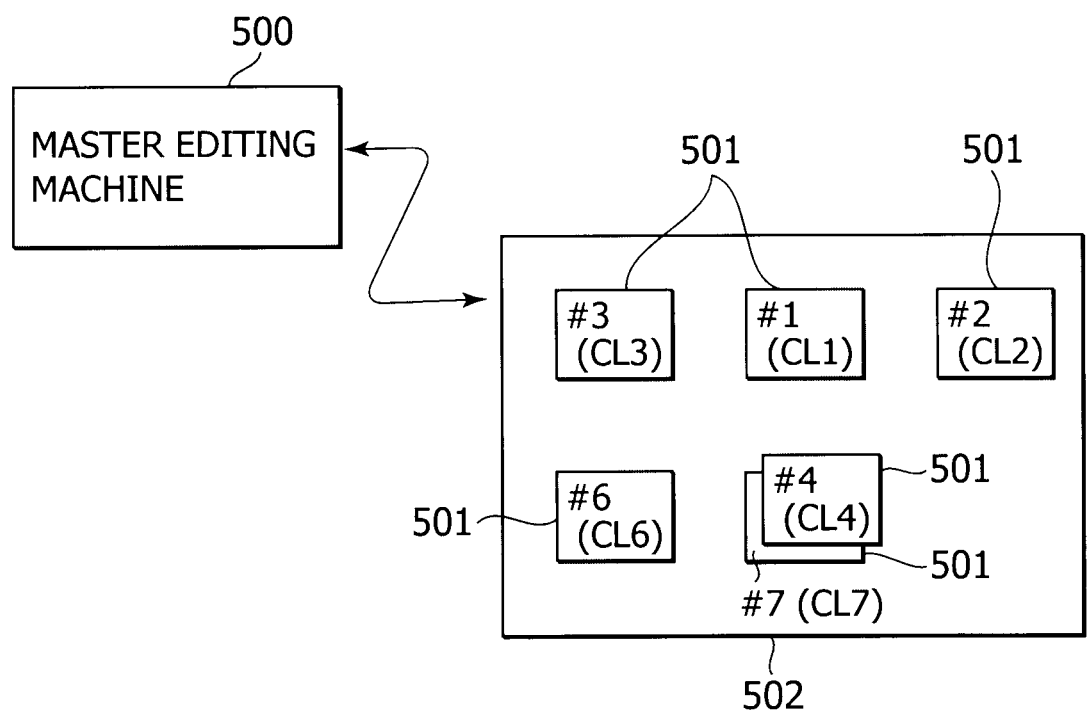

Referring first to FIGS. 1A, 1B, an editing system as the embodiment of the present invention will be outlined.

FIG. 1A shows a master editing machine 500 and a plurality of unit video representing devices 501.

The master editing machine 500 herein shown means equipment capable of, at least, storing many video materials (clips) and transmitting them to the unit video representing devices 501.

A video editing machine called, e.g., a nonlinear editor that is capable of storing many video materials and producing content by editing the video materials corresponds to the master editing machine 500.

For producing video content, one or more clips as animated video materials for editing are captured and stored in the nonlinear editor.

Then, the nonlinear editor usually performs "cut-editing" by specifying an IN point and an OUT point for each of the plurality of clips as the video materials, and thereafter joins the cut-edited clips in a predetermined sequence along a time-axis direction.

For example, a specialized editing operator typically performs such editing by using the nonlinear editor. However, in this example, the unit video representing devices 501 and an editing console 502 are used to perform editing for setting the time sequence of clips and joining the clips.

The unit video representing device 501 is an approximately box-shaped device such as a card-, a block-, or a brick-, or a book-shaped device such as a pocketbook.

That is, it may suffice that the unit video representing device 501 be a physically shaped object that can be arranged and/or piled together.

Of course, there may be various types of shaped objects that can be arranged and/or piled. For example, a cylinder, a polygonal prism such as a triangular prism or a pentagonal prism, or any pillar having an undefined shape, or a cube such as a dice may all be acceptable. Additionally, any thin object such as cards may be acceptable.

The unit video representing device 501 may preferably be so rigid that a person can keep its shape when carrying it with his or her hand.

Each of Such unit video representing devices 501 can have unit video information as a video material downloaded from the master editing machine 500.

The unit video includes a unit called, e.g., a clip or a scene as an animated video material, and a unit in which a plurality of clips have been joined timewise and thus join-edited. Hence, the "unit" is not limited. However, the unit is time-continuous animated video, and thus a unit should be a part of animated content or a broadcasting program to be finally created by editing.

A series of continuous video segments from the start to the end of imaging with a camera is usually called a single clip. In the following, a clip is taken as an example of the unit video.

A clip as a video material is typically edited by setting an IN point (video start point) and an OUT point (video end point) within the clip. That is, this is processing of cutting out a segment for actual use as video content from the IN point to the OUT point.

Thereafter, clips thus edited at the IN/OUT points are joined together one after another in a time-axis sequence, thereby producing the video content.

For example, the master editing machine 500 edits IN/OUT points for each clip. The master editing machine 500 transmits clip information (unit video information being information about unit video as an animation) about each of such clips after editing, to a corresponding one of the unit video representing devices 501.

For example, the master editing machine 500 transmits clip information about a clip CL1, clip information about a clip CL2, clip information about a clip CL3 . . . to respective individual unit video representing devices 501, 501, 501 . . . .

The unit video representing devices 501 each are given a unique ID (identification information). Here, their IDs are labeled #1, #2, #3 . . . . The master editing machine 500 transmits clip information about the individual clips to the respective unit video representing devices 501, 501, 501 . . . , such as, e.g., the clip information about the clip CL1 to a unit video representing device 501 having the ID=#1, and the clip information about the clip CL2 to a unit video representing device 501 having the ID=#2.

The clip information (unit video information) transmitted from the master editing machine 500 may contain, e.g., a clip number as an identifier of a clip, IN point/OUT point information (e.g., time codes at IN/OUT points), representative image data about clip video, and the like. The representative image data maybe, e.g., frame images specified by the time codes at the IN/OUT points, their thumbnail pictures, or the like.

The clip information may also contain all frame image data actually forming an animation as a clip, or intermittent frame image data. Animation data being the whole clip itself, or animation data being part of the clip may alternatively be contained.

The clip information may further contain all or part of an audio signal accompanying the clip video, textual data about the clip, and the like.

Each unit video representing devices 501 has a display section on a certain one of surfaces forming its shape, and when having acquired clip information, displays a representation of the contents of the clip on the display section on the basis of the clip information. That is, a state is provided in which an editing operator can visually recognize which unit video representing device 501 corresponds to which clip.

Once the state has been provided in which many unit video representing devices 501 represent certain clips, respectively, the editing operator arranges and/or piles these unit video representing devices 501 on the editing console 502 as shown in FIG. 1B. With a time-axis sequence of the clips in mind, the editing operator arranges the unit video representing devices 501 planewise and/or piles them, in the sequence in mind.

This act of the operator is an operation of specifying a joining sequence for producing video content using a plurality of clips.

Once the editing operator has finished arranging the unit video representing devices 501, the editing console 502 reads the arranging sequence (sequence in a horizontal direction and in a pile) of the unit video representing devices 501.

The arranging sequence is read, e.g., on the basis of the IDs of the unit video representing devices 501.

Alternatively, clip numbers represented by the respective unit video representing devices 501 may be read.

Let it be supposed, e.g., that the unit video representing device 501 whose ID=#1 represents the clip CL1, the unit video representing device 501 whose ID=#2 represents the clip CL2, the unit video representing device 501 whose ID=#3 represents the clip CL3 . . . , and the unit video representing device 501 whose ID=#7 represents a clip CL7.

In this case, the editing console 502 reads the IDs of these arranged unit video representing devices 501, judges their arranging sequence, and sets the judged sequence as edit data.

Let it be set, e.g., that on the editing console 502, the time sequence forwards from upper left to lower right planewise, and from top to bottom in a pile. Then, in a case shown in FIG. 1B, a sequence of #3→#1→#2→#6→#4→#7 is read.

The editing console 502 delivers the sequence of the read IDs to the master editing machine 500 as the edit data. If the master editing machine 500 stores the IDs of the unit video representing devices 501 by association with their clip numbers when having transmitted the clip information to the respective unit video representing devices 501, it can recognize that a clip editing sequence is CL3→CL1→CL2→CL6→CL4→CL7 from the edit data being #3→#1→#2→#6→#4→#7, thereby allowing the master editing machine 500 to create edit data in which six clips are joined therein.

Alternatively, the editing console 502 may read associated clip numbers from the respective unit video representing devices 501. Then, it may judge an arranging sequence of these unit video representing devices 501, thereby setting the judged sequence as edit data. In the case of FIG. 1B, the sequence of CL3→CL1→CL2→CL6→CL4→CL7 can be read, and this can be transmitted to the master editing machine 500 as the edit data. In this case, the master editing machine 500 can use this edit data directly.

The above outlines the editing system. According to this system, the editing operator can perform editing operation intuitively by arranging while viewing the contents of the clips represented by the respective unit video representing devices 501.

<II: Editing System Including Editing Cards and Editing Desk>

[II-1. System Constituting Devices]

Next, detailed configurations and operations of the embodiment will be described with reference to an example in which editing cards 200, each being a card-shaped device, are used as an example of the unit video representing devices 501, and an editing desk 300 is used as an example of the editing console 502.

It is supposed here that a nonlinear editor 100 is employed as an example of equipment equivalent to the master editing machine 500 of FIGS. 1A, 1B, and that editing is performed by downloading clip information to a plurality of editing cards 200 from the nonlinear editor 100 and arranging the editing cards 200 on the editing desk 300.

Figure 2:
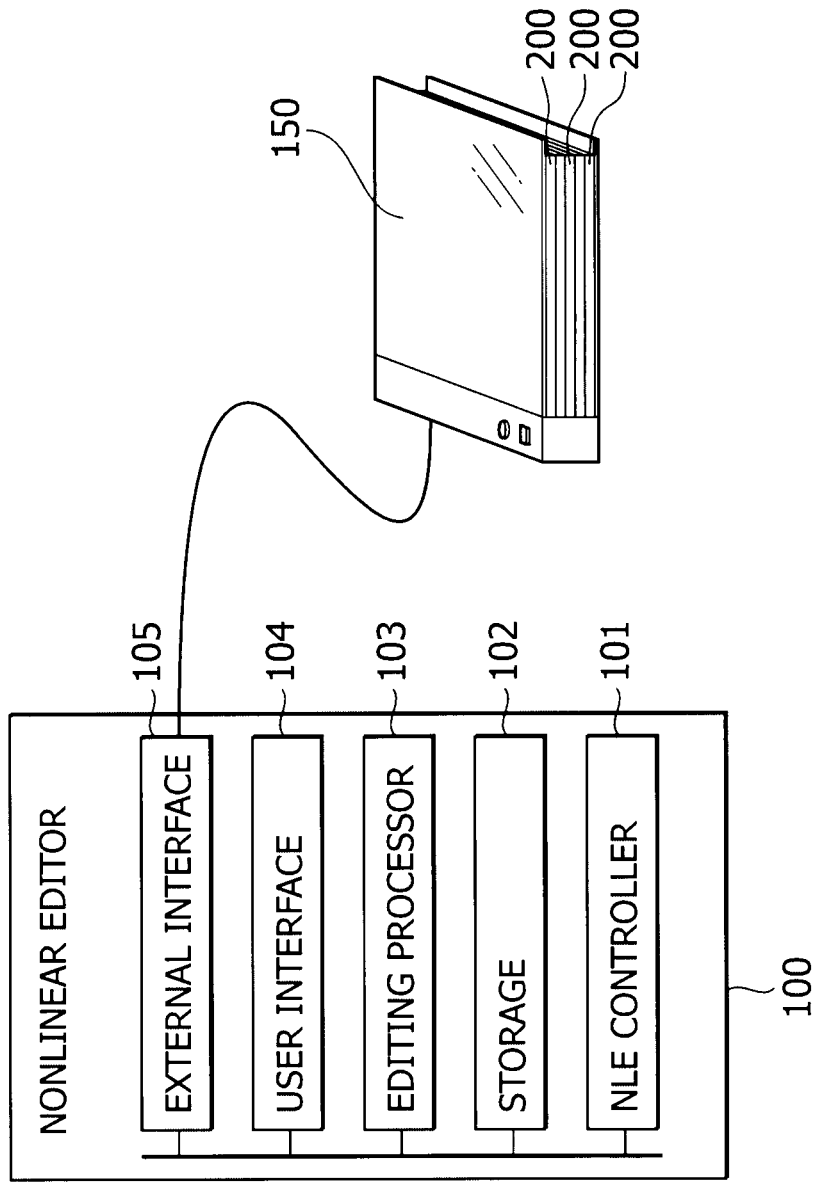
FIG. 2 is a diagram illustrating a nonlinear editor and a card binder in the editing system according to the embodiment.

FIG. 2 shows the nonlinear editor 100 and a card binder 150.

The nonlinear editor 100 includes, e.g., a controller 101 (hereinafter denoted "NLE controller 101"), a storage 102, an editing processor 103, a user interface 104, and an external interface 105.

The NLE controller 101 is constructed of, e.g., a microcomputer, and controls the whole operation for image editing.

The storage 102 is constructed of, e.g., a HDD or the like, and stores video materials for editing and edit data.

The editing processor 103 performs various editing processing on the video materials.

The user interface 104 includes an operation input system such as operation keys, dials, a keyboard, a mouse, a touch panel, and a touch pad, and an output system such as a display and an audio output section, and performs various input/output operation for a user (editing operator).

The external interface 105 is a section communicating with external equipment, and includes, e.g., a USB (Universal Serial Bus) interface, an IEEE (Institute of Electrical and Electronics Engineers) 1394 interface, and the like.

It may suffice that such a nonlinear editor 100 be any typical animation editor other than corresponding to communication, particularly, with the editing cards 200 (card binder 150) and the editing desk 300 in this example. Specifically, it may suffice that, in terms of hardware, the nonlinear editor 100 can be connected to and communicate with the editing cards 200 (card binder 150) and the editing desk 300 through the external interface 105, and that, in terms of software, a program for performing the operation of downloading clip information to the editing cards 200 and processing of accommodating input of edit data from the editing desk 300 be installed as a program for operating the NLE controller 101.

The card binder 150 is equipment accommodating many editing cards 200 therein with the editing cards connected thereto through connectors, and is used for downloading clip information to the respective editing cards 200 from the nonlinear editor 100.

As shown in FIG. 3, the card binder 150 allows many editing cards to be releasably attached thereto arbitrarily.

When inputting clip information to the respective editing cards 200 from the nonlinear editor 100, the operator attaches many editing cards 200 to the card binder 150, and then connects the card binder 150 to the nonlinear editor 100 so as to be ready to communicate.

Each editing card 200 has clip information downloaded from the nonlinear editor 100 via the card binder 150, and displays a representation of the contents of a clip.

Such editing card 200 is released from the card binder 150, and then used for operation on the editing desk 300.

FIG. 4 shows a state in which editing cards 200 are arbitrarily arranged and piled on the editing desk 300.

A plane section (an XY plane) as an editing surface 301 for arranging the editing cards 200 in this way is formed on the editing desk 300.

For interface with the operator, an operation section 302 and a display 303 are provided.

Furthermore, for connection for communication with other equipment such as the nonlinear editor 100, there is provided a connection terminal 304a, such as, e.g., a USB or IEEE 1394 device, for data communication with external equipment (e.g., the nonlinear editor 100) using a predetermined communication method.

Through cable-connected communication using this connection terminal 304a, the editing desk 300 can transmit generated edit data (EDL or edit list) to the nonlinear editor 100.

[II-2. Editing Card Structure]

The structure of an editing card 200 will be described.

FIGS. 5A-5E are a plan view, a front view, a schematic internal structure view, a bottom view, and a left side view of the editing card 200, respectively.

The editing card 200 is a card-shaped (approximately box-shaped) object having a certain thickness such as shown in FIG. 5B.

As shown in FIG. 5A, a display that can display still images is formed on the editing card 200 as an electronic paper section 201.

The editing card 200 receives clip information about a single clip from the nonlinear editor 100. On the basis of this clip information, the electronic paper section 201 displays a representation of the contents of the clip.

For example, for a clip having an IN point and an OUT point set, displayed are, as shown in the figure, a thumbnail picture TM1 based on a frame image at the IN point, a time code TCi at the IN point, a thumbnail picture TM2 based on a frame image at the OUT point, a time code TCo at the OUT point, and a clip number CN appended for clip management by the nonlinear editor 100.

Such a display allows the operator to recognize which one of the editing cards 200 corresponds to which clip having what video.

For example, on the left side surface of the editing card 200, a connector 204 is formed as shown in FIG. 5E. This is for connection to the card binder 150 as shown in, e.g., FIG. 3.

By providing many of a connector corresponding to this connector 204 in the card binder 150, many editing cards 200 can be connected to the card binder 150 physically and electrically.

As seen in FIGS. 5A, 5C, 5D, a light receiver 202 receiving an optical signal is formed at a midsection of a top surface of the editing card 200, and a light emitter 203 outputting an optical signal is formed at a midsection of a bottom surface thereof.

For example, the light receiver 202 is arranged on a lower side of the electronic paper section 201. In the electronic paper section 201, no display is made at a portion immediately above the light receiver 202. That portion is left transparent, thereby preventing inconvenience in light reception.

Furthermore, as shown in FIG. 5C, magnets 206 and hall elements 205 are arranged at predetermined positions in the editing card 200. There are also provided magnetic shield plates 207 each magnetically shielding a magnet 206 and a hall element 205 vertically adjacent to each other.

These magnets 206 and hall elements 205 are configured to detect, in a pile of editing cards 200, any other editing card 200 placed above and/or below the self editing card. Also, the light emitter 203 and the light receiver 202 are configured to implement information communication between the upper and lower ones of the editing cards 200 in the pile. These configurations will be described later.

A memory tag 208 is also formed in the editing card 200. This memory tag 208 is to implement noncontact wireless communication with the editing desk 300. The memory tag 208 will be described later.

Figure 6A:
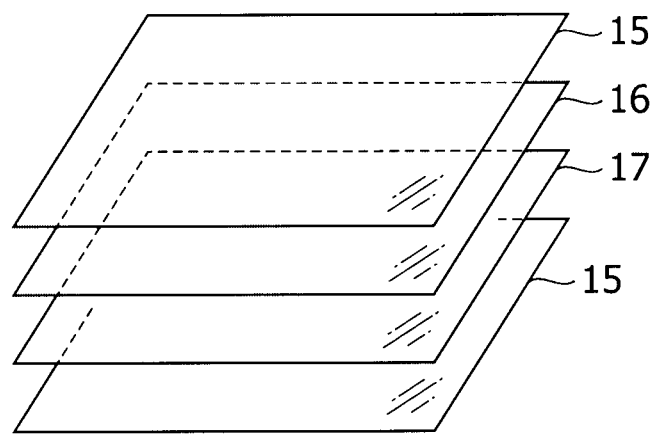
FIGS. 6A-6C are diagrams illustrating electronic paper utilized in the embodiment.
Figure 6B:
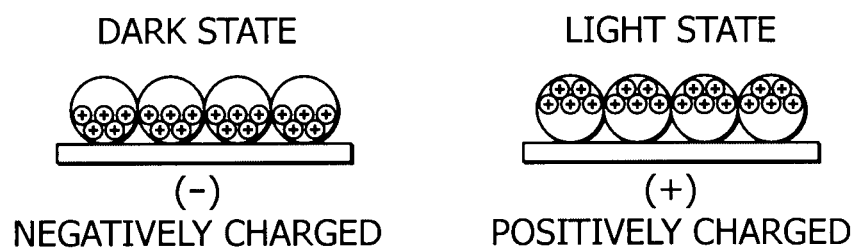
Figure 6C:
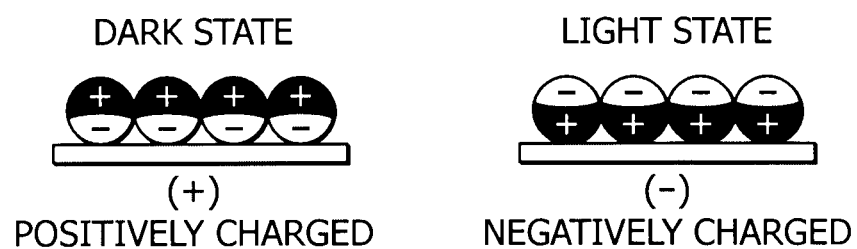

Referring now to FIGS. 6A-6C, electronic paper provided as the electronic paper section 201 on the upper surface of the editing card 200 will be described here.

FIG. 6A shows an example of a typical structure of the electronic paper. The electronic paper has a structure in which two plastic sheets 15, 15 sandwich a display layer 16 and a driver layer 17 therebetween.

The display layer 16 is a layer for display, with pixel structures using, e.g., microcapsules, silicon beads, or the like formed therein.

The driver layer 17 is a layer having a display driving circuit using TFTs (Thin Film Transistors) formed therein, and can execute image display on the display layer 16 by applying voltage to each of the pixel structures in the display layer 16.

Referring to FIGS. 6B, 6C, the principle of display will be described.

FIG. 6B shows an electrophoresis method using microcapsules.

Electrophoresis means a phenomenon of charged particles dispersed in a liquid moving through the liquid responsive to an external electric field.

In the display layer 16, microcapsules are arranged each as a pixel structure in which a blue liquid and white charged particles (titanium oxide particles) are encapsulated. Here, when applied with a negative voltage by the driver layer, charged particles are attracted toward an electrode as shown in the figure. In this case, the blue liquid is displayed in the pixel structure, which becomes a dark state in the display.

Meanwhile, when applied with a positive voltage by the driver layer, the charged particles are repelled and thus collected to a front surface of the microcapsule. In this case, white charged particles are displayed in the pixel structure. This is a light state in the display.

FIG. 6C shows a technique using silicon beads. As shown in the figure, solid particles (silicon beads) painted in two colors are used. These silicon beads have different charges per different colors, respectively. For this reason, a silicon bead rotates by polarities of a voltage applied from the driver layer 17. As a result, when, e.g., a positive voltage is applied, a positively charged black color side faces a display surface, resulting in a display in black. Meanwhile, when a negative voltage is applied, a negatively charged white color side faces the display surface, resulting in a display in white.

Color display can be realized by any of these techniques shown in FIGS. 6B, 6C. That is, a single microcapsule or silicon bead forms a single pixel structure. Pixels corresponding to, e.g., YMCK colors (yellow, magenta, cyan, black) are properly arranged as the pixel structures, and these pixels are controlled responsive to color signals. By doing so, color display can be executed.

Furthermore, energy is required for electrophoresis and rotation of silicon beads. That is why positive and negative voltages are applied to control each pixel to switch between the dark and light states. To put it in reverse, either state is maintained if no voltage is applied. That is, after predetermined image display has been executed by controlling application of voltages to each pixel, the image can be kept displayed even with no voltage applied. Accordingly, once displayed, an image is kept displayed for some period of time with no power supplied.

Figure 7:
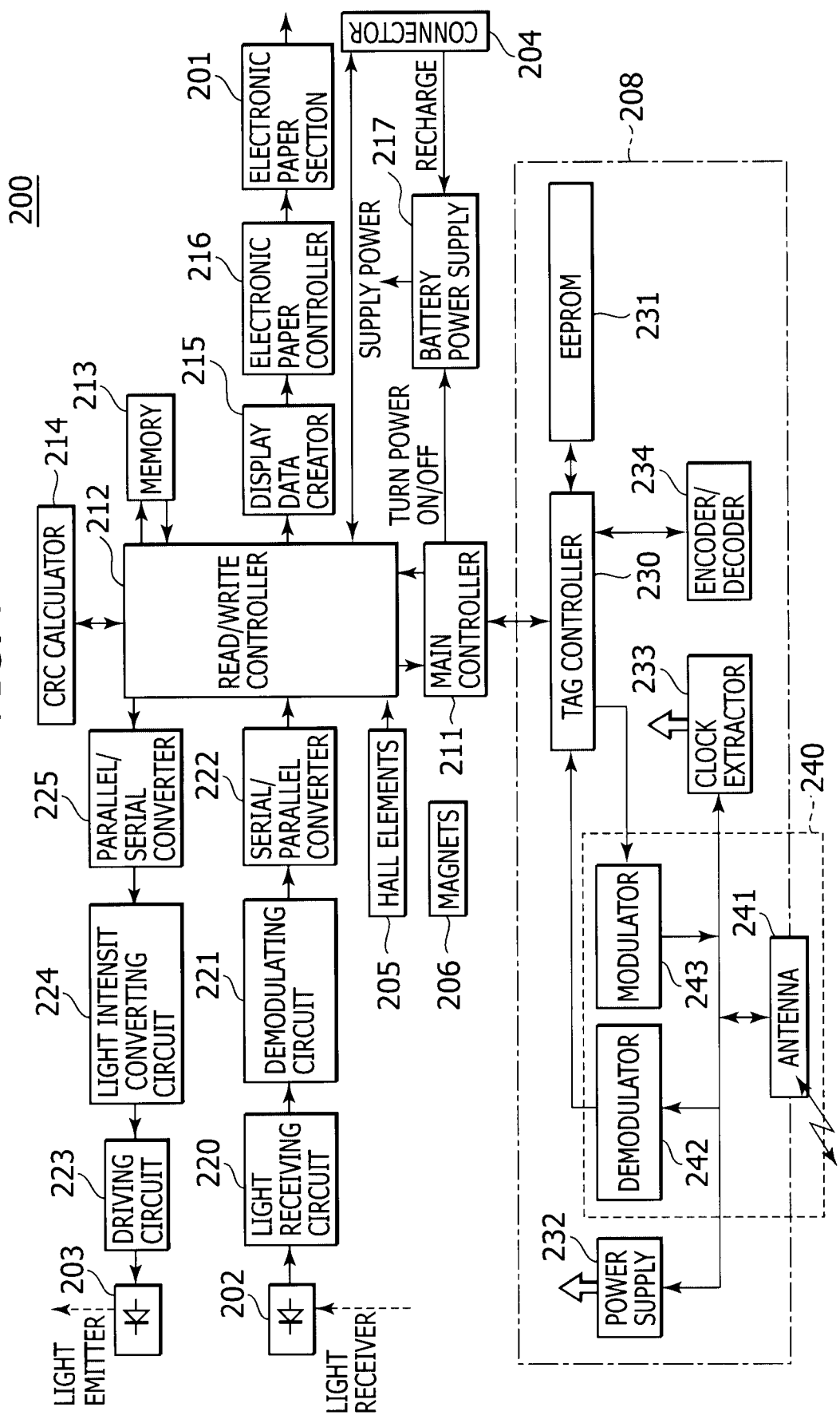
FIG. 7 is a block diagram of the editing card according to the embodiment.

Referring to FIG. 7, an internal circuit configuration of the editing card 200 will be described.

A main controller 211 is formed of a microcomputer having a CPU (Central Processing Unit), a ROM (Read Only Memory), and a RAM (Random Access Memory), and controls the whole of the editing card 200.

A read/write controller 212 functions as a memory controller and an input/output interface, and performs operations, such as processing on various input information, transmission to the main controller 211, writing and reading to and from a memory 213, and data output processing.

The memory 213 is constructed of, e.g., a nonvolatile semiconductor memory or the like. The memory 213 stores various input/output data.

A CRC (Cyclic Redundancy Check) calculator 214 checks data transfer error for an input signal and the like.

The editing card 200 includes a battery power supply (secondary battery) 217 to supply power for its internal operation.

While the editing card 200 has the connector 204 for connection to the card binder 150 as mentioned above, e.g., the card binder 150 can be used as a recharger of the battery power supply 217 inside the editing card 200. Of course, a dedicated recharger compatible with the connector 204 may otherwise be used.

In such a case, the battery power supply 217 is charged while supplied with charging current via the connector 204.

The main controller 211 performs on/off control of the battery power supply 217.

As mentioned above, the connector 204 is connected to the card binder 150, and the editing card 200 has clip information downloaded from the nonlinear editor 100 in that state.

In this case, the clip information transferred via the card binder 150 is captured by the read/write controller 212, and stored in the memory 213.

The electronic paper section 201 displays a representation of the contents of a clip on the basis of the clip information. As a display driving system for this electronic paper section 201, a display data creator 215 and an electronic paper controller 216 are provided.

After the clip information is downloaded and stored in the memory 213, the main controller 211 causes the electronic paper section 201 to execute display based on the clip information. That is, the main controller 211 instructs the read/write controller 212 to read the clip information stored in the memory 213, and supplies the information to the display data creator 215. The display data creator 215 generates display data by using, e.g., thumbnail pictures, time codes, a clip number, and the like contained in the clip information, and supplies the generated display data to the electronic paper controller 216. The electronic paper controller 216 drives the electronic paper section 201 for display on the basis of the display data.

By this operation, still images representing the contents of the clip such as shown in, e.g., FIG. 5A are displayed.

It is noted that the electronic paper, once having displayed images, keeps the displayed images thereon for about several to ten days with power turned off until it is given new display data and driven to display the new data. For this reason, the display data creator 215 and the electronic paper controller 216 may not normally have to perform display control operation after having executed clip information-based display.

Furthermore, the editing card 200 incorporates therein the light receiver 202 and the light emitter 203, as mentioned above.

The light receiver 202 is constructed of, e.g., a photodetector generating a current proportional to a quantity of light received. An electrical signal obtained by the light receiver 201 is supplied to a light receiving circuit 220. The light receiving circuit 220 converts the current generated by the light receiver 201 into a voltage, amplifies the voltage, and generates a digital signal by binarization. The light receiving circuit 220 also includes an AGC (Automatic Gain Control) circuit, not shown, performing automatic adjustment of amplification rate (gains), and transmits the generated digital signal to a demodulating circuit 221.

The demodulating circuit 221 obtains a baseband signal through PLL (Phase Locked Loop)-based clock generating and demodulating processing on the input digital signal, and supplies the obtained baseband signal to a serial/parallel converter 222.

The serial/parallel converter 222 converts the input signal into a parallel signal, and supplies the signal to the read/write controller 212.

The read/write controller 212 analyzes packet data as an optically transmitted signal, stores the data in the memory 213, and also notifies the main controller 211 of the transmitted information.

Furthermore, for outputting a signal for optical transmission, the main controller 211 generates data for transmission, and causes the read/write controller 212 to generate packet data for transmission.

The read/write controller 212 supplies the packet data for transmission to a parallel/serial converter 225. After conversion into a serial signal, the parallel/serial converter 225 transmits the serial signal to a light intensity modulating circuit 224. The light intensity modulating circuit 224 modulates the input data into light having an intensity proportional to a quantity of the data. Then, the light emitter 203 is driven via a driving circuit 223, the light emitter 203 performs photoelectric conversion to generate an optical signal, and then the generated optical signal is outputted.

The editing card 200 incorporates there in a predetermined number of hall elements 205 and magnets 206. Functions of the hall elements 205 and the magnets 206 will be described later. Each of the predetermined number of hall elements 205 outputs a signal proportional to a quantity of magnetism detected. The read/write controller 212 detects signals from the hall elements 205, and notifies the main controller 211 of the signals. The main controller 211 can judge whether or not any editing card 200 is placed above and/or below the self editing card 200 on the basis of the signals from the hall elements 205.

The components so far mentioned above operate responsive to a power supply voltage from the battery power supply 217. The main controller 211 turns on the battery power supply 217 only for periods mainly from downloading of clip information to execution of display on the electronic paper section 201 and during communication using the light receiver 202 and the light emitter 203.

Since the electronic paper section 201 maintains display even in the absence of power as mentioned above, the electronic paper section 201 need not have its power turned on at all times.

Alternatively, for the period from the downloading of clip information to the execution of display on the electronic paper section 201, power may be supplied from the card binder 150.

The editing card 200 also incorporates the memory tag 208 for noncontact wireless communication.

This memory tag 208 operates sensitive to an electromagnetic field when its distance relative to a reader/writer being equipment forming an electromagnetic field therearound becomes within limits at which it can sense the electromagnetic field, and exchanges information with the reader/writer noncontact. In the editing system according to this example, a reader/writer function is provided in the editing desk 300, and the memory tag 208 is to implement noncontact wireless communication with the editing desk 300.

Figure 8A:
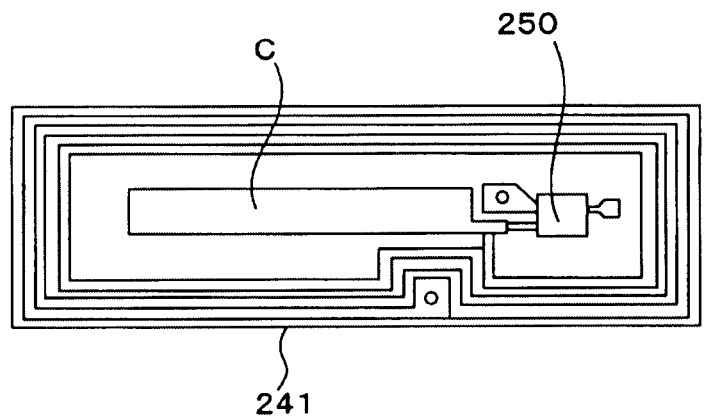
FIGS. 8A, 8B are diagrams illustrating a memory tag incorporated into the editing card according to the embodiment.

FIG. 8A shows the appearance of a memory tag 208 realized in a one-chip configuration. As shown in FIG. 8A, the memory tag 208 includes a coil antenna 241 formed of a loop-shaped conductive pattern on a base chip, and an IC chip 250 and a capacitor C connected to this coil antenna 241. It is noted that the capacitor C serves to adjust resonant frequency.

Figure 8B:
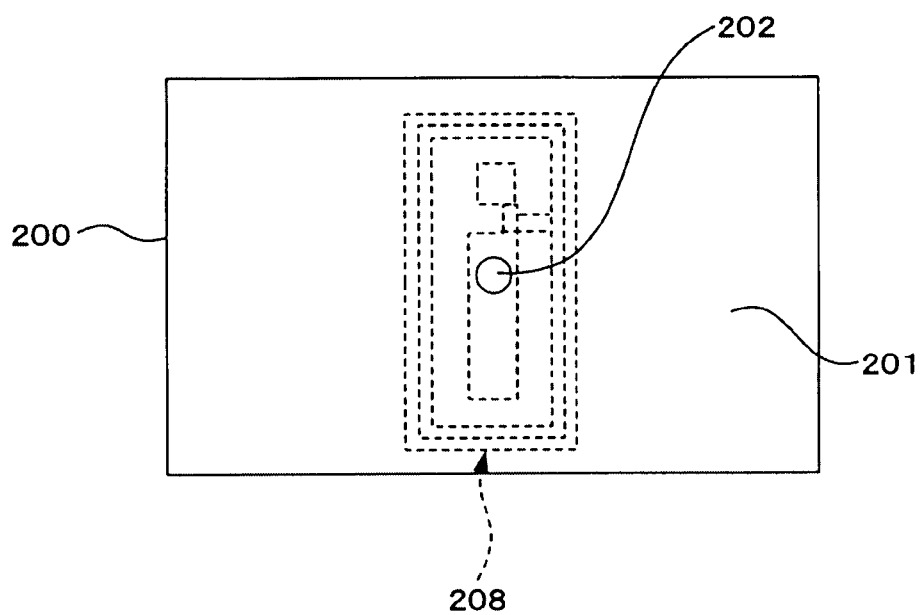

FIG. 8B shows a layout of the memory tag 208 with the editing card 200 viewed from top. For example, the memory tag 208 is arranged in a substantially middle position planewise as shown in the figure, and in a substantially middle position thicknesswise as shown in FIG. 5C.

As shown in FIG. 7, the memory tag 208 has the coil antenna 241, a transmitter/receiver 240, a power supply 232, a clock extractor 233, a tag controller 230, an encoder/decoder 234, and a semiconductor memory 231. The coil antenna 241 is inductively coupled with coil antennas (later-described X, Y antenna arrays 320, 321 of the editing desk 300 in this example) of an external reader/writer using an electromagnetic field as a medium, and exchanges information and is also supplied with power noncontact by mutual induction. The transmitter/receiver 240 includes a demodulator 242 and a modulator 243 both connected to this coil antenna 241. Both the power supply 232 and the clock extractor 233 are connected to the coil antenna 241, respectively. The tag controller 230 controls operation of the memory tag 208. The encoder/decoder 234 is connected to this tag controller 230. The semiconductor memory 231 is an EEPROM (Electronically Erasable and Programmable Read Only Memory) connected to the tag controller 230 and requiring no storing/holding operation.

The tag controller 230 can exchange various data and commands with the main controller 211.

The demodulator 242 equalizes an induction current generated through the coil antenna 241, detects and demodulates it to recover information, and supplies the recovered information to the tag controller 230.

Furthermore, the modulator 243 has any of configurations, in which a reflected wave is modulated by controlling the coil antenna 241 to be intermittent and make a load impedance on the basis of response information obtained by encoding playback information supplied thereto from the tag controller 230, in which control is performed to be intermittent and make a load directly or indirectly connected to the power supply 232 on the basis of the response information, and in which a carrier wave having a different frequency obtained by modulating (e.g., ASK-modulating) the response information is supplied to the coil antenna 241.

In the configuration in which the load impedance of the coil antenna 241 is controlled on the basis of response information, the reflective index of the coil antenna 241 is controlled by switch-controlling the load impedance on the basis of the response information when the reflected wave of a carrier wave is emitted from the coil antenna 241 that is continuously subjected to the electromagnetic field from the external reader/writer, thereby modulating the reflected wave with the above-mentioned response information.

Furthermore, in the configuration in which the load of the power supply is controlled on the basis of response information, the load applied to the power supply 232 is switched by switch-controlling the load on the basis of the response information, to vary the impedance of the inductively coupled memory tag 208, thereby implementing modulation. Impedance variations on the memory tag 208 side are detected by the inductively coupled external reader/writer as terminal voltage variations or applied wattage variations of its antennas.

The power supply 232 obtains a dc voltage by rectifying the high-frequency induction current which the coil antenna 241 has generated by mutual induction via the electromagnetic field, and supplies power to various parts of the memory tag 208. It is noted that the power supply 232 may include a voltage stabilizer circuit for outputting a stable dc voltage therefrom.

Since the various parts of the memory tag 208 operate while powered by the power supply 232 is supplied, the memory tag 208 needs no other special power supply such as a battery. That is, the various parts of the memory tag 208 need not be powered by the battery power supply 217. Accordingly, even during a period in which the main controller 211 turns off the battery power supply 217, the memory tag 208 can operate normally.

This does not exclude, however, a configuration in which the memory tag 208 uses any other power supply such as the battery power supply 217 as a main or auxiliary power supply.

The clock extractor 233 includes a frequency divider, outputs a clock signal having a carrier frequency on the basis of a carrier wave received by the coil antenna 241, and also generates and outputs a master clock being an operation reference clock for various digital circuits by dividing the frequency of this clock signal.

The semiconductor memory 231 stores therein at least a card ID (the identifier of an individual editing card 200) uniquely assigned to the editing card 200.

Various information is recorded on or played back from this semiconductor memory 231 under the control of the tag controller 230.

Furthermore, when clip information has been downloaded, data such as the clip number is delivered from the main controller 211 to the tag controller 230, and can be stored in the semiconductor memory 231 by the tag controller 230.

The tag controller 230 forwards the demodulated signal supplied thereto from the transmitter/receiver 240 during reception of noncontact wireless communication, to the encoder/decoder 234. The encoder/decoder 234 decodes information supplied thereto from the tag controller 230 and subjects the decoded information to error correction based on a CRC code or the like, thereafter returns the resultant information to the tag controller 230. Then, the tag controller 230 extracts instruction information from the external reader/writer. The information given by the reader/writer via the electromagnetic field is reconstructed in this way.

Meanwhile, during transmission, the encoder/decoder 234 assigns an error correcting code such as the CRC code to information supplied thereto from the tag controller 230, and returns the encoded response information to the tag controller 230. The encoder/decoder 234 includes an error correcting function of data, but may additionally include an encrypting/decrypting function of data.

The tag controller 230 supplies the response information encoded by the encoder/decoder 234 to the modulator 243. The modulator 243 having received the response information executes modulating processing based on a predetermined modulating method. In response thereto, the transmitter/receiver 240 transmits the modulated signal to the external reader/writer via the coil antenna 241. This transmission is performed either by a wave for transmission based on a transmitting function of the memory tag 208, a reflected wave, or on the basis of the principle of impedance variations, as mentioned above.

The tag controller 230 performs the above operation control.

That is, the tag controller 230 is configured as a semiconductor logic control circuit having a sequence control function, according to which the tag controller 230 forwards a demodulated signal supplied thereto from the demoulator 242 to the encoder/decoder 234 on the basis of a clock supplied thereto from the clock extractor 233, extracts various information on the basis of a error-corrected signal, separates/extracts information for recording, analyzes these pieces of instruction information, and thus consecutively executes predetermined processing according to a predetermined procedure.

Semiconductor sequence controller technology has been widely applied, by which, e.g., the opening/closing of a plurality of gates is executed in time series by judging conditions according to such a predetermined procedure. The tag controller 230 utilizes this technology.

This memory tag 208 is to transmit the card ID (or the clip number) stored in the semiconductor memory 231 as response information during communication with the editing desk 300.

When having received a control command (e.g., a power on/off command) from the editing desk 300 side, the tag controller 230 notifies the main controller 211 of that command, thereby allowing the editing card 200 to operate responsive to the command from the editing desk 300.

Also, when communicating with the nonlinear editor 100 via the connector 204 (and the card binder 150) or when performing optical transmission from the light emitter 203, the editing card 200 transmits its card ID. The main controller 211 can read the card ID stored in the semiconductor memory 231 via the tag controller 230, so that the main controller 211 can generate information for transmission.

The same card ID may, of course, be stored not only in the semiconductor memory 231 but also in the memory 213.

[II-3. Card Binder Configuration]

Figure 9:
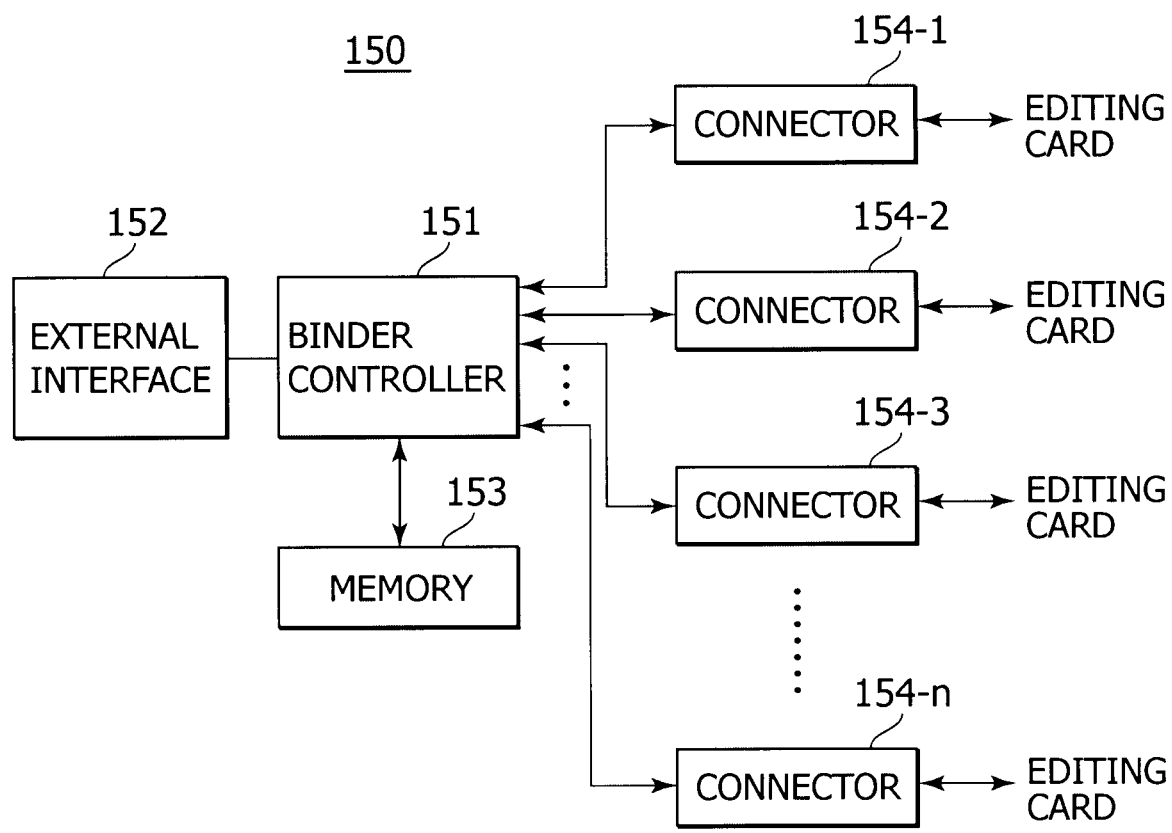
FIG. 9 is a block diagram of the card binder according to the embodiment.

FIG. 9 shows a configuration example of the card binder 150.

The card binder 150 includes a binder controller 151, an external interface 152, a memory 153, and connectors 154-1, 154-2 . . . 154-$n$.

This card binder 150 establishes a connection for communication with, e.g., the nonlinear editor 100. Thus, the card binder 150 is cable-connected to the nonlinear editor 100 through a connector, not shown, provided in the external interface 152 so as to be ready for data communication.

Each of the connectors 154-1, 154-2 154-$n$ is connectable with the connector 204 of a single editing card 200. That is, by providing n connectors 154-1, 154-2 . . . 154-$n$, n edit cords 200 are attachable to the card binder 150.

The binder controller 151 is constructed of, e.g, a CPU or the like, and performs writing/reading to and from the memory 153, and controls data transfer during communication.

When downloading clip information from the nonlinear editor 100 to each of editing cards 200, the card binder 150 causes the external interface 152 to receive the clip information from the nonlinear editor 100.

Many editing cards 200 are supposed to be connected to the connectors 154-1, 154-2 . . . .

The binder controller 151 can receive information (e.g., card IDs) from the editing cards 200 connected to the respective connectors 154-1, 154-2 . . . , and transmit the received information to the nonlinear editor 100 from the external interface 152.

Meanwhile, the nonlinear editor 100 specifies and downloads respective card ID for each clip information. When having received the clip information via the external interface 152, the binder controller 151 transfers and outputs the clip information to the editing card 200 of the specified card ID.

The memory 153 is used for, e.g., buffering clip information and other data during communication, and storing the card IDs of the editing cards 200 connected to the connectors 154-1, 154-2 . . . , and the like.

[II-4. Editing Desk Structure]

Figure 10:
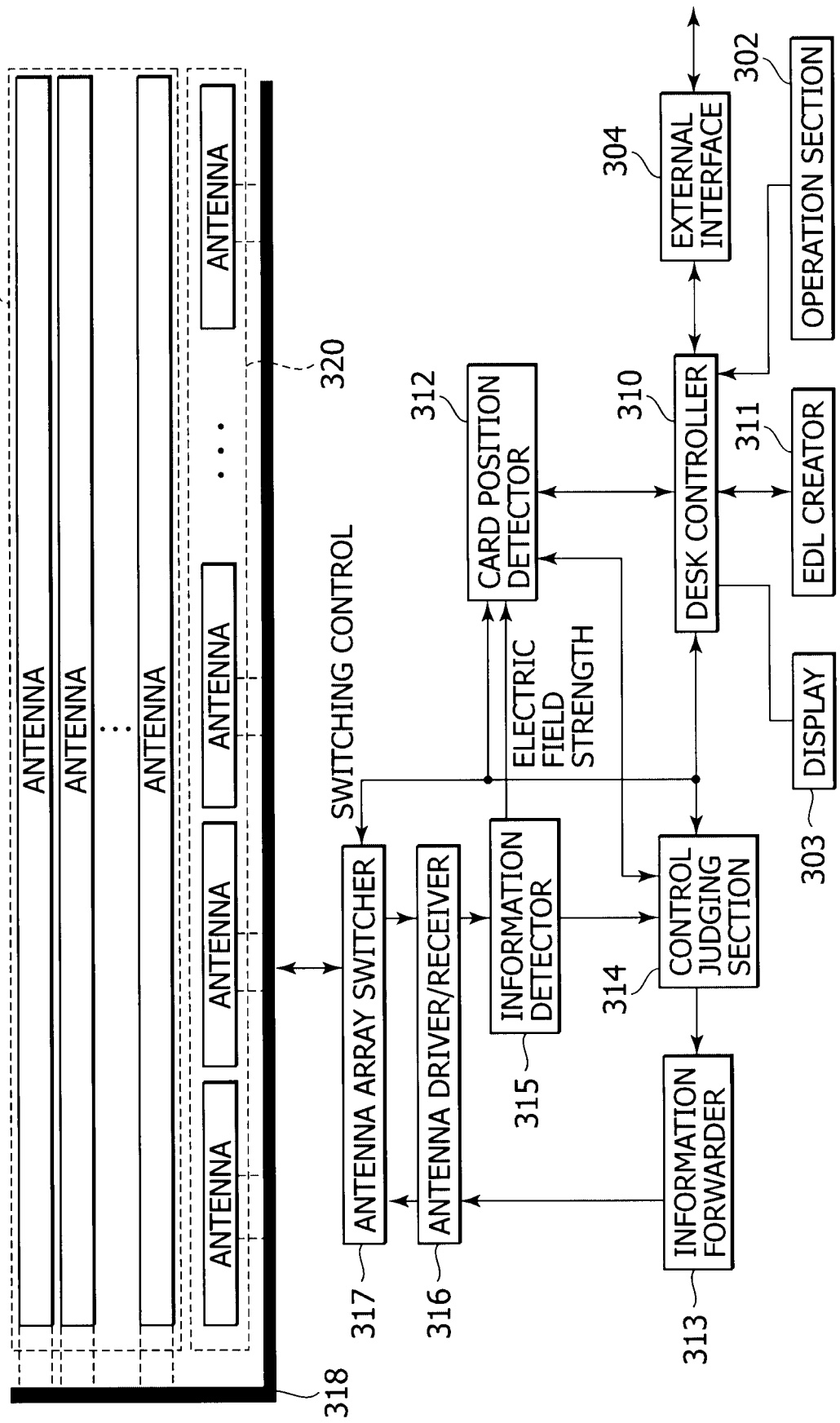
FIG. 10 is a block diagram of the editing desk according to the embodiment.

FIG. 10 shows a configuration of the editing desk 300.

The editing desk 300 includes an X-axis antenna array 320, a Y-axis antenna array 321 so as to function as a reader/writer with respect to the memory tag 208 of an editing card 200.

Figure 11A:
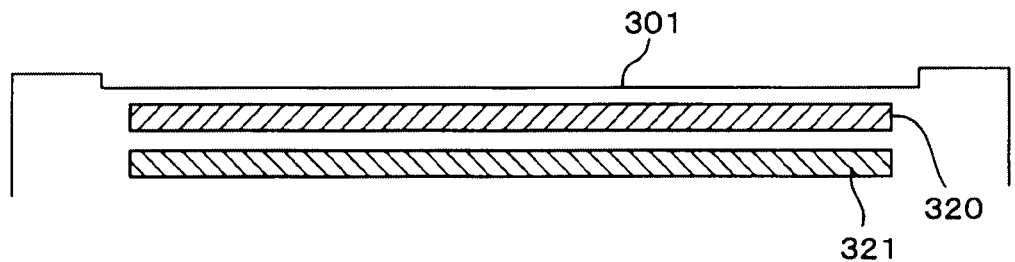
FIGS. 11A-11C are diagrams illustrating an antenna structure of the editing desk according to the embodiment.
Figure 11B:
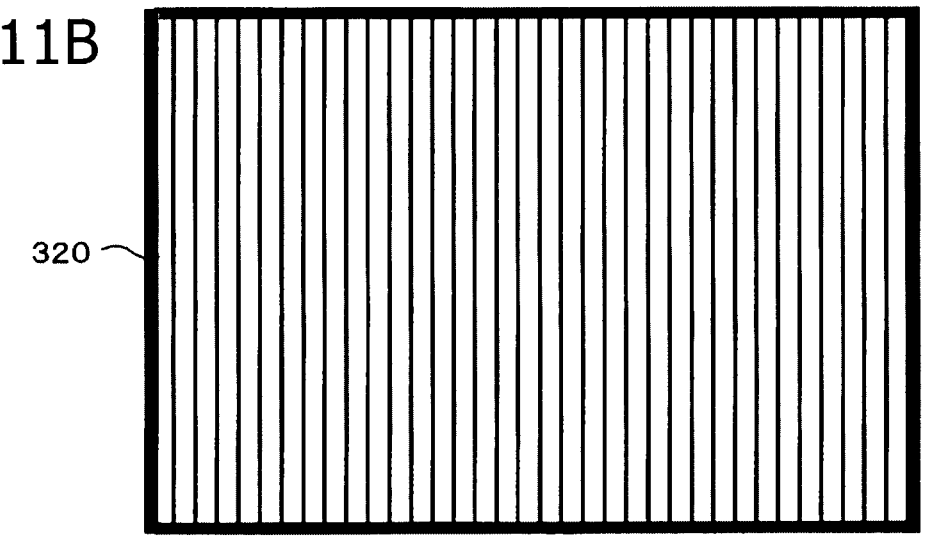
Figure 11C:
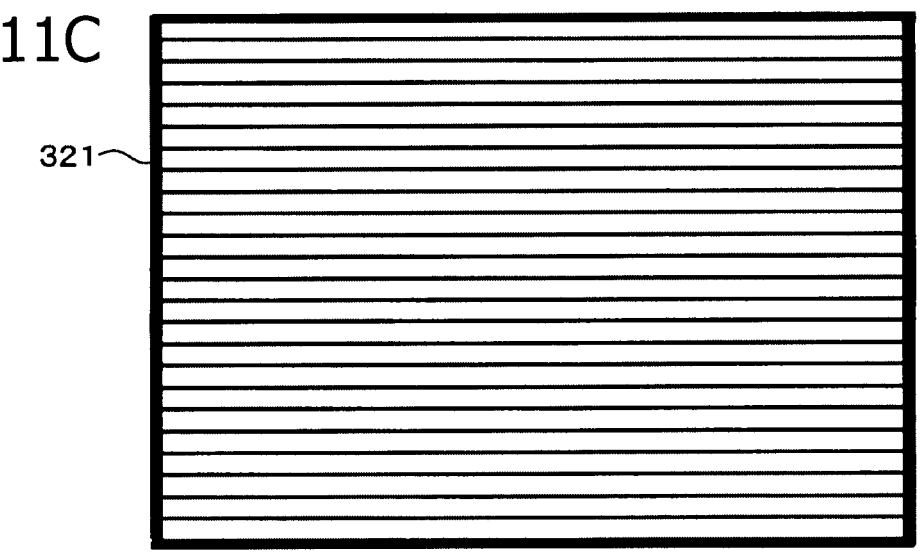

The X-axis antenna array 320, the Y-axis antenna array 321 are shown in, e.g., FIGS. 11B, 11C. These X-axis antenna array 320, Y-axis antenna array 321 have a structure in which many antenna lines extend in an X-axis direction and a Y-axis direction below the editing surface 301, as shown in FIG. 11A.

The X-axis antenna array 320, the Y-axis antenna array 321 are connected to an antenna array switcher 317 via an antenna connection bus line 318.

The editing desk 300 further includes, as a configuration for functioning as the reader/writer, the antenna array switcher 317, an antenna driver/receiver 316, an information forwarder 313, an information detector 315, and a control judging section 314.

These components allow the editing desk 300 to implement noncontact wireless communication with the memory tag 208 of the editing card 200.

In a transmission mode to the memory tag 208, the editing desk 300 transmits various commands and a card ID request to the memory tag 208. In a reception mode, the editing desk 300 is supplied with information, such as the card ID, from the memory tag 208.

The information forwarder 313 has a clock generating function, a modulating function, and a power amplifying function, and generates clock signals having a carrier frequency and master clocks. In the transmission mode, this information forwarder 313, e.g., ASK-modulates a carrier wave to obtain a modulated signal on the basis of data for transmission supplied thereto from the control judging section 314. The antenna driver/receiver 316 drives the X-axis antenna array 320, the Y-axis antenna array 321 by power-amplifying this modulated signal.

Meanwhile, in the reception mode, the information forwarder 313 supplies a carrier wave to the antenna driver/receiver 316 without modulation, and the antenna driver/receiver 316 power-amplifies this wave to drive the X-axis antenna array 320, the Y-axis antenna array 321.

The antenna array switcher 317 switches between the X-axis antenna array 320 and the Y-axis antenna array 321 for driving. That is, an antenna array selected by the antenna array switcher 317 is to be driven by the antenna driver/receiver 316.

In the transmission mode, the X-axis antenna array 320, the Y-axis antenna array 321 form an electromagnetic field based on the modulated signal, while in the reception mode, they form an electromagnetic field based on the carrier wave, and are inductively coupled with the coil antenna 241 on the memory tag 208 side via the electromagnetic field irrespective of a mode.

The information detector 315 has an antenna terminal voltage detecting function and a demodulating function.

The control judging section 314 has an encoding/decoding function, an operation control function as this reader/writer function, and an interfacing function with a desk controller 310.

In the transmission mode, the control judging section 314 organizes information for transmission to be forwarded to the memory tag 208 side on the basis of a signal received from the desk controller 310.

The information forwarder 313 modulates a carrier wave on the basis of this information for transmission, and the antenna driver/receiver 316 power-amplifies the modulated signal and drives the X-axis antenna array 320 or the Y-axis antenna array 321 selected by the antenna array switcher 317. By this operation, an electromagnetic field based on the carrier wave carrying the information for transmission is formed, and this electromagnetic field gives the information for transmission to the memory tag 208, and at the same time, supplies power thereto.

Even in the reception mode, the information forwarder 313 outputs the unmodulated carrier wave having no information carried thereon, and the antenna driver/receiver 316 drives the X-axis antenna array 320 or the Y-axis antenna array 321 selected by the antenna array switcher 317 to continuously form an electromagnetic field. This electromagnetic field continues supplying power to the memory tag 208, and also allows a response from the memory tag 208 to be detected.

Here, the memory tag 208 has changed either the load condition of its coil antenna 241 at the memory tag 208 side or its power load at the memory tag 208 side. Then, since an antenna of the X-axis antenna array 320 or the Y-axis antenna array 321 is in an inductively coupled state with the coil antenna 241 on the memory tag 208 side, an antenna terminal voltage of the X-axis antenna array 320 or the Y-axis antenna array 321 varies responsive to the load change on the memory tag 208 side. The information detector 315 detects and demodulates this terminal voltage variation, and delivers the demodulated signal to the control judging section 314. The control judging section 314 corrects errors, reconstructs a response therefrom, and forwards the reconstructed response to the desk controller 310 and a card position detector 312.

Having such configuration and operation, the editing desk 300 is to function as the reader/writer with respect to the memory tag 208 of any editing card 200 placed on its editing surface 301.

In addition to the above-mentioned configuration of the reader/writer function, the editing desk 300 includes the desk controller 310, the card position detector 312, an EDL (EDit List) creator 311, and an external interface 304. Furthermore, as shown in FIG. 4 above, the editing desk 300 includes the operation section 302 and the display 303.

The desk controller 310 is formed of, e.g., a microcomputer having a CPU, a ROM, a RAM, and the like, and controls the whole of the editing desk 300.

That is, the desk controller 310 instructs the control judging section 314 to execute the above-mentioned noncontact wireless communication. Also, the desk controller 310 controls the antenna array switcher 317 to select the X-axis antenna array 320 or the Y-axis antenna array 321 as an antenna for function.

Furthermore, the desk controller 310 causes the display 303 to execute predetermined display for presentation to the editing operator.

Still furthermore, the desk controller 310 executes predetermined control responsive to operation input from the operation section 302.

While a switching control signal with respect to the antenna array switcher 317 is inputted, the card position detector 312 recognizes whether the antenna selected by the antenna array switcher 317 is the X-axis antenna array 320 or the Y-axis antenna array 321. Then, the card position detector 312 receives information about an electric field strength received from the information detector 315, and information (card ID) detected in the control judging section 314 as a response from an editing card 200.

While the X-axis antenna array 320 is in function, the card position detector 312 judges an X-direction position on the editing surface 301 of an editing card 200 with which noncontact wireless communication is executed, from the information about the electric field strength received.

While the Y-axis antenna array 321 is in function, the card position detector 312 judges a Y-direction position on the editing surface 301 of the editing card 200 with which noncontact wireless communication is executed, from the information about the electric field strength received.

By this operation, when having received a card ID from a certain editing card 200, the card position detector 312 detects the XY coordinate positions on the editing surface 301 of the editing card 200, and notifies the desk controller 310 of this position information.

The EDL creator 311 creates edit data (edit list) based on the card IDs of editing cards 200 according to an arranging sequence of the editing cards 200 in the horizontal/vertical directions on the editing surface 301, detected by the card position detector 312.

The external interface 304 performs communication processing with other equipment such as, e.g., the nonlinear editor 100 cable-connected via the connection terminal 304a shown above in FIG. 4. The external interface 304 is constructed of, e.g., as a USB interface circuit, or an IEEE interface circuit.

The desk controller 310 can transmit, e.g., the edit data (edit list) created by the EDL creator 311 to the nonlinear editor 100 and the like by communication via the external interface 152.

[II-5. XY Scan by Editing Desk]

As described above, the editing desk 300 can function as a reader/writer with respect to the memory tag 208 of an editing card 200. The editing desk 300 detects a sequence of the editing cards 200 arranged on its editing surface 301.

Let it be supposed that the editing cards 200 are arranged on the editing surface 301 as shown in, e.g., FIG. 12A. Then, the editing desk 300 recognizes that the editing cards 200 have their incorporated memory tags 208 arrayed as shown in FIG. 12B, and judges their arranging sequence by detecting the respective memory tags 208.

For purposes of illustration, let the card IDs stored in these memory tags 208 be #1, #2 . . . #6 as shown in the figure.

Figure 13A:
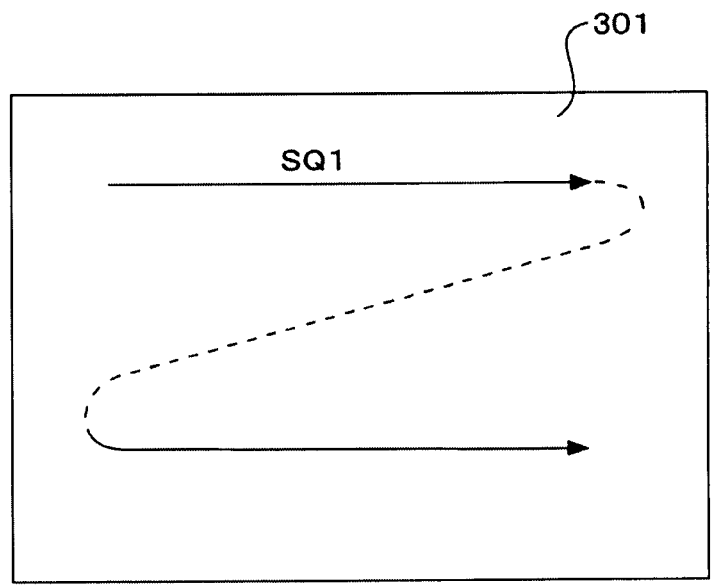
FIGS. 13A, 13B are diagrams illustrating a time sequence on an editing surface of the editing desk according to the embodiment.

Planewise (in XY directions), their arranging sequence is set as shown by an arrow SQ1 in, e.g., FIG. 13A. That is, assuming upper left as a top and, the sequence forwarding from upper line to lower line is directed toward lower right is supposed to be a time sequence.

Figure 13B:
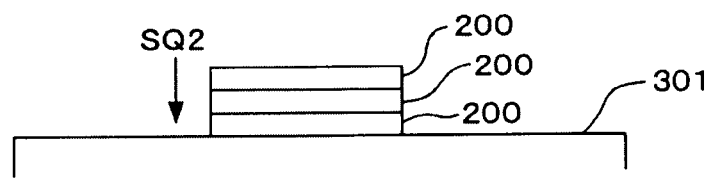

Meanwhile, in a pile of the editing card 200, their time sequence is supposed to forward from top to bottom as shown by an arrow SQ2 in FIG. 13B.

The editing operator, recognizing such sequences, may arrange the editing cards 200 randomly, with a time sequence of clips represented by these editing cards 200 in mind.

Of course, the sequences shown above in FIGS. 13A, 13B are merely one example. The editing operator can arbitrarily decide on how the editing cards 200 are arranged planewise, such as how many lines on the editing surface, and how many editing cards 200 along each line.

First, judgment on arrangement position of the planewise direction is described here.

The X-axis antenna array 320 and the Y-axis antenna array 321 are formed as shown in FIGS. 11A-11C. By detecting electric field strengths obtained when the antenna arrays 320, 321 have been driven, the card position detector 312 judges the arrangement position of the editing card 200 (in terms of XY coordinate positions).

Figure 14A:
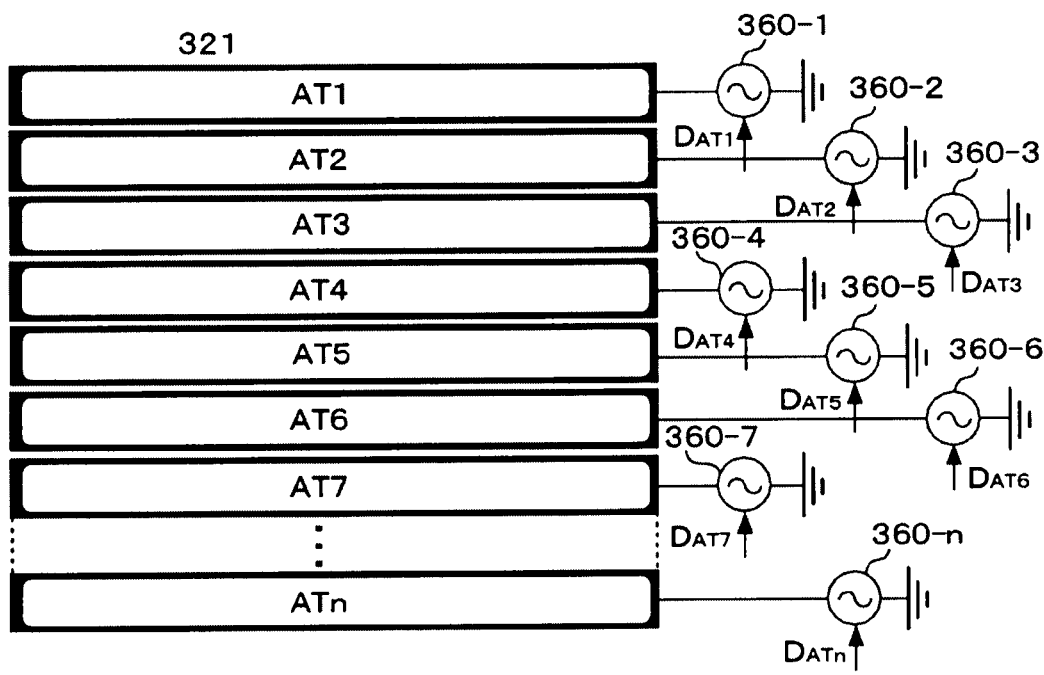
FIGS. 14A, 14B are diagrams illustrating a scan operation by the editing desk according to the embodiment.
Figure 14B:
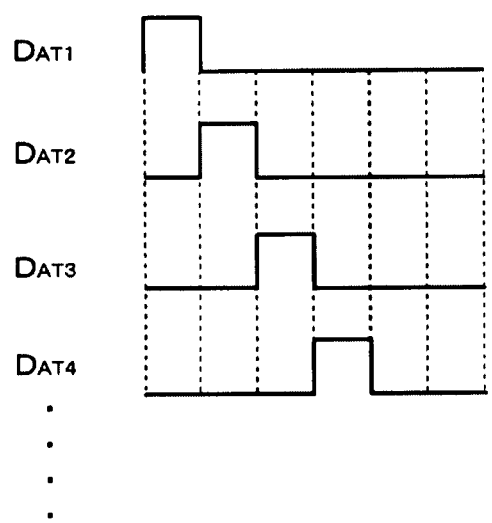

Referring to FIGS. 14A, 14B, a case of driving the Y-axis antenna array 321 will be described as an example.

As shown in FIG. 14A, let the Y-axis antenna array 321 include antennas AT1, AT2, AT3 . . . ATn.

Also, driving signal sources are denoted 360-1, 360-2, 360-3 . . . 360-n for the antennas AT1, AT2, AT3 . . . ATn, respectively. These driving sources schematically represent a configuration inside the information forwarder 313 and the antenna driver/receiver 316 of FIG. 10.

Driving signals are sequentially applied to the corresponding antennas at different phases, respectively.

That is, these antennas are sequentially driven such that the driving signal source 360-1 of the antenna AT1 is drive-controlled by a driving control signal DAT1 of FIG. 14B, the driving signal source 360-2 of the antenna AT2 is drive-controlled by a driving control signal DAT2, the driving signal source 360-3 of the antenna AT3 is drive-controlled by a driving control signal DAT3, and so on.

If the editing cards 200 are arranged in a first and a second lines on the editing surface 301 as shown in FIG. 12A, card IDs are read from the corresponding memory tags 208 at certain antenna driving timings. The electric field strength detected when a response is obtained from a memory tag 208 becomes maximum when an antenna that is nearest to that memory tag 208 is driven.

Let it be supposed that three memory tags 208 (editing cards 200) whose card IDs #1, #2, #3 shown in FIG. 12B are arranged nearest to the antenna AT2 as viewed in the Y direction.

Let it also be supposed that three memory tags 208 (editing cards 200) whose card IDs #4, #5, #6 are arranged nearest to the antenna AT7 as viewed in the Y direction.

In noncontact wireless communication, communication can be executed at a certain distance, although depending on how the communication capable distance is set. Accordingly, if the antennas are driven in order of, e.g., the antenna AT1 onwards, an electric field strength during reception of responses from which the card IDs #1, #2, #3 to be detected becomes maximum when the antenna AT2 is driven.

Likewise, an electric field strength during reception of responses from which the card IDs #4, #5, #6 are detected becomes maximum when the antenna AT7 is driven.

That is, the card position detector 312 judges the driving timings of the antennas AT1, AT2 . . . , electric field strengths at these timings, and the received card IDs at the time the Y-axis antenna array 321 is driven, thereby judging a Y-direction position (Y coordinate value) of each received card ID.

For example, upon completion of the driving of all the antennas AT1 to ATn, it can be judged that the editing cards 200 whose card IDs are #1, #2, #3 are positioned at a Y coordinate value corresponding to the antenna AT2, and that the editing cards 200 whose card IDs are #4, #5, #6 are positioned at a Y coordinate value corresponding to the antenna AT7.

It is noted that the antennas are driven in a sequence of the antennas AT1→AT2→AT3 ... in this example. However, any antenna driving sequence may be acceptable, as long as the card position detector 312 can recognize which antenna is being driven during its judgment of an electric field strength.

Judgment is made similarly for the X-axis.

Although not shown, likewise for the X-axis antenna array 320, responses are received from the editing cards 200 and electric field strengths are judged while the antennas are sequentially driven. By this operation, correspondence between the card IDs and the X-axis coordinates can be detected.

In the case of, e.g., FIG. 12B, an X coordinate value as the arrangement position of the editing cards 200 whose card IDs are #1, #4, an X coordinate value as the arrangement position of the editing cards 200 whose card IDs are #2, #5, and an X coordinate value as the arrangement position of the editing cards 200 whose card IDs are #3, #6 can be judged.

Thus, by scanning with the X-axis antenna array 320 and the Y-axis antenna array 321, the card position detector 312 can judge the XY coordinate values for each card ID. By the card position detector 312 notifying the desk controller 312 of the XY coordinate values for the card ID, the desk controller 310 can recognize the arranging sequence (time-axis sequence of clips intended by the editing operator) of the editing cards 200 in the XY directions.

Here, another example of the antenna structure and XY coordinate judgment will be described.

Figure 15A:
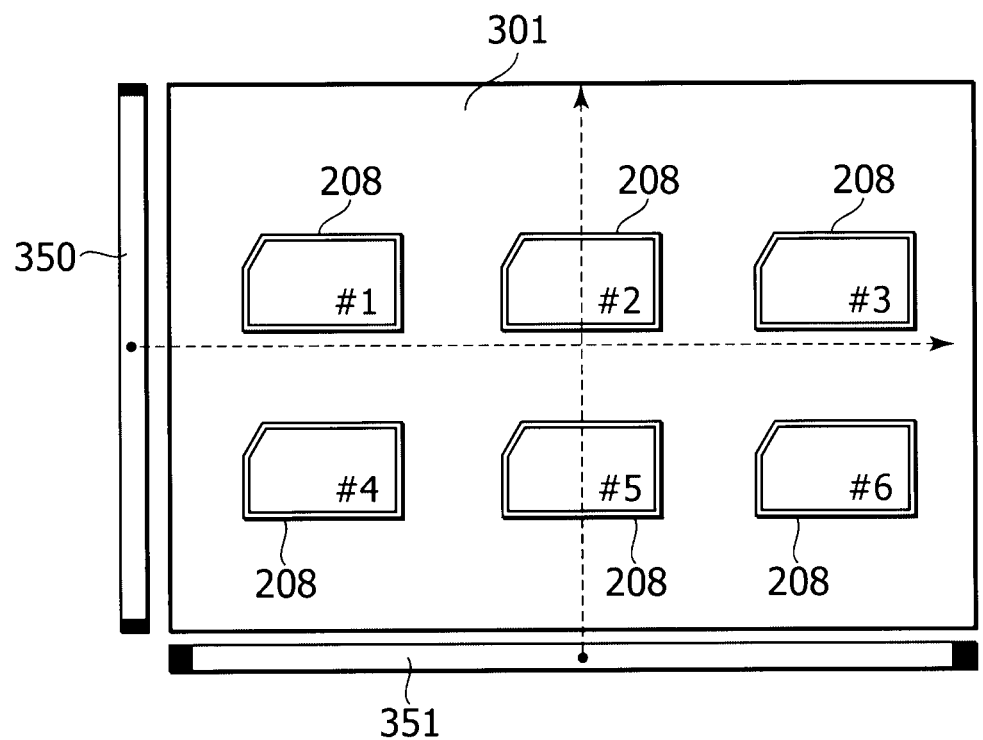
FIGS. 15A, 15B are diagrams illustrating another antenna structure of the editing desk according to the embodiment.
Figure 15B:
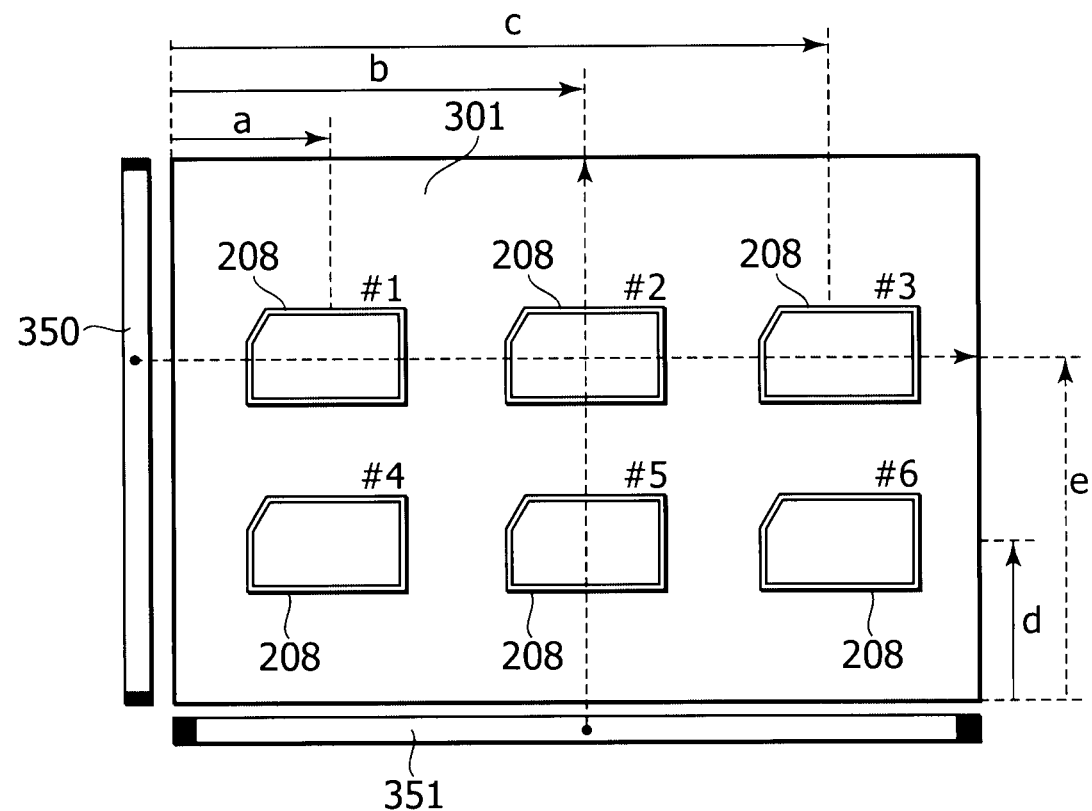

While the X-axis antenna array 320 and the Y-axis antenna array 321 are arranged immediately below the editing surface 301 in the above example, a structure may alternatively be employed, in which an X-axis antenna 350 and a Y-axis antenna 351 can be moved in directions indicated by arrows, respectively, as shown in, e.g., FIG. 15A.

That is, it is configured such that the X-axis antenna 350 is moved in the X-axis direction by a moving mechanism, not shown, and the Y-axis antenna 351 is moved in the Y-axis direction by a moving mechanism, not shown.

Let a state be considered in which memory tags 208 (editing cards 200) whose card IDs are #1-#6 are arranged on the editing surface 301 as shown in the drawing.

In the X direction, it is supposed that the editing cards 200 whose card IDs are #1, #4 are arranged at a position being a distance a from the origin of the X coordinates, the editing cards 200 whose card IDs are #2, #5 are arranged at a position being a distance b, the editing cards 200 whose card IDs are #3, #6 are arranged at a position being a distance c.

Likewise, in the Y direction, it is supposed that the editing cards 200 whose card IDs are #4, #5, #6 are arranged at a position being a distance d from the origin of the Y coordinates, and the editing cards 200 whose card IDs are #1, #2, #3 are arranged at a position being a distance e.

First, the electric field strength to be detected is depicted as shown in FIG. 16A when the X-axis antenna 350 is moved in the X direction as it is kept driven.

For example, at timings when scan positions in the X direction become the distances a, b, c, respectively, the maximum electric field strength is detected.

If it is supposed that the card IDs #1, #4 are detected at the scan timing corresponding to, e.g., the distance a, the X coordinate value of the two editing cards 200 whose card IDs are #1, #4 can be judged as "a".

Next, the electric field strength to be detected is depicted as shown in FIG. 16B when the Y-axis antenna 351 is moved in the Y direction as it is kept driven.

That is, at timings when scan positions in the Y direction become the distances d, e, respectively, the maximum electric field strength is detected.

If it is supposed that the card IDs #4, #5, #6 are detected at the scan timing corresponding to, e.g., the distance d, the Y coordinate value of the three editing cards 200 whose card IDs are #4, #5, #6 can be judged as "d".

Through such judgment, the card position detector 312 can finally judge XY coordinate values such as shown in FIG. 16C as corresponding to the card IDs, respectively.

Thus, even in the technique in which the X-axis antenna 350 and the Y-axis antenna 351 are configured to be movable and the electric field strengths are detected by scan-moving these antennas as they are kept driven, it becomes possible to judge the XY coordinate values (arrangement position in a plane) of each editing card 200, thereby allowing the desk controller 310 to recognize the arranging sequence (time-axis sequence of clips intended by the editing operator) of the editing cards 200 in the XY directions.

[II-6. Recognizing Pile of Editing Cards and Their Up-Down Communication]

Next, detection of a sequence of editing cards 200 piled on the editing desk 300 will be described.

Here, a technique will be described as an example, in which the editing desk 300 obtains a piling sequence of editing cards 200 from a lowermost editing card 200 in a pile of the editing cards 200. That is, it is not the editing desk 300 itself that directly detects the piling sequence of the editing cards 200, but it is the editing cards in the pile themselves that detect their self positions in the pile, and it is the lowermost editing card 200 that conveys a detection result to the editing desk 300.

It is noted that an editing card 200 is defined to be positioned lower as long as it is closer to the center of the Earth.

Figure 17A:
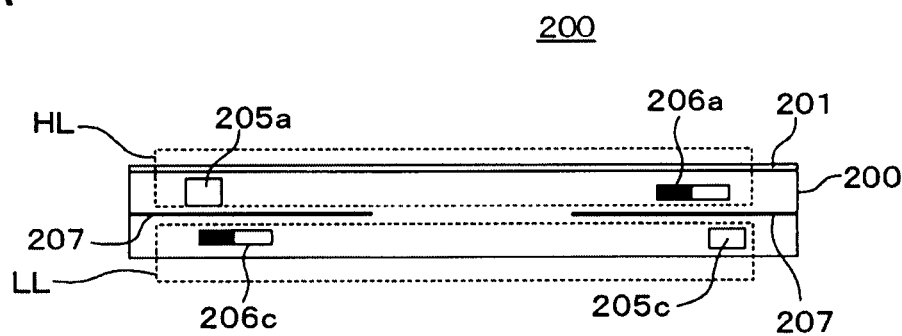
FIGS. 17A-17C are diagrams illustrating a configuration for detecting a pile of editing cards according to the embodiment.
Figure 17B:
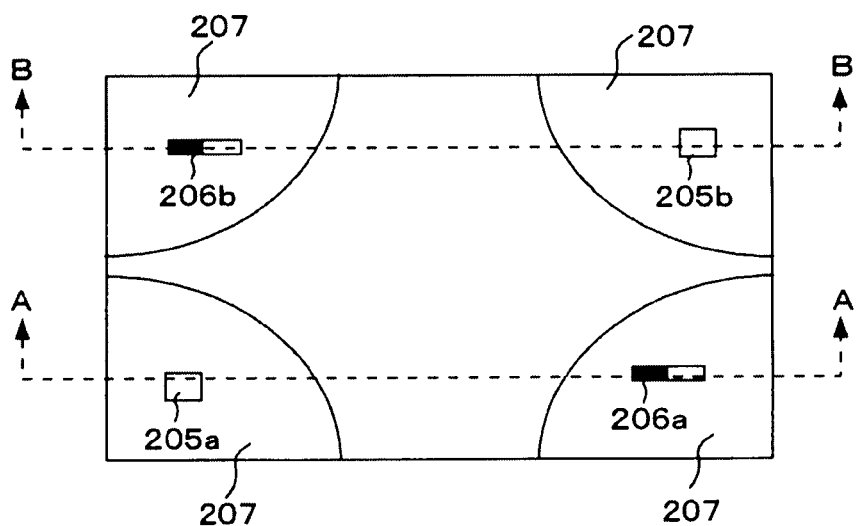
Figure 17C:
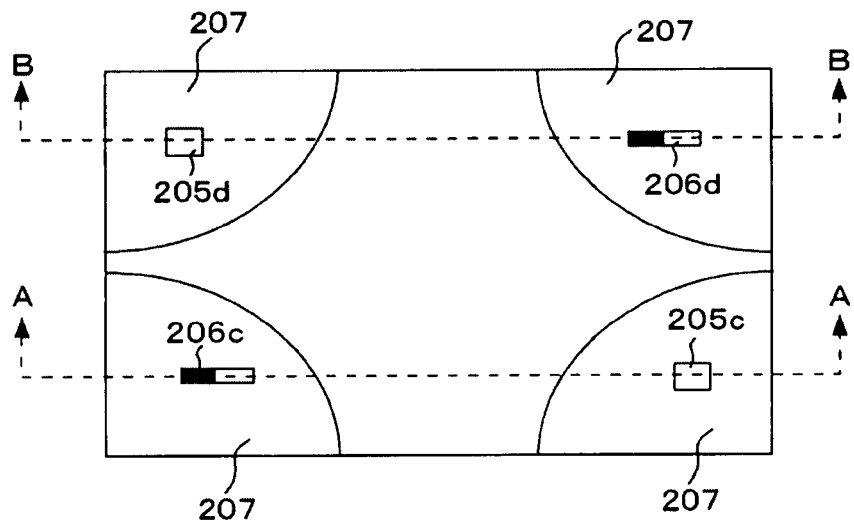

Referring to FIGS. 17A-17C, a structure will be described, for which an editing card 200 detects its position in a pile.

As described above with reference to FIG. 5C, the editing card 200 has Hall elements 205 and magnets 206 arranged at predetermined positions.

FIG. 17A is a schematic diagram of a sectional structure of the editing card 200 as viewed along a sectional line A-A shown in FIGS. 17B, 17C.

Inside the editing card 200, an upper layer HL and a lower layer LL are formed as viewed thicknesswise. The upper layer HL is closer to the electronic paper section 201, and the lower layer LL is closer to the bottom of the card.

FIG. 17B shows the upper layer HL and FIG. 17C shows the lower layer LL, both as viewed from top.

In order for the editing card 200 to detect other editing cards 200 placed above and/or below itself, the Hall elements 205 and the magnets 206 are arranged at predetermined positions in the upper layer HL and the lower layer LL, respectively.

Furthermore, in each of the upper layer HL and the lower layer LL, the magnetic shield plates 207, each being, e.g., a quadrant as viewed planewise, are placed at positions where the magnets 206 and the Hall elements 205 are arranged.

In the upper layer HL, magnets 206a, 206b and Hall elements 205a, 205b are fixed above their corresponding magnetic shield plates 207, respectively, as shown in FIG. 17B.

In the lower layer LL, magnets 206c, 206d and Hall elements 205c, 205d are fixed below their corresponding magnetic shield plates 207, respectively, as shown in FIG. 17C.

Thus, the four Hall elements 205a, 205b, 205c, 205d and the four magnets 206a, 206b, 206c, 206d are fixed in a single editing card 200.

Each of the Hall elements 205a, 205b, 205c, 205d detects the N/S pole of a corresponding magnet, converts into a corresponding dc voltage, and outputs the dc voltage to the read/write controller 212 of FIG. 7. When notified of information detected by the Hall elements 205a, 205b, 205c, 205d, the main controller 211 can judge whether or not other editing cards are placed above and/or below the self editing card 200 in the pile.

As shown in FIG. 17A, the magnet 206a of the upper layer HL and the Hall element 205c of the lower layer LL are fixed at vertically close positions. However, the magnet 206a and the Hall element 205c are magnetically shielded by the corresponding magnetic shield plate 207, thereby preventing the magnetism of the magnet 206a from interfering with the Hall element 205c.

Likewise, the magnetic shield plates 207 magnetically shield the magnet 206c from the Hall element 205a, the magnet 206b from the Hall element 205d, and the magnet 206d from the Hall element 205b, respectively.

Then, the Hall elements 205a, 205b in the upper layer HL serve to detect whether another editing card 200 is piled on a surface being the electronic paper section 201 side, while the Hall elements 205c, 205d in the lower layer LL serve to detect whether another editing card 200 is placed on the opposite surface (the bottom of the card) of the electronic paper section 201.

Figure 18A:
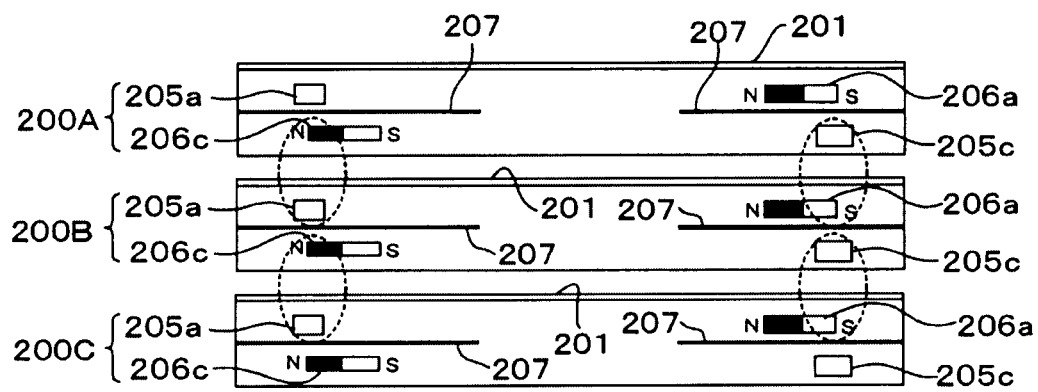
FIGS. 18A, 18B are diagrams illustrating an operation of detecting the pile of editing cards according to the embodiment.
Figure 18B:
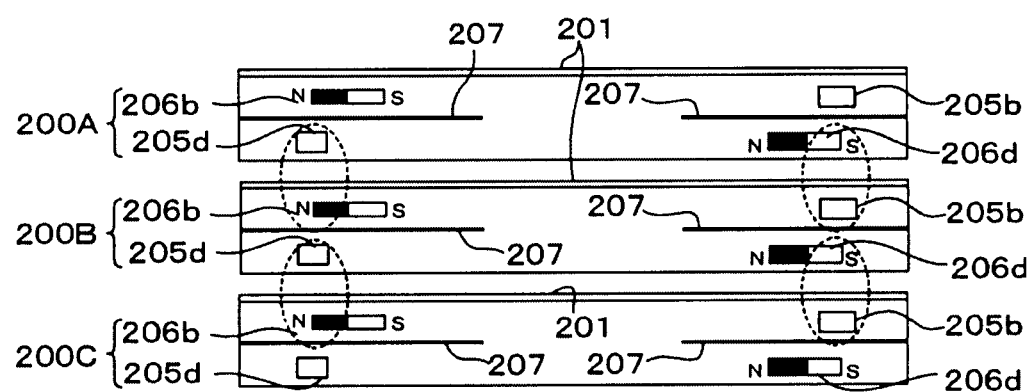

FIGS. 18A, 18B schematically show that three editing cards 200A, 200B, 200C are piled. FIG. 18A shows the editing cards as viewed from the sectional line A-A in FIGS. 17B, 17C, and FIG. 18B shows the editing cards as viewed from a sectional line B-B of FIGS. 17B, 17C.

As shown in FIGS. 18A, 18B, the Hall element 205c of the uppermost editing card 200A is close to the S pole of the magnet 206a of the editing card 200B placed therebelow, thereby outputting a voltage measured by detecting the S pole.

Also, the Hall element 205d of this editing card 200A is close to the N pole of the magnet 206b of the editing card 200B, thereby outputting a voltage measured by detecting the N pole.

Furthermore, the Hall elements 205a, 205b of this editing card 200A, finding no (magnets of any other) editing card 200 thereabove, detect no magnetism.

The Hall element 205c of the in-between editing card 200B is close to the S pole of the magnet 206a of the editing card 200C placed therebelow, thereby outputting the voltage measured by detecting the S pole.

Also, the Hall element 205d of this editing card 200B is close to the N pole of the magnet 206b of the editing card 200C, thereby outputting the voltage measured by detecting the N pole.

Furthermore, the Hall element 205a of this editing card 200B is close to the N pole of the magnet 206c of the editing card 200A placed thereabove, thereby outputting the voltage measured by detecting the N pole.

Furthermore, the Hall element 205b of this editing card 200B is close to the S pole of the magnet 206d of the editing card 200A, thereby outputting the voltage measured by detecting the S pole.

The Hall element 205a of the lowermost editing card 200C is close to the N pole of the magnet 206c of the editing card 200B placed thereabove, thereby outputting the voltage measured by detecting the N pole.

Also, the Hall element 205b of this editing card 200C is close to the S pole of the magnet 206d of the editing card 200B, thereby outputting the voltage measured by detecting the S pole.

Furthermore, the Hall elements 205c, 205d of this editing card 200C, finding no (magnets of any other) editing card 200 therebelow, detect no magnetism.

That is, the detected outputs from the four Hall elements 205a, 205b, 205c, 205d are as follows. The detected outputs from the Hall elements 205a, 205b, 205c, 205d are indicated in quotation marks (where "None" means nothing detected, "S" means the S pole detected, and "N" means the N pole detected)

Uppermost stage: "None" "None" "S" "N"
In-between position: "N" "S" "S" "N"
Lowermost stage: "N" "S" "None" "None"

Meanwhile, if the self editing card 200 is 180 degrees rotated planewise in the pile with respect to the editing cards 200, detected outputs are as follows.

Uppermost stage: "None" "None" "N" "S"
In-between position: "S" "N" "N" "S"
Lowermost stage: "S" "N" "None" "None"

On the basis of the above results detected by the Hall elements 205a, 205b, 205c, 205d, the main controller 211 of each of the editing cards 200 can judge whether the self editing card 200 is positioned uppermost, in between, or lowermost as a vertical position in the pile.

In summary, the main controller 211 of each editing card 200 can always judge, on the basis of the results detected by the Hall elements 205a, 205b, 205c, 205d, any of the following four states:

No editing card is piled ("None" in all detection results);
An editing card 200 is found only below (=uppermost in the pile);
Editing cards 200 are found both above and below (=in between in the pile);
An editing card 200 is found only above (=lowermost in the pile).

Figure 19A:
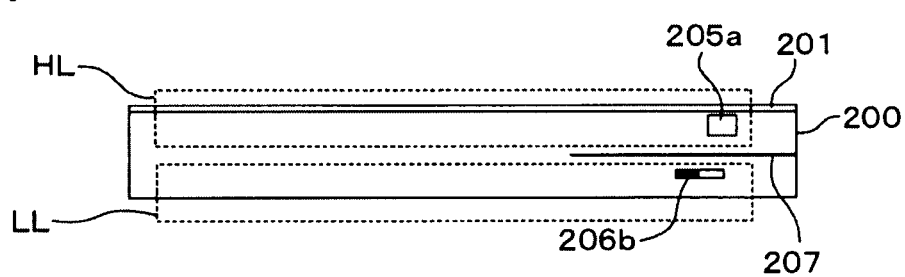
FIGS. 19A-19C are diagrams illustrating another configuration for detecting a pile of editing cards according to the embodiment.
Figure 19B:
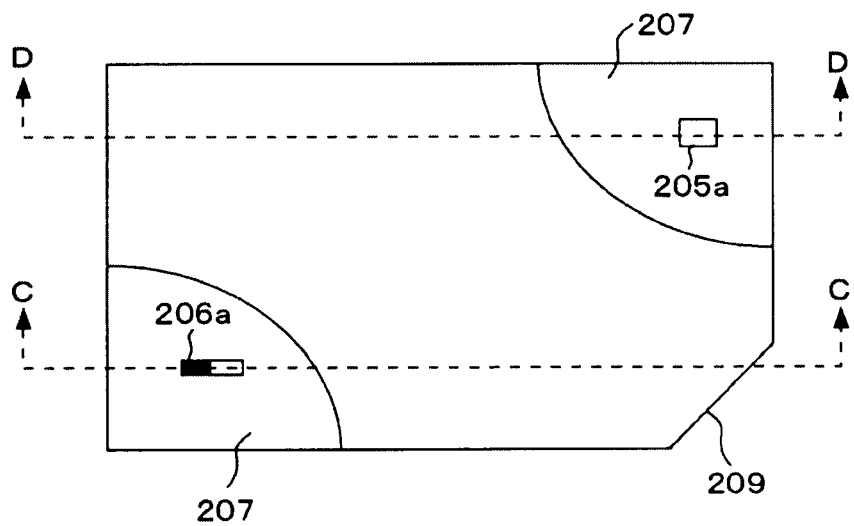
Figure 19C:
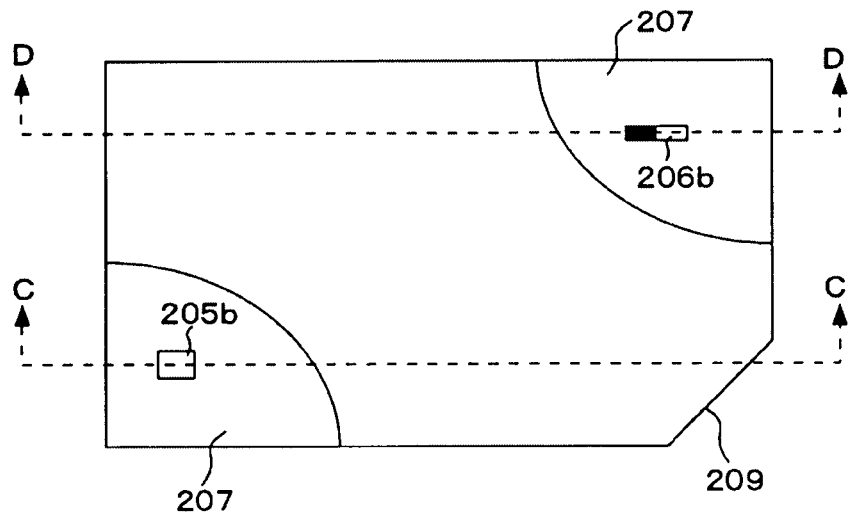

While a total of four Hall elements 205 and a total of four magnets 206 are used for a single editing card 200 in the example of FIGS. 17A-17C and 18A, 18B, another configuration in which two Hall elements 205 and two magnets 206 are used may alternatively be considered as shown in, e.g., FIGS. 19A-19C.

FIG. 19A is a schematic diagram of a sectional structure of an editing card 200 as viewed from a sectional line D-D shown in FIGS. 19B, 19C. FIG. 19B shows the upper layer HL and FIG. 19C shows the lower layer LL, both as viewed from top.

In this case, as shown in FIGS. 19B, 19C, the editing card 200 is shaped such that one of its four corners have a notch 209.

The editing operator piles editing cards 200 on the editing surface 301 such that their notches 209 overlap.

In the upper layer HL, a magnet 206a and a Hall element 205a are fixed at positions above their corresponding magnetic shield plates 207, respectively, as shown in FIG. 19B.

In the lower layer LL, a magnet 206b and a Hall element 205b are fixed at positions below their corresponding magnetic shield plates 207, respectively, as shown in FIG. 19C.

Thus, it is configured to fix the two Hall elements 205a, 205b and the two magnets 206a, 206b on a single editing card 200.

Then, the Hall element 205a in the upper layer HL serves to detect whether another editing card 200 is piled on a surface being the electronic paper section 201 side, while the Hall element 205b in the lower layer LL serves to detect whether another editing card 200 is placed on the opposite surface (the bottom of the card) of the electronic paper section 201.

Figure 20A:
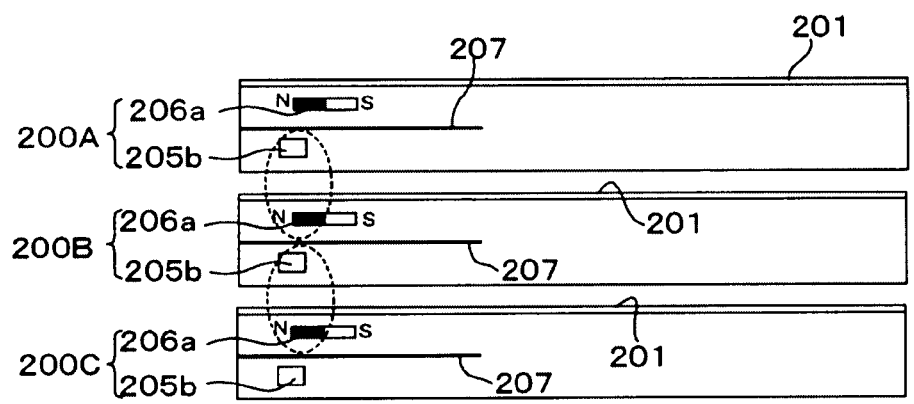
FIGS. 20A, 20B are diagrams illustrating another operation of detecting the pile of editing cards according to the embodiment.
Figure 20B:
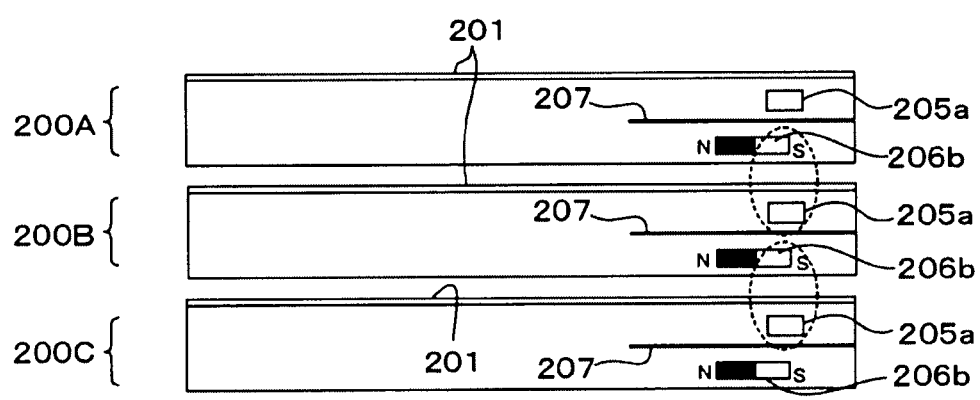

FIGS. 20A, 20B schematically show that three editing cards 200A, 200B, 200C are piled. FIG. 20A shows the editing cards as viewed from a sectional line C-C in FIGS. 19B, 19C, and FIG. 20B shows the editing cards as viewed from the sectional line D-D of FIGS. 19B, 19C.

As shown in FIGS. 20A, 20B, the Hall element 205b of the uppermost editing card 200A is close to the N pole of the magnet 206a of the editing card 200B placed therebelow, thereby outputting a voltage measured by detecting the N pole.

Also, the Hall element 205b of this editing card 200A, finding no (magnet of any other) editing card 200 thereabove, detects no magnetism.

The Hall element 205b of the in-between editing card 200B is close to the N pole of the magnet 206a of the editing card 200C placed therebelow, thereby outputting the voltage measured by detecting the N pole.

Also, the Hall element 205a of this editing card 200B is close to the S pole of the magnet 206b of the editing card 200A placed thereabove, thereby outputting a voltage measured by detecting the S pole.

The Hall element 205a of the lowermost editing card 200C is close to the S pole of the magnet 206b of the editing card 200B placed thereabove, thereby outputting the voltage measured by detecting the S pole.

Also, the Hall element 205b of this editing card 200C, finding no (magnet of any other) editing card 200 therebelow, detects no magnetism.

Supposing that the editing operator piles the editing cards by neatly overlapping their notches 209, whether these editing cards are positioned uppermost, in between, or lowermost in a pile, or not in a pile can be detected on the basis of the above results detected by the Hall elements 205a, 205b.

So far, the techniques have been described, in which an editing card 200 detects its own position in a pile. Then, communication between editing cards 200 in a pile will be described.

Between upper and lower editing cards 200 in a pile, communication is implemented to convey their card IDs by means of optical communication using their light emitters 203 and light receivers 202.

This optical communication is implemented in sequence from the uppermost to the lowermost ones of the editing cards 200.

Figure 21A:
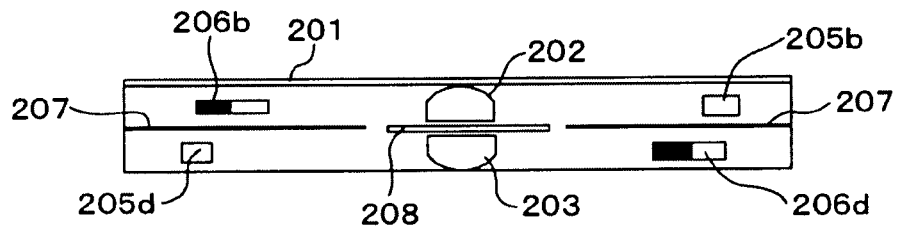
FIGS. 21A-21C are diagrams illustrating up-down communication between editing cards according to the embodiment.
Figure 21B:
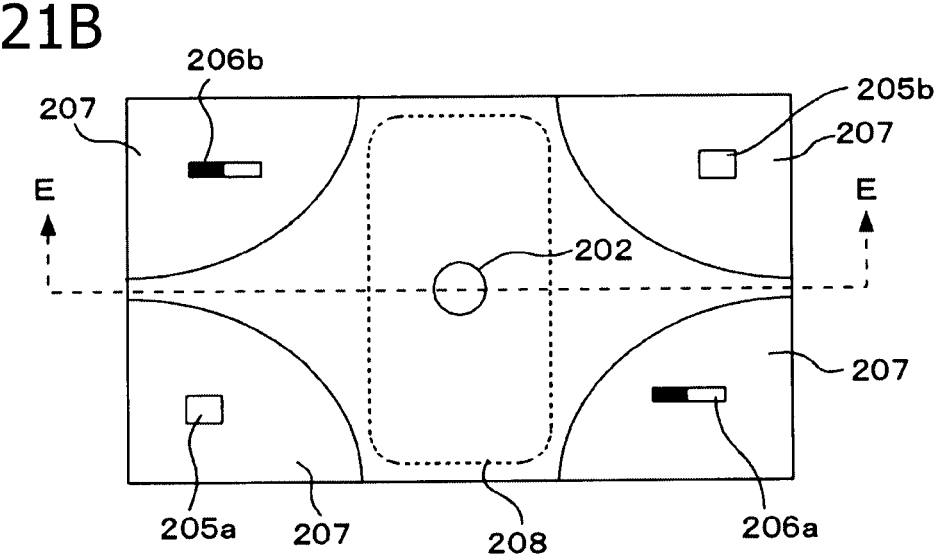

FIG. 21B schematically shows, similarly to FIG. 17B, the upper layer HL of an editing card 200 as viewed from top (with the light receiver 202 and the memory tag 208 added to FIG. 17B). FIG. 21A schematically shows a sectional structure taken along a sectional line E-E of FIG. 21B.

The light receiver 202 is placed face-up at a substantially middle position on the electronic paper section 201 side of the editing card 200, while the light emitter 203 is placed face-down at a substantially middle position on the bottom side of the card.

Figure 21C:
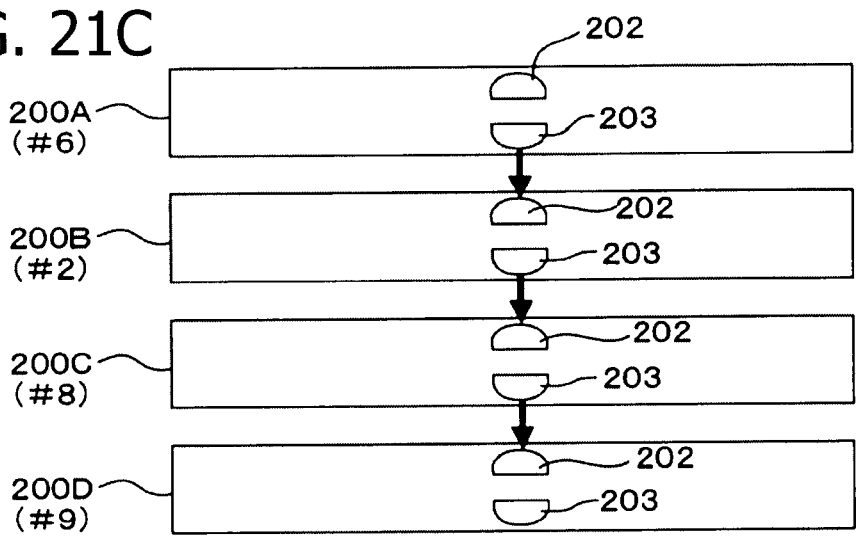

FIG. 21C shows light receivers 202 and light emitters 203 in a pile of four editing cards 200A, 200B, 200C, 200D.

The editing cards 200A, 200B, 200C, 200D are supposed to have card IDs #6, #2, #8, #9, respectively.

In this case, the uppermost stage editing card 200A informs the editing card 200B placed therebelow of its own card ID (#6) by optical communication from its light emitter 203.

The editing card 200B senses an optical signal through its light receiver 202, thereby recognizing that the card ID of the editing card 200A placed thereabove is #6.

Then, the editing card 200B informs the editing card 200C placed therebelow of the card ID (#6) of the editing card 200A and its own card ID (#2) by optical communication from its light emitter 203.

The editing card 200C senses an optical signal through its light receiver 202, thereby recognizing that the card IDs of the two editing cards 200A, 200B placed thereabove are #6 and #2.

Then, the editing card 200C informs the editing card 200D placed therebelow of the card ID (#6) of the editing card 200A, the card ID (#2) of the editing card 200B, and its own card ID (#8) by optical communication from its light emitter 203.

The lowermost editing card 200D senses an optical signal through its light receiver 202, thereby recognizing that the card IDs of the three editing cards 200A, 200B, 200C placed thereabove are #6, #2, #8.

In a case where the self editing card is the lowermost one, the editing card adds its own card ID to the card IDs of the editing cards placed thereabove in a descending piling sequence on the basis of this received information, and thus sets piling sequence information.

That is, in this case, the lowermost editing card 200D recognizes that the four editing cards 200A, 200B, 200C, 200D in the pile including itself have their card IDs #6, #2, #8, #9, and that their time sequence (time sequence intended by the editing operator) is "#6→#2→#8→#9", and sets this as response data for noncontact wireless communication with the editing desk 300.

As mentioned above, the editing desk 300 judges the sequence of the editing cards 200 arranged in the horizontal direction as the sequence of their card IDs during scan in the XY directions with the X-axis antenna array 320, the Y-axis antenna array 321. The lowermost editing card 200D in the pile transmits information about a card ID sequence of "#6→#2→#8→#9" in the whole pile, to the editing desk 300.

By this operation, the editing desk 300 can recognize a piling sequence of a block of piled editing cards 200, along with where the block is found in a planewise arranging sequence.

It is noted that optical communication between upper and lower editing cards 200 may be implemented as transfer of packet data having a format such as shown in, e.g., FIGS. 22A-22D.

Figure 22A:
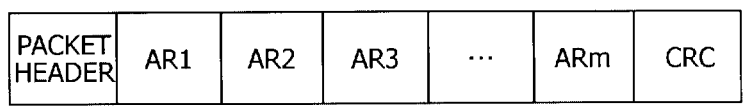
FIGS. 22A-22D are diagrams illustrating a packet format for the up-down communication of editing cards according to the embodiment.

A packet has a format including a packet header followed by data areas AR1, AR2 . . . ARm, and a CRC parity, as shown in FIG. 22A.

The packet header contains information such as a packet identifier, a packet length, and the positions of the respective data areas.

The editing cards 200 use respective ones of the data areas AR1, AR2 . . . ARm in turn so that a self editing card informs the next editing card 200 of its card ID.

Figure 22B:
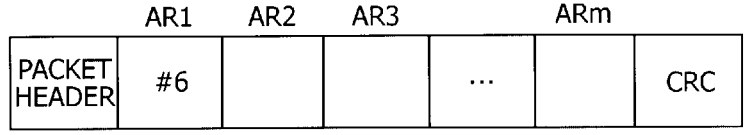

In the case of, e.g., FIG. 21C, the uppermost editing card 200A generates a packet in which its card ID (#6) is added to the data area AR1 as data as shown in FIG. 22B, and optically transmits this packet data to the editing card 200B.

Figure 22C:
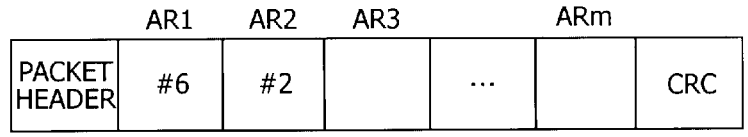

The editing card 200B having received this packet data of FIG. 22B then adds its card ID (#2) to the data area AR2 as data, and optically transmits a packet data of FIG. 22C to the editing card 200C.

Figure 22D:
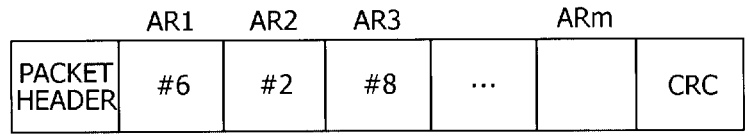

The editing card 200C having received this packet data of FIG. 22C then adds its card ID (#8) to the data area AR3 as data, and optically transmits a packet data of FIG. 22D to the editing card 200D.

The lowermost editing card 200D can recognize the time sequence of "#6→#2→#8→#9" including its card ID (#9) by receiving the packet data of FIG. 22D.

[II-7. Editing Procedure]

A procedure for animation editing operation using the editing system according to this example will be described.

FIG. 23 shows a procedure for editing operation using the nonlinear editor 100, card binder 150, editing cards 200, and editing desk 300 described above, as steps ST1 to ST8.

Step ST1 shows operation of preparing clips before using the system according to this example.

First, the master editing machine (nonlinear editor 100) sets IN points and OUT points for the clips.

Figure 24:
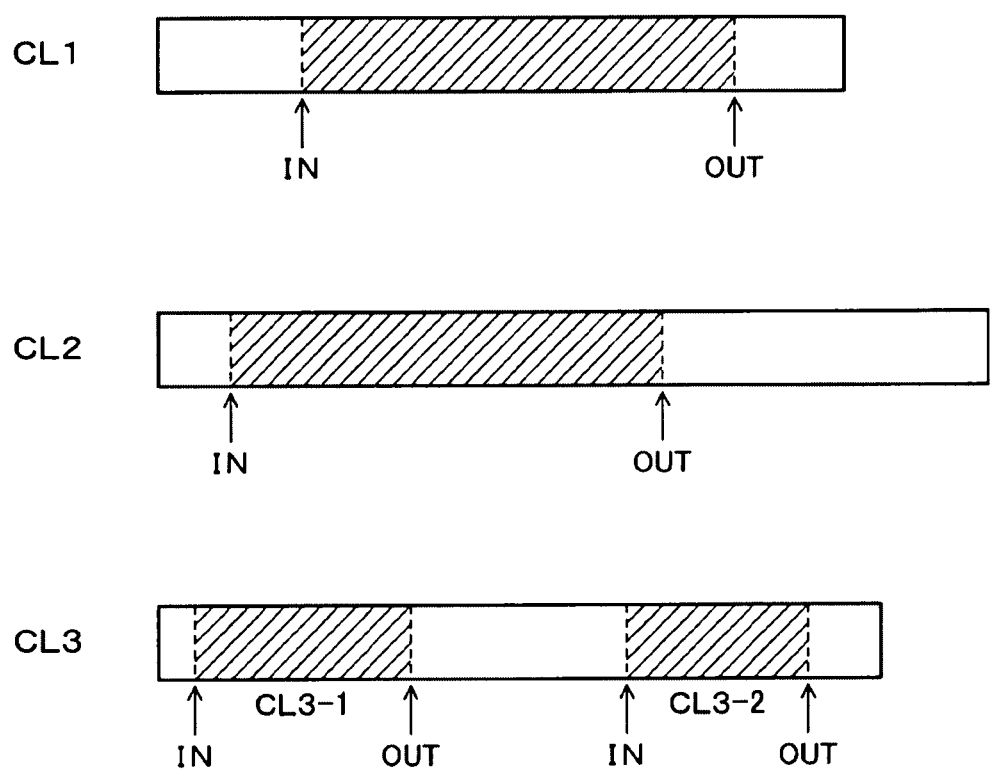
FIG. 24 is a diagram illustrating clip editing according to the embodiment.

For example, FIG. 24 shows clips CL1, CL2, CL3 as video materials. For each of such video materials, cut-editing is performed to cut out a segment (shaded segment) used for video content from an IN point to an OUT point.

It is noted that for a single clip, not only a single IN point and a single OUT point maybe set, but plural IN points and plural OUT points may also be set, such as for the clip CL3 from which two clips CL3-1, CL3-2 are cut out.

In any case, a cut-edited clip (video in the shaded portion) is used as single unit video for editing with an editing card 200 according to this example.

After having set many clips each being unit video from an IN point to an OUT point, the nonlinear editor 100 then downloads each clip information to a corresponding one of editing cards 200 in step ST2.

What is contained in the clip information may be various. Here, the clip information may contain, as one example, a clip number (clip identifier), time codes at the IN/OUT points, and thumbnail pictures of frames at the IN/OUT points.

In this case, the card binder 150 is connected to the nonlinear editor 100 with a predetermined number of editing cards 200 attached to the card binder 150. Then, each editing card 200 has corresponding clip information downloaded from the nonlinear editor 100 via the card binder 150. If cut-edited as shown in, e.g., FIG. 24, clip information about the clip CL1 is downloaded to a single editing card 200, clip information about the clip CL2 is downloaded to a single editing card 200, clip information about the clip CL3 is downloaded to a single editing card 200, clip information about the clip CL3-1 is downloaded to a single editing card 200, and clip information about the clip CL3-2 is downloaded to a single editing card 200.

Each editing card 200 makes, when having the clip information downloaded thereto, a display such as shown in FIG. 5A on its electronic paper section 201, representing the contents of the clip.

In step ST3, the editing operator arranges such editing cards 200 one after another in the horizontal and/or vertical directions on the editing desk 300, in an intended sequence.

After having finished arranging the editing cards 200 as intended, the editing operator instructs the editing desk 300 to read their arranging sequence.

The editing desk 300 reads, in step ST4, the sequence of the editing cards 200 arranged in the horizontal and/or vertical directions on the editing surface 301.

Then, instep ST5, the editing desk 300 creates edit data (EDL) on the basis of the read time sequence, and uploads the created edit data to the nonlinear editor 100.

The editing operator checks an edit result in step ST6. For example, by causing the nonlinear editor 100 to play back video on the basis of the edit data uploaded from the editing desk 300, the editing operator checks the video. That is, the editing operator checks the edit result by playing back video content in which many clips are joined together in the sequence specified by the edit data.

If the editing operator judges as OK for the edit result in step ST7, the series of editing operations is terminated. The video content as complete packet data has been generated in the nonlinear editor 100.

If the editing operator does not OK the edit result, the process proceeds to step ST8. The operator judges whether or not any IN/OUT points need be changed for a certain clip at step ST8. If there is no need to change the clip itself, the editing operator redoes the operations from step ST3. That is, using the editing cards 200 as they are, the editing operator re-considers their sequence on the editing desk 300.

If wishing to change IN/ OUT points for any clip itself, the editing operator redoes the operations from step ST1.

[II-8. Clip Downloading Operation to Editing Cards]

The above is the procedure for the series of editing operations.

Here, operations by various equipment during downloading of clip information to the editing cards 200 in step ST2 of FIG. 23 will be described.

Figure 25:
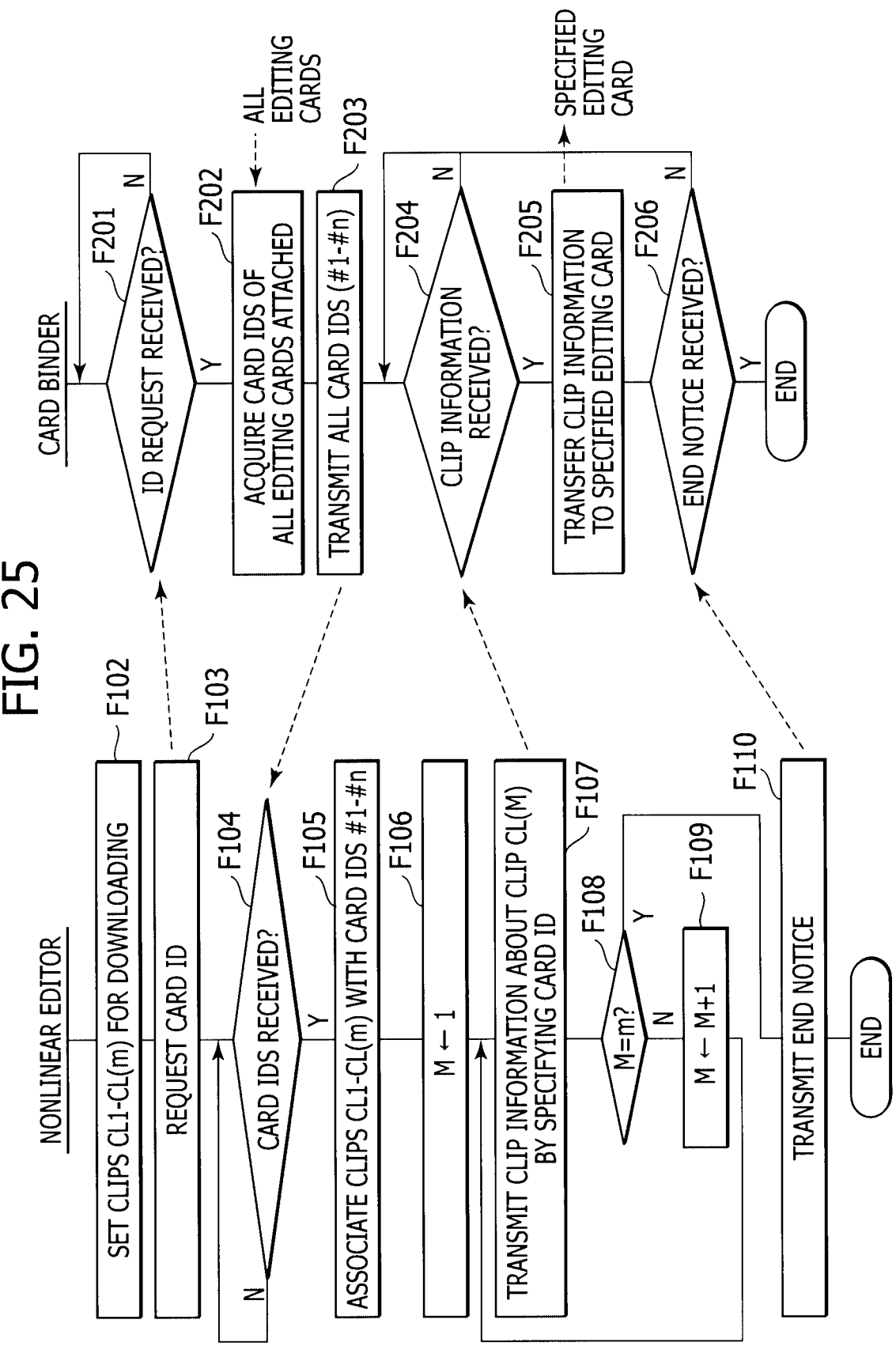
FIG. 25 is a flowchart for clip downloading processing according to the embodiment.

FIG. 25 shows example processing during downloading of clip information performed by the NLE controller 101 of the nonlinear editor 100 and the binder controller 151 of the card binder 150.

First, on the nonlinear editor 100 side, the editing operator selects a plurality of clips for which IN points and OUT points have been set, e.g., in step ST1 of FIG. 23, and instructs downloading of their clip information.

Responsive thereto, first in step F102, the NLE controller 101 of the nonlinear editor 100 sets the selected clips for which the clip information is to be downloaded, as clips CL1-CLm. For example, the NLE controller 101 sets each unit video from an IN point to an OUT point as a single clip for downloading.

Then, in step F103, the NLE controller 101 transmits ID request information to the card binder 150, requesting the card binder 150 to transmit card IDs of all editing cards 200 attached to the card binder 150.

When having received the ID request information, the binder controller 151 of the card binder 150 proceeds from step F201 to step F202, and acquires the card IDs of all the attached editing cards 200.

For example, the binder controller 151 communicates with the main controllers 211 of many attached editing cards 200 one after another to have their card IDs reported thereto, thereby capturing their card IDs in the memory 153.

This operation allows the binder controller 151 to store the card IDs of the editing cards 200 connected to the connectors 154, in the memory 153 by association with connector numbers, respectively.

It is noted that the binder controller 151 may read, particularly at the time no ID request information is received from the nonlinear editor 100, e.g., every time an editing card 200 is attached to a connector 154, a card ID from the editing card 200, and store the read card ID in the memory 153 by association with a connector number.

When having acquired the card IDs of all the attached editing cards 200, the binder controller 151 transmits all the card IDs to the nonlinear editor 100 in step F203.

When having received the card IDs, the NLE controller 101 of the nonlinear editor 100 proceeds from step F104 to step F105, and associates the respective card IDs with the m clips set for downloading in step F102.

It is supposed, e.g., that eight clips CL1-CL8 are set for downloading. It is also supposed that the card binder 150 has ten editing cards 200 attached thereto, and that ten card IDs #1-#10 are reported from the binder controller 151.

The NLE controller 101 associates the card IDs with the clips CL1-CL8, respectively. As shown in, e.g, FIG. 26, the NLE controller 101 associates the card ID #1 with the clip CL1, the card ID #2 with the clip CL2, the card ID #3 with the clip CL3, and so on, and stores this association information.

If no editing card 200 is attached to the card binder 150, or if only a number of editing cards 200 smaller than the number of clips set for downloading is attached, the NLE controller 101 may notify the operator of an error, requesting the operator to attach enough editing cards 200 for the current downloading, to the card binder 150.

After having finished association such as shown in, e.g., FIG. 26, the NLE controller 101 starts downloading the clip information in step F106 or in thereafter step.

First, in step F106, the NLE controller 101 sets a variable M=1.

Then, in step F107, the NLE controller 101 transmits clip information about a clip CL(M) to the card binder 150 by specifying a card ID associated with that clip. According to the example of FIG. 26, when the variable M=1, the NLE controller 101 transmits the clip information (information containing the clip number, IN-point time code, OUT-point time code, IN-point thumbnail picture, and OUT-point thumbnail picture) about the clip CL1 by specifying its card ID #1.

When having received the clip information in step F204, the binder controller 151 of the card binder 150 transfers the clip information to an editing card 200 specified by the card ID, in step F205. For example, the binder controller 151 transmits the clip information about the clip CL1 to the main controller 211 of an editing card 200 whose card ID is #1.

Thereafter, unless receiving an end notice in step F206, the binder controller 151 waits to receive next clip information in step F204.

After having finished transmitting single clip information, the NLE controller 101 checks the variable M and the number m of clips to see if the clip information has been transmitted for all the clips for downloading, in step F108.

If not, the NLE controller 101 increments the variable M in step F109, and then returns to step F107. Accordingly, the NLE controller 101 transmits clip information about the clip CL2 by specifying the card ID #2.

Responsive thereto, the binder controller 151 proceeds again from step F204 to step F205, where it transfers the clip information to an editing card 200 specified by the card ID. For example, the binder controller 151 transmits the clip information about the clip CL2 to the main controller 211 of an editing card 200 whose card ID is #2.

The operations in steps F107, F205 are repeated until the variable M equals the number m of clips for downloading in step F108.

Then, after having finished transmitting the clip information for the total m of clips CL1-CLm, the NLE controller 101 proceeds to step F110 to transmit an end notice to the binder controller 151, and terminate the downloading processing.

The binder controller 151 terminates its processing in response to receive of the end notice in step F206.

As a result of such processing of FIG. 25, the clip information about the plurality of clips CL1-CLm is downloaded to the corresponding ones of the editing cards 200 m, respectively.

Figure 27:
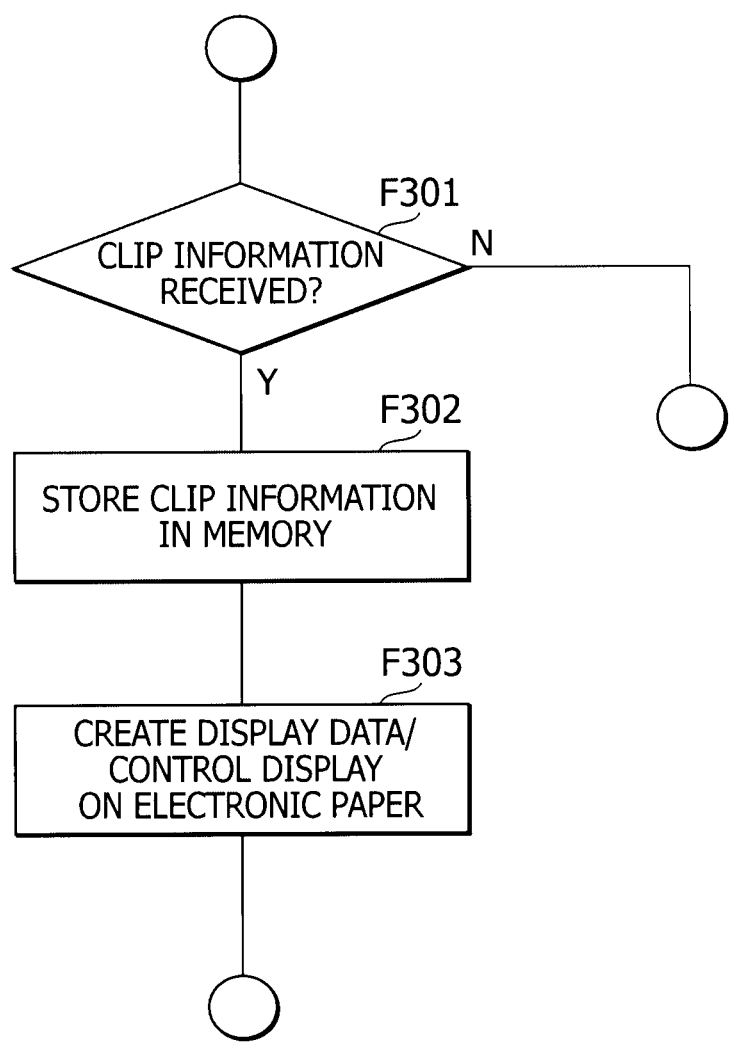
FIG. 27 is a flowchart for processing during reception of clip information by an editing card according to the embodiment.

In each of the editing cards 200, its main controller 211 performs processing of FIG. 27 when the clip information is transmitted thereto in step F205 by the binder controller 151.

That is, when having received the clip information, the main controller 211 proceeds from step F301 to step F302, and instructs the read/write controller 212 to store the received clip information in the memory 213.

Then, in step F303, the main controller 211 instructs the read/write controller 212 to read the clip number, IN-point time code, OUT-point time code, IN-point thumbnail picture, OUT-point thumbnail picture, as data for display among the clip information stored in the memory 213, and transfer the data to the display data creator 215 to create display data. Thereafter, the main controller 211 causes the electronic paper section 201 to execute display based on the display data.

As a result of this processing of FIG. 27, the editing card 200 executes display such as shown in FIG. 5A on the electronic paper section 201, representing a single clip to the editing operator.

By performing such processing when having received the clip information, each editing card 200 is brought to a state in which the editing card 200 represents a clip associated by the NLE controller 101.

Thereafter, the editing operator removes the editing cards 200 from the card binder 150. Then, in step ST3 described earlier with reference to FIG. 23, the editing operator arranges the editing cards 200 in the horizontal and/or vertical directions on the editing desk 300.

It is noted that the main controller 211 is configured to operate by the ON battery power supply 217 or by power supply of the card binder 150 when performing this processing of FIG. 27 (while attached to the card binder 150).

However, even if power supply by the battery power supply 217 is ON, after terminating the display on the electronic paper section 201 in step F303, the main controller 211 does not require operation power supply. Thus, the main controller 211 turns off the battery power supply 217.

The electronic paper section 201, capable of maintaining the display without being powered, need not be powered after the editing card 200 has been removed from the card binder 150. Thus, the battery power supply 217 may be turned off for the main controller 211.

[II-9. Operation During Editing by Editing Desk]

In step ST3 of FIG. 23, the editing operator starts arranging the editing cards 200 one after another while imaging video content he or she tries to produce. Then, upon deciding on a time sequence of the clips, the editing operator causes the editing desk 300 to read (judge an arranging sequence of the editing cards 200) in step ST4, thereafter to create edit data and upload the created edit data to the nonlinear editor 100 in step ST5.

Here, processing by the editing desk 300 and the editing cards 200 performed in steps ST4, ST5 of FIG. 23 will be described.

Figure 28:
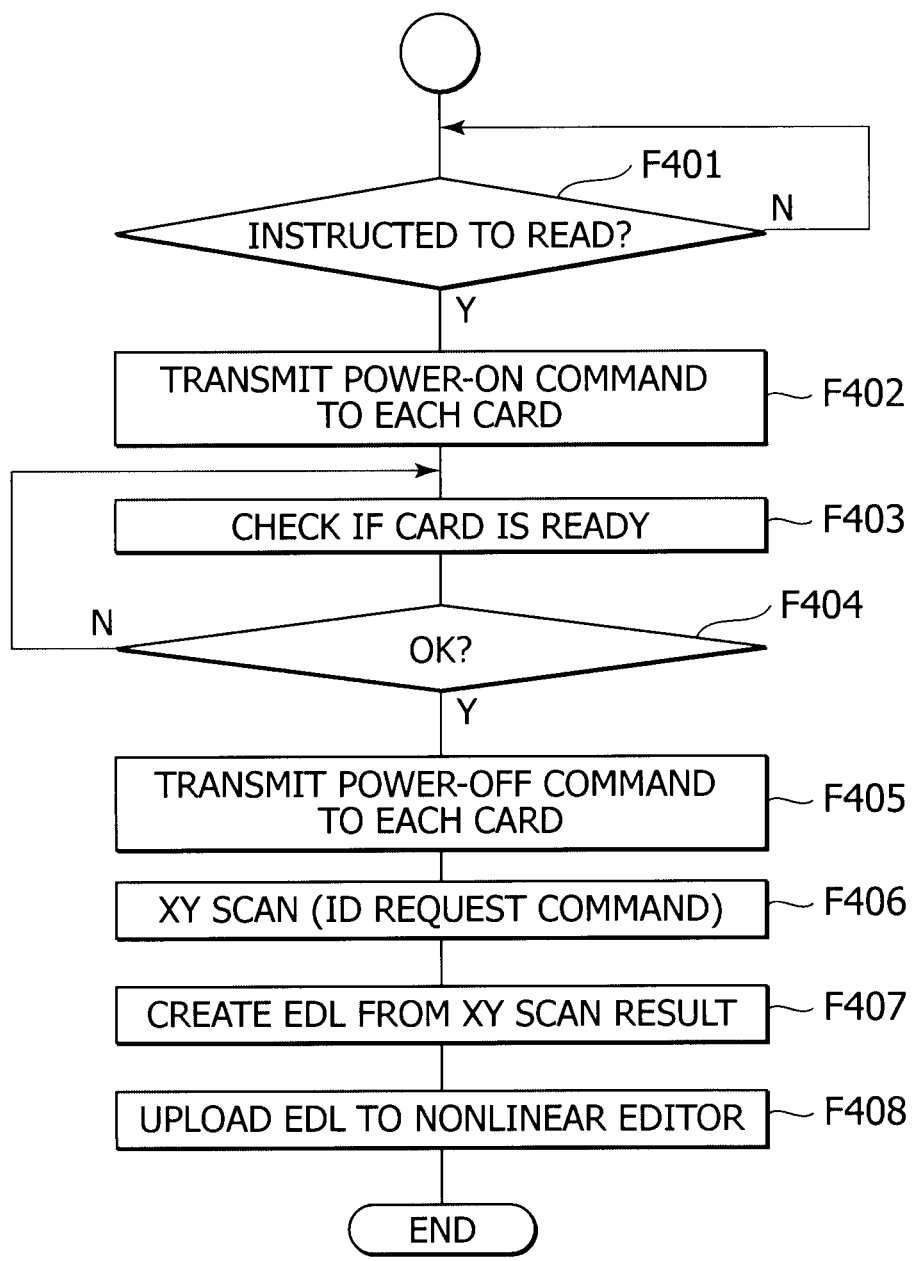
FIG. 28 is a flowchart for processing during editing by the editing desk according to the embodiment.

FIG. 28 shows processing performed by the desk controller 310 when the editing operator has finished arranging the editing cards 200 on the editing desk 300 and has instructed the editing desk 300 to read.

Responsive to the editing operator having instructed to read the arranging sequence of the editing cards 200 through the operation section 302, the desk controller 310 proceeds the processing of FIG. 28 from step F401 to step S402.

First, in step F402, the desk controller 310 causes the control judging section 314 to transmit a power-on command to the respective editing cards 200 on the editing surface 301 via noncontact wireless communication.

In this case, either the X-axis antenna array 320 or the Y-axis antenna array 321 is selected, all (or part of) the antennas of the selected antenna array are driven, so that the power-on command is transmitted to all the editing cards 200 on the editing surface 301.

Then, the desk controller 310, while transmitting a "check if ready" request command to all the editing cards 200 via noncontact wireless communication in step F403, waits until it checks that all the editing cards 200 are "ready" through their responses in step F404.

Figure 29:
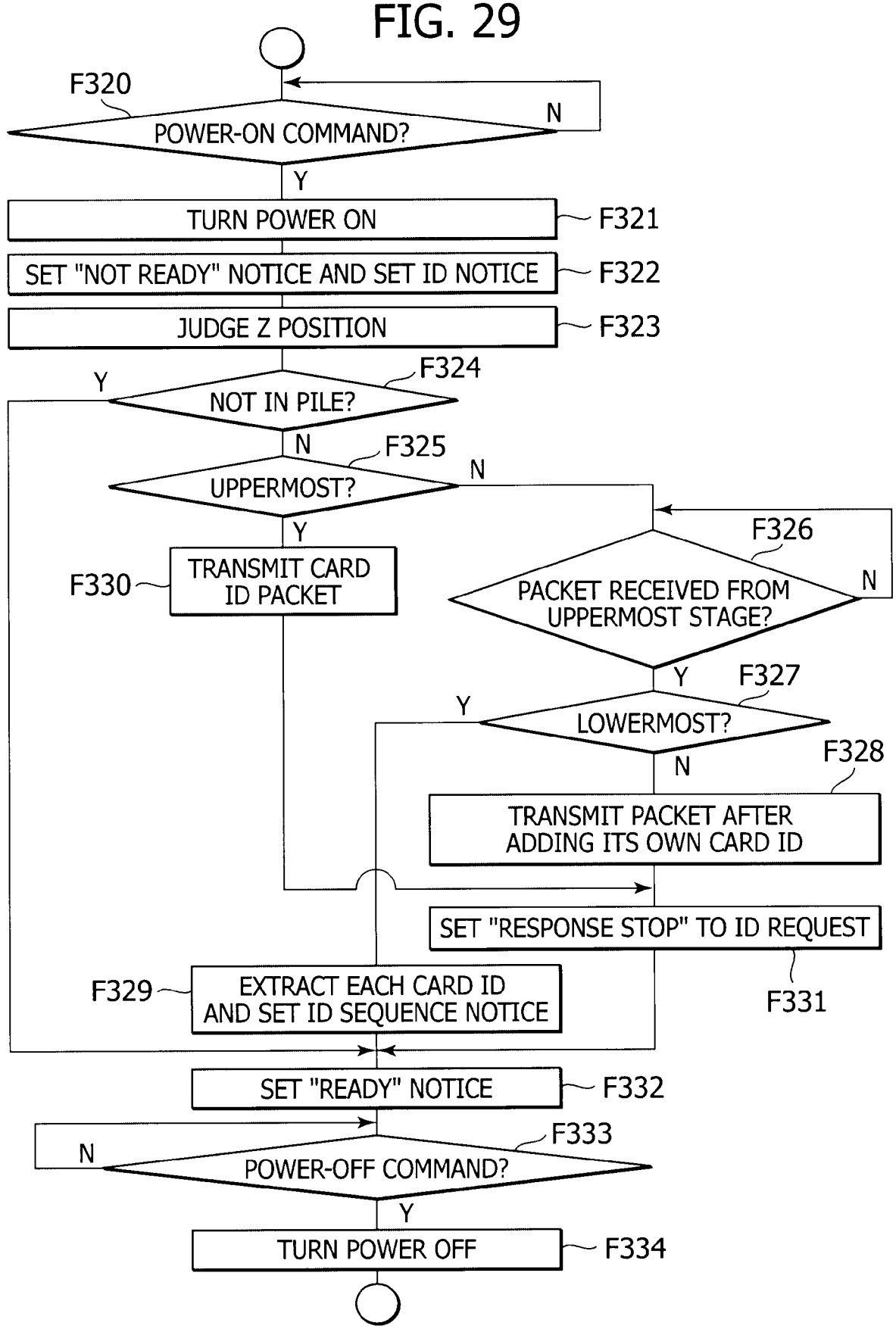
FIG. 29 is a flowchart for processing the editing card during reading by the editing desk according to the embodiment.

When each of the editing cards 200 arranged on the editing surface 301 has received the power-on command from the editing desk 300 through its memory tag 208, the power-on command is conveyed from the tag controller 230 to the main controller 211, and the main controller 211 starts processing of FIG. 29.

When having received the power-on command, the main controller 211 proceeds from step F320 to step F321 of FIG. 29, and first starts supply of power using the battery power supply 217.

Next, in step F322, the main controller 211 instructs the tag controller 230 to set a notice for conveying a "not ready" response to the editing desk 300. That is, the main controller 211 instructs the tag controller 230 to transmit information indicating "not ready" as its response to the "check if ready" request command repetitively transmitted thereto from the editing desk 300 in the above step F403. The tag controller 230 sets the information indicating "not ready" in the semiconductor memory 231 as response data to the "check if ready" request command.

The tag controller 230 also makes a response setting here so as to transmit the card ID of the self editing card 200 as a response to an ID request command from the editing desk 300.

While the editing desk 300 issues an ID request command during XY scan in later-described step F406 of FIG. 28, this response setting made by the tag controller 230 means a setting for replying the card ID of the self editing card 200 to this ID request command. The tag controller 230 makes a response setting for transmitting its card ID to the ID request command.

Then, in step F323, the main controller 211 checks magnetism detection signals from the Hall elements 205 (e.g., the Hall elements 205a, 205b, 205c, 205d shown in FIGS. 18A, 18B) to judge the position (position in a pile) in a Z direction of the self editing card 200.

That is, the main controller 211 recognizes whether or not the self editing card 200 is in a pile with other editing cards 200, and, if in a pile, where it is positioned, uppermost, inbetween, or lowermost in the pile, on the basis of the results detected by the Hall elements 205.

If the self editing card 200 is not in a pile with other editing cards 200, the main controller 211, proceeding from step F324 to step F332, sets a notice for conveying a "ready" response to the editing desk 300. That is, the main controller 211 instructs the tag controller 230 to transmit information indicating "ready" as a response to the "check if ready" request command from the editing desk 300 in the above step F403. The tag controller 230 re-writes the information indicating "not ready" so far set with the information indicating "ready" in the semiconductor memory 231 as response data to the "check if ready" request command.

Then, in step F333, the tag controller 230 waits to receive a power-off command.

If the self editing card 200 is in a pile with other editing cards 200, the process proceeds from step F324 to F325.

If the self editing card 200 is positioned uppermost, the main controller 211, proceeding to step F330, performs card ID packet transmission control. That is, the main controller 211 instructs the read/write controller 212 to generate a packet in which its card ID is written in the data area AR1 such as shown in FIG. 22B, and outputs the packet as an optically modulated signal from the light emitter 203.

When having finished the optical transmission, the main controller 211 proceeds to step F331, and sets "response stop" to the ID request command from the editing desk 300.

This is a setting in which, when the editing desk 300 has issued an ID request command during XY scan in later-described step F406 of FIG. 28, if the self editing card 200 is an uppermost card, the memory tag 208 gives no response (or replies invalid data) to the ID request command.

In the above step F322, a basic setting for transmitting its card ID to an ID request command has been made. However, in this case, the tag controller 230 invalidates the setting for transmitting its card ID made in step F322, and sets "response stop" to the ID request command, responsive to an instruction for setting "response stop" form the main controller 211.

Thereafter, the main controller 211, proceeding to step F332, sets a notice for conveying a "ready" response to the editing desk 300, to the tag controller 230. The tag controller 230 re-writes the "not ready" information so far set with the "ready" information in the semiconductor memory 231, as response data to the "check if ready" request command.

Then, in step F333, the main controller 211 waits to receive a power-off command.

If the self editing card 200 is in a pile with other editing cards 200, but is not positioned uppermost, the main controller 211 proceeds to step F326. Then, it waits to receive the optically communicated packet from the upper editing card 200.

When having received the packet from the upper editing card 200 via a light receiving circuit system from the light receiver 202, the main controller 211 branches the processing in step F327, depending on whether the self editing card is in between or lowermost in the pile.

If the self editing card 200 is in between in the pile, the main controller 211 proceeds to step F328 to perform card ID packet transmission control.

That is, the main controller 211 instructs the read/write controller 212 to generate a packet such as shown in, e.g., FIGS. 22C, 22D in which its card ID is added to the received packet format, and outputs the generated packet as an optically modulated signal from the light emitter 203.

After having finished the optical transmission, similarly to the case of the uppermost editing card 200, the main controller 211 instructs the tag controller 230 to set "response stop" to the ID request command from the editing desk 300, in step F331. That is, when the editing desk 300 has issued an ID request command, even in the in-between editing card 200, the main controller 211 sets such that the memory tag 208 does not respond to (or invalidates) the ID request command.

Then, in step F332, the main controller 211 sets a notice for conveying a "ready" response to the editing desk 300, to the tag controller 230.

Then, in step F333, the main controller 211 waits to receive a power-off command.

If the self editing card 200 is lowermost in the pile, the main controller 211, in response to the optically communicated packet in step F326, proceeds from step F327 to F329, where the main controller 211 extracts the reported card IDs from the received packet from the upper editing card 200, adds its own card ID to the extracted card IDs, and sets ID sequence data. In the example described above with reference to, e.g., FIG. 21C, the main controller 211 generates ID sequence data being "#6→#2→#8→#9". Then, the main controller 211 notifies the tag controller 230 of this data, and causes the tag controller 230 to set this ID sequence data as response data to the ID request command from the editing desk 300.

In the above step F322, the basic setting for transmitting its card ID to the ID request command has been made. However, in this case, as instructed by the main controller 211, the tag controller 230 invalidates the setting for transmitting its card ID made in step F322, and sets so as to transmit ID sequence data such as, e.g., "#6→#2→#8→#9" as a response to the card ID request command. For this purpose, the main controller 211 stores the ID sequence data in the semiconductor memory 231.

Thereafter, in step F332, the main controller 211 sets a notice for conveying a "ready" response to the editing desk 300, to the tag controller 230.

Then, in step F333, the main controller 211 waits to receive a power-off command.

The desk controller 310 repeatedly issues the "check if ready" request command to each editing card 200 via noncontact wireless communication in step F403, and receives a "not ready" or a "ready" notice from the editing card 200 as its response.

When all the responses from the editing cards 200 are "ready", the desk controller 310 OKs in step F404. That is, the desk controller 310 recognizes that all the editing cards 200 are "ready" by no longer receiving any "not ready" response at all.

Responsive to the fact that all the editing cards 200 are "ready", the desk controller 310 proceeds to step F405, and transmits a power-off command to the editing cards 200 via noncontact wireless communication.

When having received the power-off command from the memory tag 208 via the tag controller 230, the main controller 211 of each editing card 200 proceeds from step F333 to step F334, to turn off the battery power supply 217.

It is noted that the battery power supply 217 is turned off responsive to the power-off command from the desk controller 310 in each editing card 200 in this example. However, for example, the main controller 211 may perform power-off control automatically upon end of step F332. In this case, the desk controller 310 need not perform step F405.

Then, the desk controller 310 proceeds to step F406, to perform XY scan with transmission of ID request commands.

That is, as described above with reference to FIGS. 14A, 14B, the desk controller 310 sequentially drives the antennas of the X-axis antenna array 320, the antennas of the Y-axis antenna array 321. At this time, the desk controller 310 transmits an ID request command from each antenna.

In response thereto, any editing card 200 not in the pile returns its card ID.

Meanwhile, of the plurality of editing cards 200 in the pile, the uppermost and in-between editing cards 200 do not reply since "response stop" has been set to the ID request commands, while the lowermost editing card 200 returns ID sequence data about the editing cards 200 in the pile.

At this time, the card position detector 312 judges the XY coordinates of each of the editing cards 200 (and the editing cards in the pile), on the basis of their card IDs (and the ID sequence data) as their responses and their electric field strengths detected during reception of their card IDs, and notifies the desk controller 310 of a judgment result.

The desk controller 310 judges a time sequence of the card IDs on the basis of the card IDs (and the ID sequence data) received as the responses and the XY coordinate values for the card IDs (and the ID sequence data).

It is supposed that the editing cards 200 are arranged as shown above in FIG. 4, and that their card IDs are #1-#8 as shown in the figure. Then, the desk controller 310 judges the time sequence of the card IDs as #5→#2→#6→#7→#3→#1→#4→#8, as the time axes of the arrows SQ1, SQ2 so forward as in FIGS. 13A, 13B.

It is noted that a time sequence "#7→#3→#1" is based on the ID sequence data returned from the lowermost editing card 200 whose card ID is #1.

After having finished the XY scan, the desk controller 310 causes, in step F407, the EDL creator 311 to create edit data (edit list EDL) on the basis of, e.g., a scan result (judgment result about the time sequence of the card IDs) such as mentioned above.

Then, in step F408, the desk controller 310 uploads the created edit data to the nonlinear editor 100 from the external interface 304.

The nonlinear editor 100 associates each clip with a card ID as described above with reference to FIG. 26. Thus, for example, when having received the edit data indicating the card ID sequence of "#5→#2→#6→#7→#3→#1→#4→#8", the nonlinear editor 100 can replace this into a clip sequence.

In the example of the association in, e.g., FIG. 26, the card ID sequence of "#5→#2→#6→#7→#3→#1→#4→#8" can be recognized as a clip sequence of "CL5→CL2→CL6→CL7→CL3→CL1→CL4→CL8".

Accordingly, edit data indicating the actual clip sequence can be generated from the edit data uploaded from the editing desk 300, and, e.g., this can be used as edit data for video content.

In step ST6 of FIG. 23, an edit result is checked. By playing back the clips in this clip sequence in the nonlinear editor 100, the editing operator can check the video content being the edit result, actually on the nonlinear editor 100 by using the editing desk 300.

[II-10. Checking Clip Video During Use of Editing Desk]

By the way, the editing operator may wish to actually check animated video representing a clip during his or her arranging the editing cards 200 on the editing desk 300 in step ST3 of FIG. 23. That is, the editing operator may wish to check more specific contents than the thumbnail pictures at the IN/OUT points of the clip represented in each editing card 200.

To do this, it would be suitable if a clip corresponding to an editing card 200 can be played back in animation by specifying the editing card 200.

Figure 30:
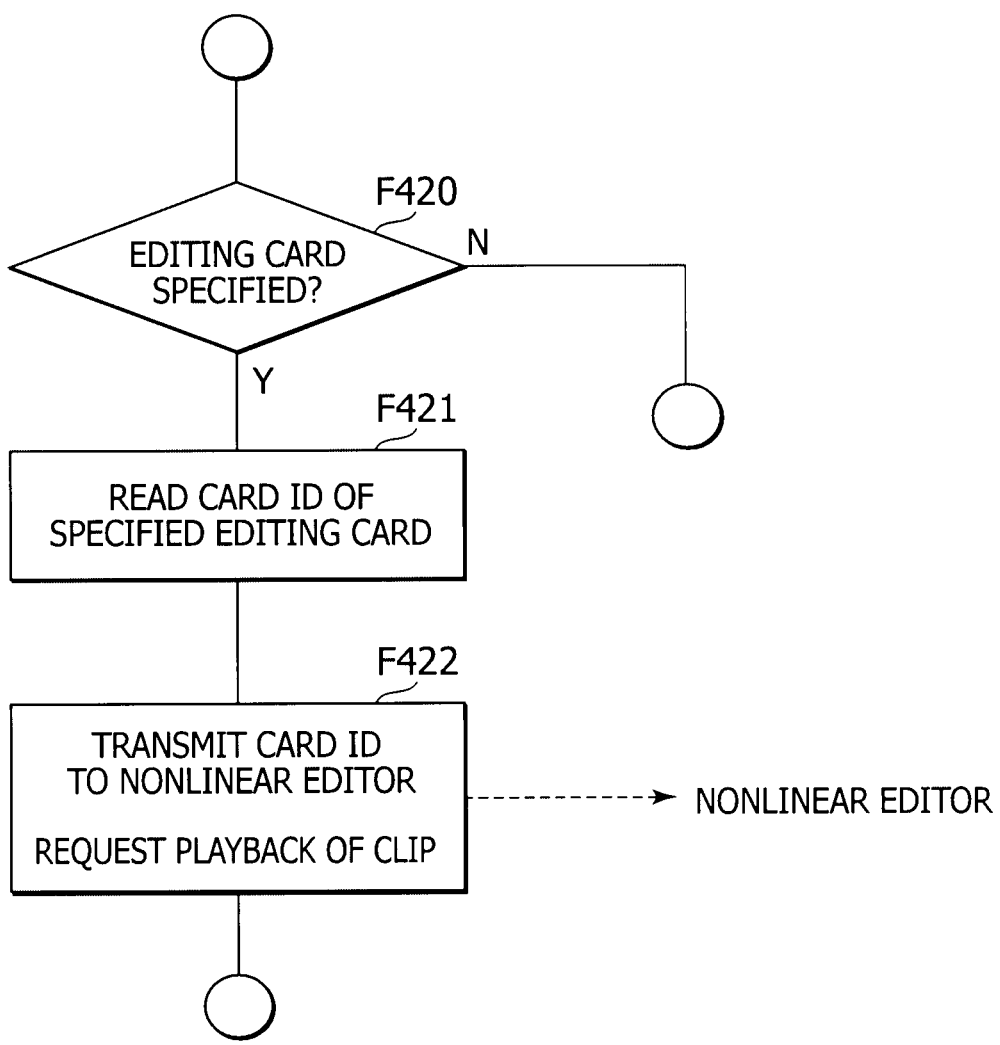
FIG. 30 is a flowchart for processing by the editing desk for checking contents of a clip in the editing card according to the embodiment.
Figure 31A:
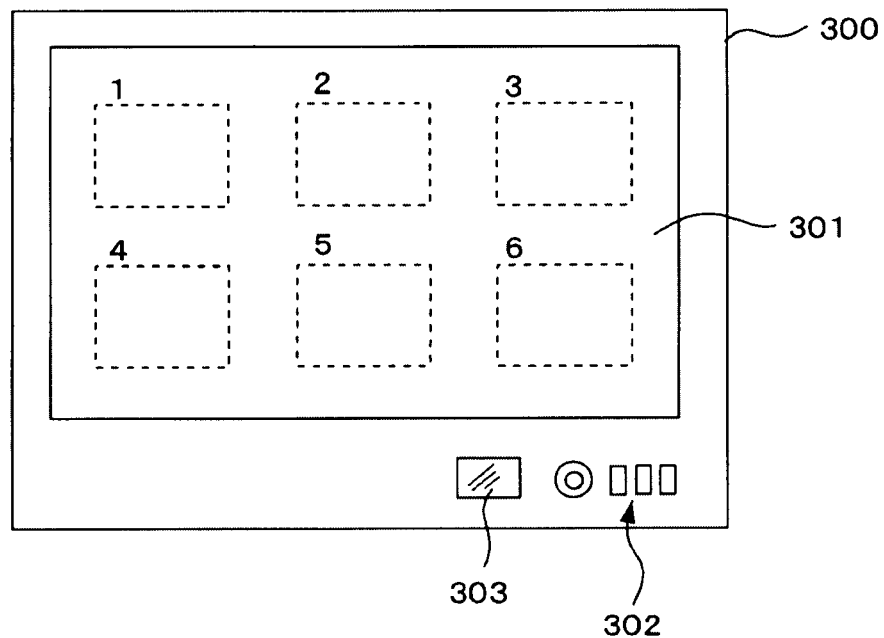
FIGS. 31A, 31B are diagrams illustrating an editing desk structure example for checking the contents of a clip in the editing card according to the embodiment.
Figure 31B:
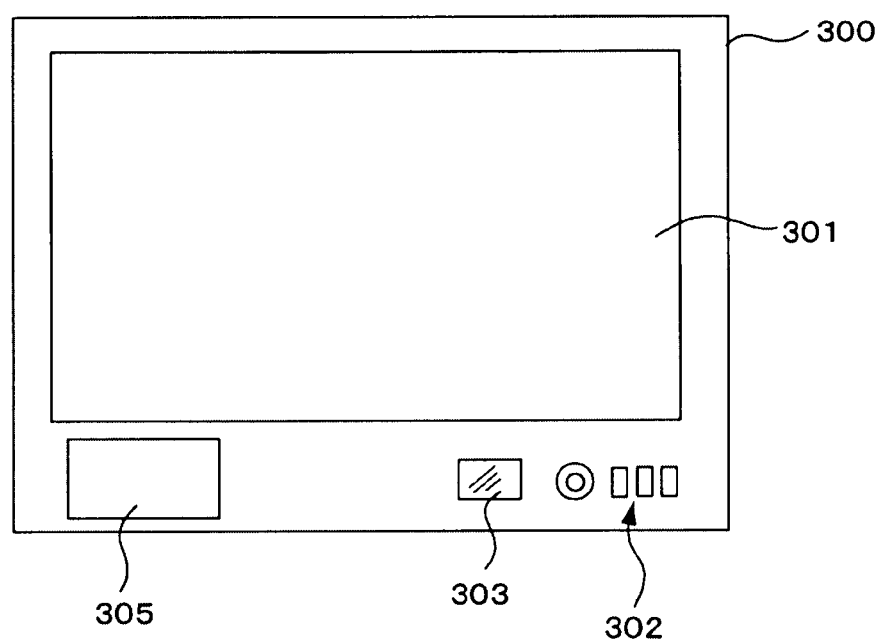

Examples for this will be shown in FIGS. 30, 31A, 31B. It is noted that the editing desk 300 is supposed to be connected to the nonlinear editor 100 ready to communicate.

FIG. 30 shows processing performed by the desk controller 310 to check clip video.

When the editing operator requests playback of video by specifying a certain editing card 200 on the editing desk 300, the desk controller 310 proceeds the processing from step F420 to step F421. Then, the desk controller 310 reads a card ID of the specified editing card 200 via noncontact wireless communication operation.

Next, the desk controller 310 notifies the nonlinear editor 100 of the card ID, and requests playback of a clip, in step F422.

Specific examples will be described with reference to FIGS. 31A, 31B.

For example, FIG. 31A shows that guidelines as card position guides and position numbers are indicated by printing or the like on the editing surface 301. A guideline is indicated by a dashed line.

The editing operator arranges editing cards 200 on these guidelines. It is noted that the card positions may be defined by forming recesses in the editing surface 301, instead of the guidelines.

For example, when wishing to check the contents of a clip in an editing card 200 placed at a position number "2" in the form of an animation, the editing operator requests playback by entering the position number "2" through the operation section 302.

In this case, the desk controller 310 reads a card ID from the editing card 200 arranged at the position number "2", and requests playback by notifying the nonlinear editor 100 of the card ID, as the processing of FIG. 30.

Then, the NLE controller 101 of the nonlinear editor 100 performs playback control on a clip having a clip number associated with the card ID.

By doing so, the editing operator can view clip video corresponding to the editing card 200 at the position number "2" on the monitor on the nonlinear editor 100 side.

Alternatively, FIG. 31B shows a case where a reserved arranging section 305 is provided outside the editing surface 301. An antenna for noncontact wireless communication is also arranged below this reserved arranging section 305 so that the card ID of an editing card 200 arranged in the reserved arranging section 305 can be read.

The editing operator places an editing card about which he or she wishes to check the contents in the reserved arranging section 305, and then makes a playback request through the operation section 302.

In this case, the desk controller 310 reads a card ID from the editing card 200 in the reserved arranging section 305, and requests playback to the nonlinear editor 100 by notifying the nonlinear editor 100 of the card ID, as the processing of FIG. 30.

Then, the NLE controller 101 of the nonlinear editor 100 performs playback control on a clip having a clip number associated with the card ID.

By doing so, the editing operator can view clip video corresponding to the editing card 200 placed in the reserved arranging section 305 on the monitor on the nonlinear editor 100 side.

It is noted that the reserved arranging section 305 may be formed as part of the editing surface 301.

As in these examples, it is configured such that the editing operator can make a playback request by specifying an editing card 200 in one way or another, and the card ID can be reported from the editing desk 300 to the nonlinear editor 100. By such a configuration, the editing operator can check the video of each clip with extreme ease during operation, thereby realizing easier and more efficient editing operation.

<III: Editing System Including Editing Books and Editing Desk>

[III-1. System Constituting Devices]

So far, the editing system using editing cards 200 as an example of the unit video representing devices 501 above-referred to in FIGS. 1A, 1B has been described. From here onwards, another editing system will be described, in which editing books 1 are used as an example of the unit video representing devices 501.

Furthermore, the editing book 1 (editing master book 1M) herein described is a device capable of even setting IN/OUT points of a clip, and thus can serve also a part of the function as the master editing machine 500 of FIGS. 1A, 1B.

When producing video content, the nonlinear editor 100 captures one or more clips, and stores them in its storage 102 as animated video materials for editing.

Then, typically, in the nonlinear editor 100, the editing operator cut-edits each of the clips as the video materials by setting IN/OUT points, and thereafter joins such cut-edited clips in a predetermined sequence in the time-axis direction. Such editing is performed by, e.g., a specialized editing operator by using the nonlinear editor 100. In that case, the editing operator need be skilled in operations such as checking the contents of each clip and specifying the IN/OUT points.

In view of the above, in this example, it is intended to make cut-editing for clips implementable extremely intuitively and easily by using the editing master book 1M, and also make editing for arranging and joining the clips on the time axis and producing video content executable simply by using editing books 1 and the editing desk 300.

Referring first to FIGS. 32, 33, 34A, 34B, 35, devices used for the editing system will be outlined.

Figure 32:
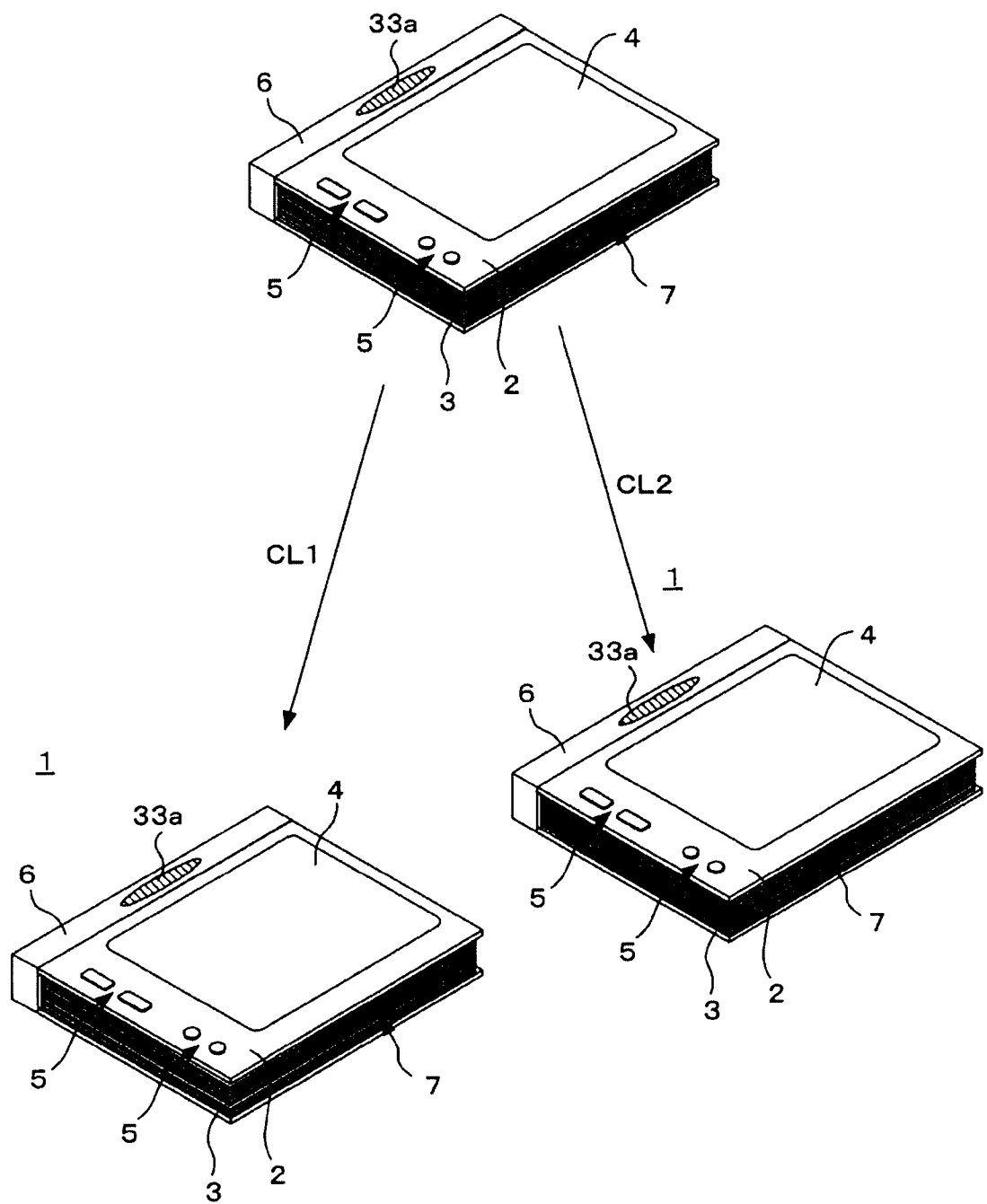
FIG. 32 is a diagram illustrating an editing master book and editing books according to the embodiment.

FIG. 32 shows the editing master book 1M, and a plurality of editing books 1. Each of the editing master book 1M and the editing books 1 is a pocketbook-sized, book-shaped device as shown in the figure.

The editing master book 1M and the editing book 1 may be identical in structure, and thus one of many editing books 1 may be used as the editing master book 1M.

Alternatively, the editing master book 1M may be distinguished from the editing book 1 as a device including, e.g., an internal memory having a large capacity, a high-function microcomputer serving as a controller, and a dedicated operation control program.

Figure 33:
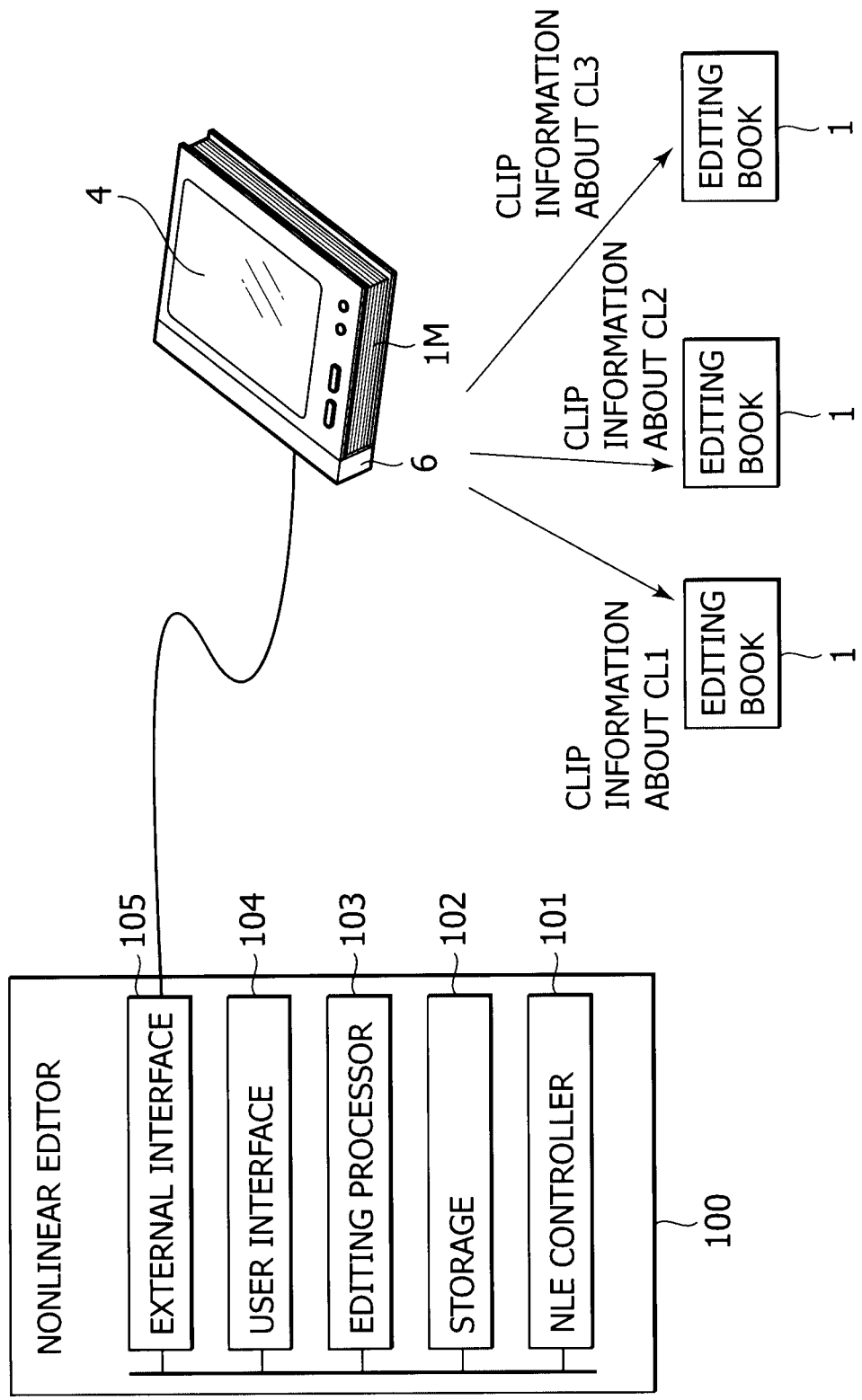
FIG. 33 is a diagram illustrating relationships between the nonlinear editor, editing master book, and editing books according to the embodiment.

As shown in FIG. 33, the editing master book 1M is connectable to the nonlinear editor 100, and allows the nonlinear editor 100 to download a plurality of clips thereto. Here, "clip" may include a clip not "cut-edited" in which IN/OUT points are not edited yet.

As described later, the editing master book 1M can cut-edit downloaded clips by setting IN/OUT points to these downloaded clips.

The editing master book 1M downloads single clip information to each of many editing books 1. That is, the editing master book 1M functions as the master editing machine 500 of FIGS. 1A, 1B.

In this case, the clip information downloaded to the editing book 1 includes, e.g., a clip number, an IN-point time code, an OUT-point time code, and frame image data covering all frames (or frames decimated to some degree) forming a clip animation.

Each of the editing books 1 having downloaded the clip information makes a display representing the contents of the clip. By this operation, similarly to the above-described editing cards 200, the editing operator can recognize which editing book 1 corresponds to which clip with a glance at each editing book 1.

Figure 34A:
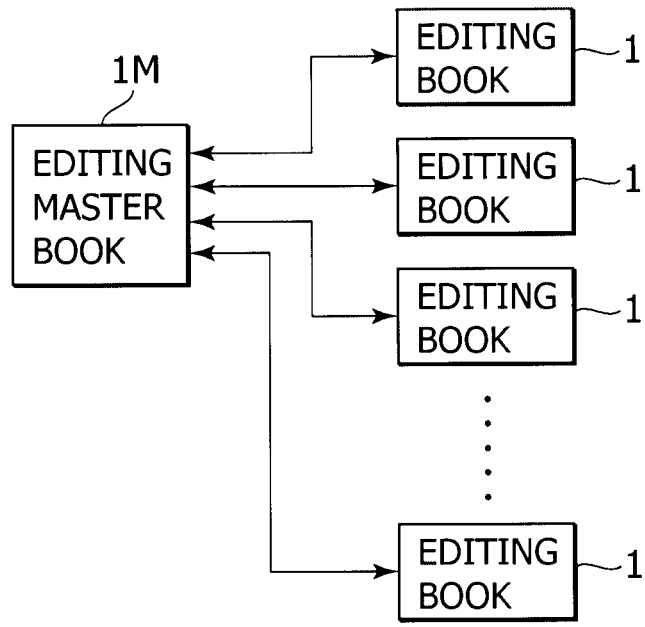
FIGS. 34A, 34B are diagrams illustrating modes of connection between the editing master book and the editing books according to the embodiment.
Figure 34B:
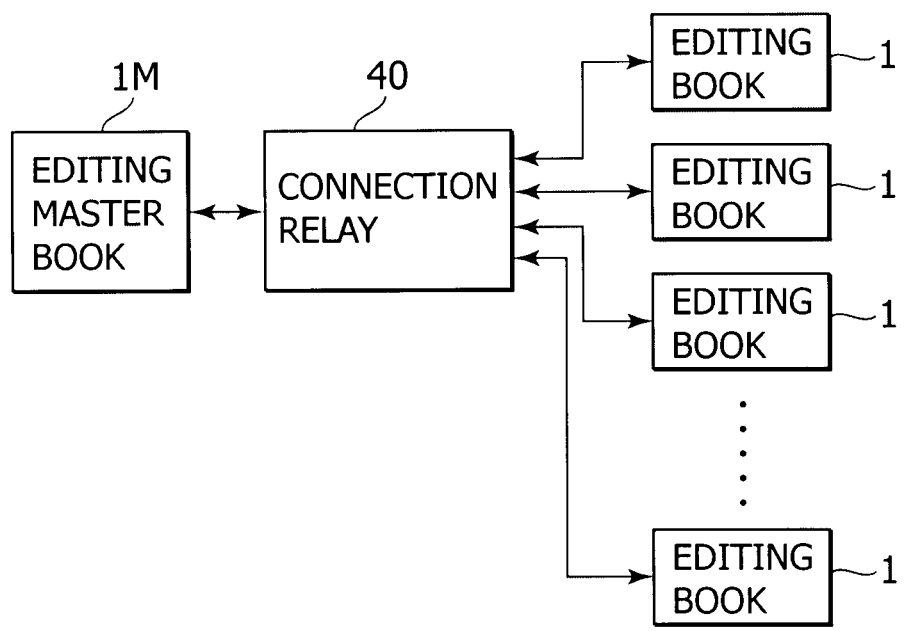

The downloading of the clip information to each editing book 1 from the editing master book 1M is performed through connection modes such as shown in, e.g., FIGS. 34A, 34B.

For example, if the editing master book 1M has a terminal structure connecting many editing books 1 thereto, many editing books 1 may be connected to the editing master book 1M simultaneously as shown in FIG. 34A, and the editing master book 1M may communicate individually with the editing books 1 one after another to download clip information.

Alternatively, as shown in FIG. 34B, by using a connection relay 40, many editing books 1 may be connected to the editing master book 1M, and in this state, the editing master book 1M may communicate individually with the editing books 1 one after another to download clip information.

Still alternatively, although not shown, a plurality of editing books may be connected in a daisy-chain method by using the editing master book 1M as a starting point.

Each editing book 1 is used on the editing desk 300 similarly to the above-described editing card 200, as representing the downloaded clip information.

Figure 35:
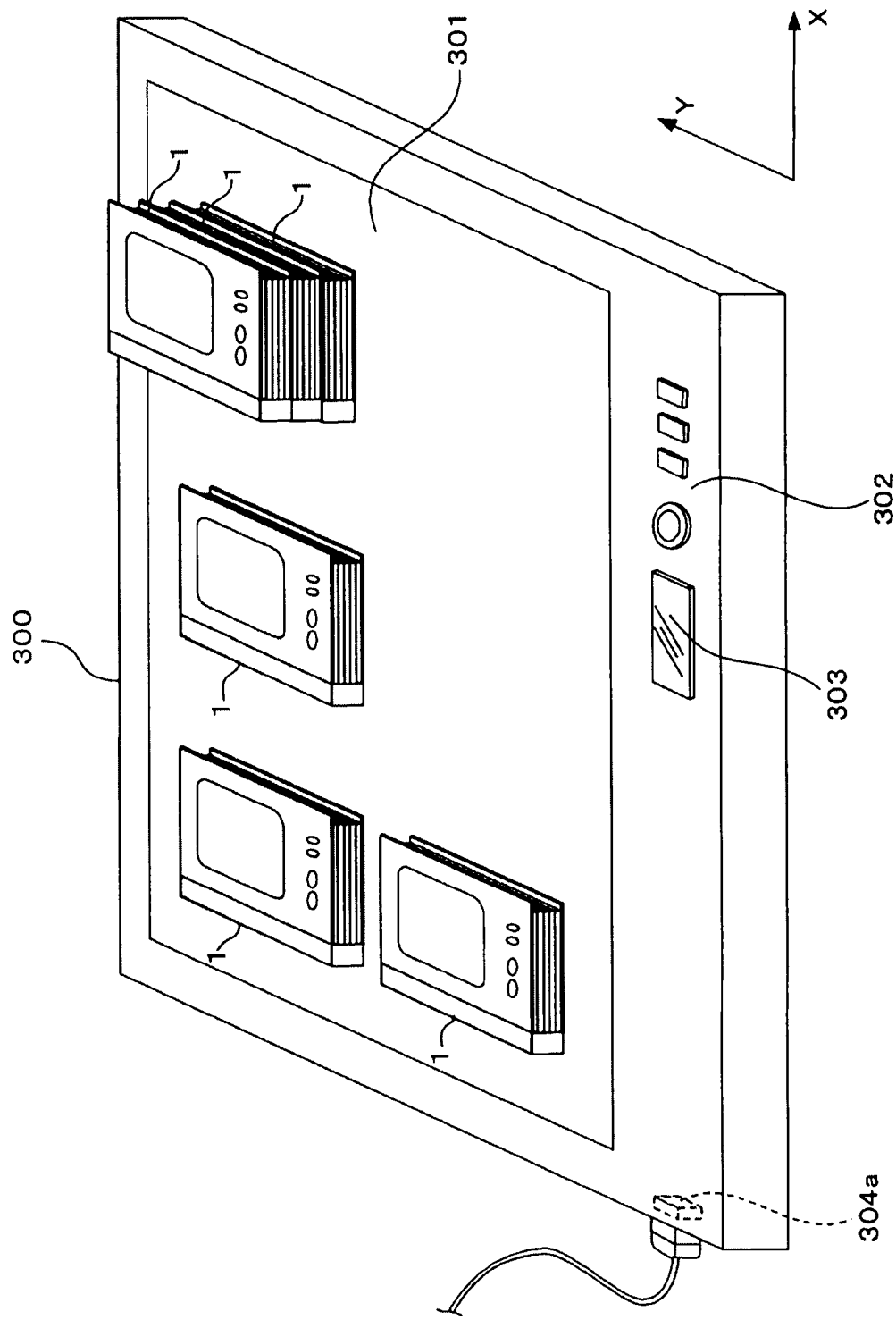
FIG. 35 is a diagram illustrating editing using the editing books on the editing desk according to the embodiment.

That is, as shown in FIG. 35, the editing operator arranges many editing books 1 in the horizontal direction and/or as a pile in the vertical direction on the editing surface 301 of the editing desk 300 one after another, with a time sequence of corresponding clips in mind.

Thereafter, the editing desk 300 generates edit data by reading a sequence (sequence of book IDs each assigned to a single editing book 1) of the editing books 1 in the horizontal/vertical directions.

The editing desk 300 uploads the generated edit data to the editing master book 1M. The editing master book 1M then generates edit data specifying a time sequence of the clips and a setting of IN/OUT points of each clip, by using the edit data (data specifying the time sequence of the book IDs) from the editing desk 300, and transmits the generated data to the nonlinear editor 100 as an edit result.

[III-2. Editing Book Structure]

First, the structure of an editing book 1 will be described. It is noted that the structure of the editing master book 1M can be considered to be similar.

FIG. 32 is a perspective view of editing books (including the editing master book 1M). As shown in this figure, the editing book 1 has a book structure in which covers 2, 3 on the front and the back, and a plurality of sheets 7 positioned between these covers 2, 3 are bound along a spine 6, with the sheets 7, 7 . . . forming respective pages.

This editing book 1 can be opened, allowing a user to view each of the pages 7, 7 . . . similarly to a typical book. Each sheet 7 is formed as a flexible paper-like display device. Accordingly, the user can view the contents displayed on the sheet 7, feeling as if reading a book. That is, the user can view the sheets 7, 7 . . . , just as he or she were turning pages one after another, or only skimming pages.

As shown in FIG. 32, the cover 2 includes a cover display 4 and operation keys 5.

The cover display 4 is formed of, e.g., a liquid-crystal panel, an organic EL (Electroluminescence) panel, or the like, capable of various displays including a display of animations.

Also, the cover display 4 incorporates therein touch sensors allowing operation input by touch operation on a display surface. The cover display 4 displays various operation images (e.g., operation button images), thereby allowing the user to enter a variety of operation inputs through touch panel operation in which the user touches the operation images. Also, when, e.g., thumbnail pictures indicating clip video are displayed, the user can touch any of such thumbnail pictures, thereby implementing operation inputs such as selecting and specifying an image.

The operation keys 5, 5 . . . are provided as operators for operating, e.g., a power supply, a display mode, and the like. It is noted that the number of such physical operation keys may be minimized to perform only essential operation, such as by limiting only to a power key, aside from the above-mentioned touch panel operation.

Of course, this does not exclude providing physical keys and dials, in place of touch sensors realizing the touch panel operation and of many operators realizing other various operation.

Figure 36A:
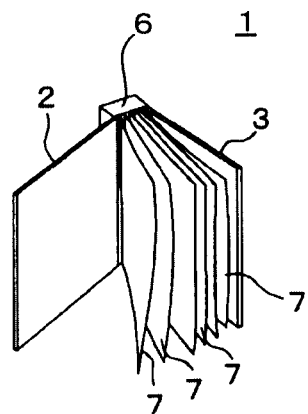
FIGS. 36A-36D are diagrams illustrating the editing book/ the editing master book according to the embodiment.
Figure 36B:
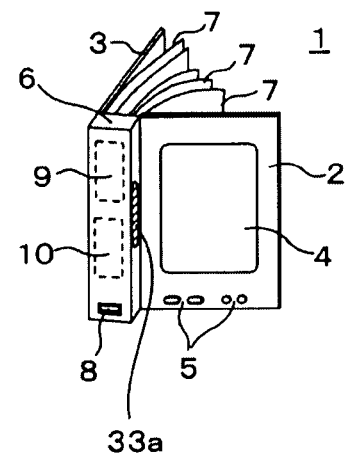

The spine 6 of the editing book is a portion binding the covers 2, 3 and the sheets 7, and also a portion accommodating a circuit board 9 and a battery 10 therein as shown in FIG. 36B.

The spine 6 also includes a connection terminal 8 for data communication with external equipment (e.g., the nonlinear editor) via a predetermined communication method, such as, e.g., a USB (Universal Serial Bus) device, an IEEE (Institute of Electrical and Electronics Engineers) 1394 device, or the like.

Figure 36C:
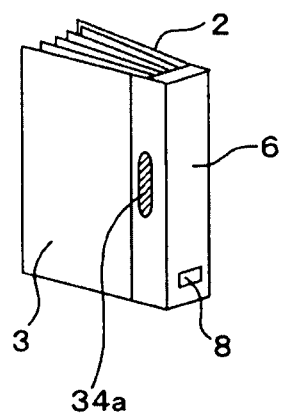

Furthermore, on the cover 2 side of the editing book 1, a light receiver 33a is provided as shown in FIG. 32, and on the back cover 3, a light emitter 34a is provided as shown in FIG. 36C.

These components allow communication between upper and lower editing books in a pile, similarly to the light receiver 202 and the light emitter 203 in the above-described editing card 200.

Figure 36D:
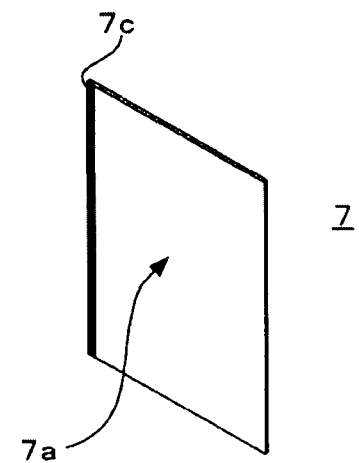

A sheet 7 is shown in FIG. 36D. This sheet 7 is formed of electronic paper above-described with reference to, e.g., FIGS. 6A-6C, and its sheet surface serves as a main display 7a.

Since the sheet 7 is handled as a page of a book in the editing book 1, the sheet 7 is preferably as flexible as paper.

In the layered structure formed of the plastic sheet 15, display layer 16, driver layer 17, and plastic sheet 15 as shown in FIG. 6A, flexible transistors (organic transistors) using, e.g., organic molecules are employed as TFTs for the driver layer 17. With this configuration, the electronic paper having the layered structure shown in FIG. 6A can be realized as a flexible sheet.

In this example, the sheet 7 is formed as a flexible sheet with, e.g., a structure such as this, thereby allowing each sheet 7 to be handled as a page of a book.

Furthermore, by adding a touch sensor layer (e.g., a touch sensor layer is sandwiched between the plastic sheet 15 and the display layer 16) to the structure of FIG. 4A, the user can perform touch panel-based operation input in the sheet 7. In this example, the sheet 7 has a structure capable of touch panel-based input operation.

The sheet 7 in this example is formed as such electronic paper, and thus images (still images) are displayed on the main display 7a shown in FIG. 36D.

Figure 37:
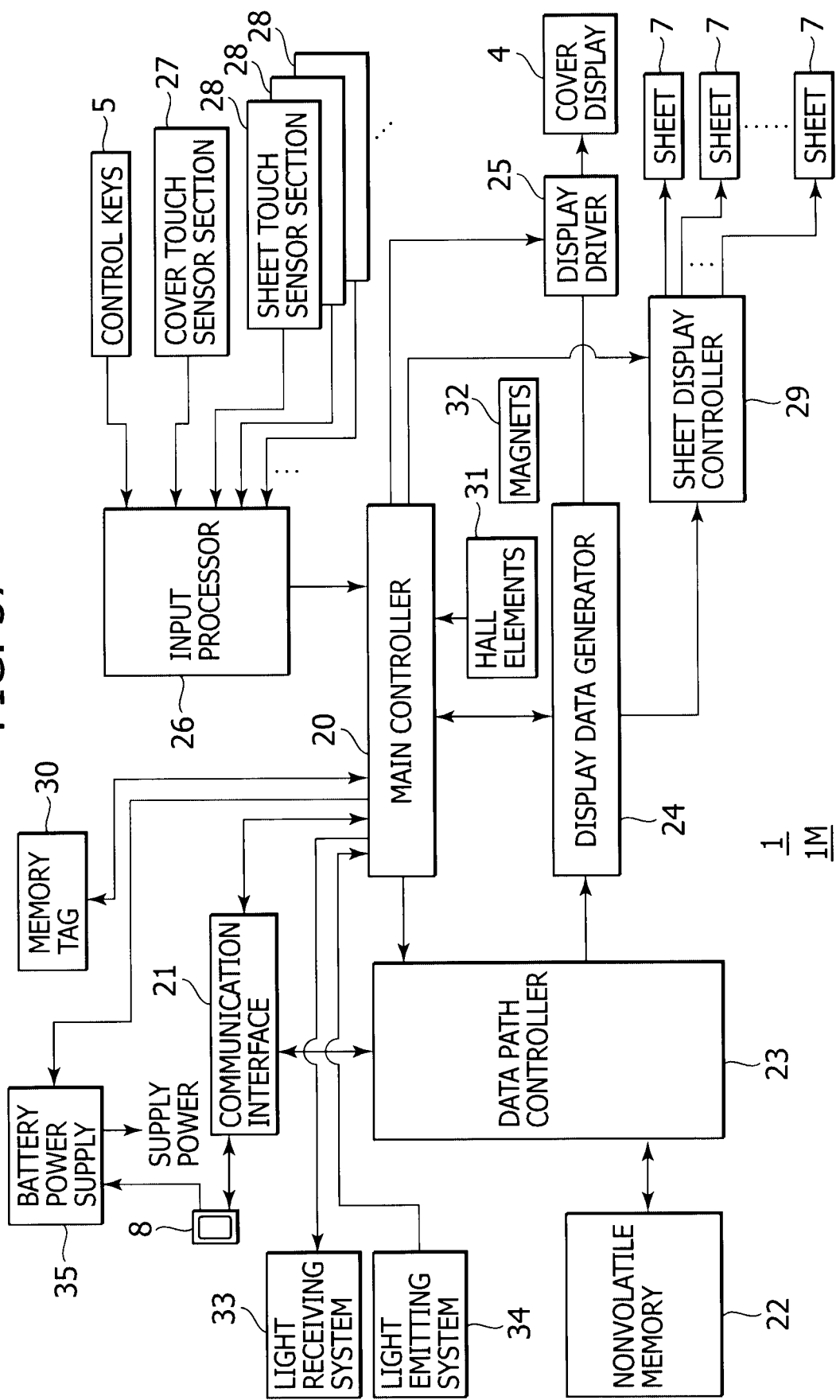
FIG. 37 is a block diagram illustrating the editing book/the editing master book according to the embodiment.

FIG. 37 shows an internal circuit configuration example of the editing book 1.

A main controller 20 is formed of a microcomputer having, e.g., a CPU, a ROM, a RAM, and the like, and controls the whole of the editing book 1. That is, this main controller 20 performs control for execution of communication operation with other equipment via a communication interface 21, communication operation with another editing book 1 using the light receiver 33a and the light emitter 34a, display operation in the cover display 4, display operation in the sheets 7, and the like, responsive to an operation program held therein and operation inputs by a user.

The communication interface 21 performs transmission/reception of communication packets as the communication operation with other equipment connected via the connection terminal 8, encoding/decoding, and the like.

As the communication operation with other equipment, when used as the editing master book 1M, the communication interface 21 receives downloaded clip data and transmits edit data to the nonlinear editor 100 during communication with the nonlinear editor 100. When connected as shown in FIGS. 34A, 34B, the communication interface 21 transmits clip information to respective ones of the connected editing cards 200. When connected to the editing desk 300, the communication interface 21 receives edit data from the editing desk 300.

Furthermore, when used as an editing book 1, the communication interface 21 receives clip information by communication with the editing master book 1M connected thereto as shown in FIGS. 34A, 34B.

The editing book 1 has a battery power supply (secondary battery) 35 to supply power for internal operation. The main controller 20 performs control so as to turn the battery power supply 35 on/off.

A nonvolatile memory 22 is a memory storing downloaded data, edit data generated by the main controller 20, and the like. That is, the nonvolatile memory 22 stores data to be stored even when the power is turned off.

In the editing master book 1M, the downloaded data means frame image data forming an animation, information ancillary to the frame image data, and the like, about each of a plurality of clips supplied thereto from the external equipment such as the nonlinear editor 100.

In the editing book 1, the downloaded data means clip information downloaded from the editing master book 1M, and thus includes, e.g., the clip number, IN-point time code, OUT-point time code, and frame image data forming the animation as mentioned above.

While this nonvolatile memory 22 may be assumed to be a solid-state memory such as, e.g., a flash memory, it may alternatively be configured of, e.g., a portable recording medium such as a memory card incorporating a flash memory or an optical disk, and a recording/playback unit for the portable recording medium. Still alternatively, a HDD (Hard Disk Drive) may be used as the nonvolatile memory 22.

A data path controller 23 performs data transfer among the nonvolatile memory 22, communication interface 21, and a display data generator 24, on the basis of control by the main controller 20, for data for communication such as downloaded data, image data used for display on the cover display 4, image data used for display on the sheets 7, or the like.

The display data generator 24 generates display data for display on the cover display 4 and display data for display on each of the sheets 7, 7 . . . , on the basis of control by the main controller 20. For example, the display data generator 24 generates display data by using frame image data read from, e.g., the nonvolatile memory 22.

When having generated display data for display on the cover display 4, the display data generator 24 supplies the generated data to a display driver 25. The display driver 25 has a pixel driving circuit system for the cover display 4, and causes the cover display 4 to execute display operation on the basis of the supplied display data.

When having generated display data for display on each of the sheets 7, 7 . . . , the display data generator 24 also supplies the generated data to a sheet display controller 29.

The sheet display controller 29 supplies each of the sheets 7, 7 . . . with corresponding display data supplied thereto, and causes the sheets 7, 7 to execute display.

An input processor 26 senses operation inputs by the user, and notifies the main controller 20 of the operation input information.

That is, the input processor 26 senses operation by the operation section 5 provided on the cover 2 and the like as mentioned above, and notifies the main controller 20 of the operation information through the operation section 5.

A cover touch sensor 27 is a touch sensor formed on the cover display 4, and detects a position touched by the user on a screen of the cover display 4. The input processor 26 notifies the main controller 20 of input information indicating the operated position on the screen. The main controller 20 judges the contents of the operation input entered by the user through correspondence between contents (an image resulting from display data generated by the display data generator 24) displayed on the cover display 4 at that instance and the operated position.

Sheet touch sensors 28, 28 are touch sensors formed on the sheets 7, 7 . . . , respectively, and each sheet touch sensor detects a position touched by the user on a screen of the sheet. The input processor 26 notifies the main controller 20 of input information indicating the operated position on a screen of each sheet 7. The main controller 20 judges the contents of the operation input entered by the user through correspondence between contents (an image resulting from display data generated by the display data generator 24) displayed on the cover display 4 at that instance and the operated position.

A light receiving system 33 is a circuit system including the light receiver 33a. The light receiving system 33 includes, e.g., the light receiving circuit 220, demodulating circuit 221, and serial/parallel converter 222 above-described with reference to FIG. 7 as the configuration of the editing card 200, demodulates an optical signal received at the light receiver 33a, and supplies the demodulated optical signal to the main controller 20.

A light emitting system 34 is a circuit system including the light emitter 34a. The light emitting system 34 includes, e.g., the parallel/serial converter 225, light intensity modulating circuit 224, and driving circuit 223 above-described with reference to FIG. 7, optically modulates packet data supplied thereto from the main controller 20, and outputs the optically modulated packet data from the light emitter 34a as an optical signal.

Hall elements 31, magnets 32 are provided in order to detect where a self editing book 1 is positioned in a pile, as mentioned above with reference to FIGS. 17A-17C, 18A, 18B regarding the editing cards 200.

For example, in the editing book 1, a predetermined number of Hall elements 31, magnets 32 may be arranged, deeming the inside of the cover 2 on the front to be the upper layer HL of FIG. 17A, while a predetermined number of Hall elements 31, magnets 32 maybe arranged, deeming the inside of the cover 3 on the back to be the lower layer LL of FIG. 17A.

By checking outputs detected by the plurality of Hall elements 31 arranged at the predetermined locations, the main controller 20 can judge whether or not the self editing book 1 is in a pile with other editing books 1, or judge, if it is in a pile, where it is positioned, uppermost, in between, or lowermost in the pile. The principle of detection may be similar to that above-described with reference to FIGS. 18A, 18B for the editing cards 200.

The editing book 1 has a memory tag 30 arranged therein-side (e.g., inside the cover 3 on the back). The memory tag 30 has a configuration similar to that of the memory tag 208 shown above in FIG. 7. A duplicate description of its internal configuration will be omitted here. A tag controller inside the memory tag 30 implements various data communication with the main controller 20.

Each editing book 1 is given a unique book ID. The book ID is stored in a memory inside the main controller 20 or in the nonvolatile memory 22. The book ID may also be stored in a semiconductor memory inside the memory tag 30.

The editing book 1 (editing master book 1M) has the above configuration.

It is noted that the light receiving system 33, light emitting system 34, memory tag 30, Hall elements 31, and magnets 32 are not necessary if a dedicated unit id provided as the editing master book 1M.

[III-3. Clip Editing by Editing Master Book]

First, clip editing in the editing master book 1M will be described.

In this example, the editing operator can execute part (e.g., cut-editing and the like) of the editing operations which the nonlinear editor 100 can execute, intuitively by using the editing master book 1M.

First, with the editing master book 1M connected to the nonlinear editor 100 as shown in FIG. 33, many video materials (nonedited clips) are downloaded from the nonlinear editor 100 to the editing master book 1M.

The nonlinear editor 100 has a plurality of clips for producing video content in its storage 102 as animated video materials for editing. For example, the editing operator performs a predetermined operation after connecting the nonlinear editor 100 to the editing master book 1M so as to be ready for data communication as shown in FIG. 33, and downloads a plurality of clips stored in the nonlinear editor 100 for use in producing video content, to the editing master book 1M. The editing master book 1M captures each clip data in its nonvolatile memory 22.

Images about each clip are supplied to the editing master book 1M in the form of frame image data as still images. For example, frame image data forming an animation of a clip is downloaded as compressed into still images by a scheme such as JPEG (Joint Photographic Experts Group).

Having many clips downloaded in this way, the editing master book 1M can edit these clips.

Figure 38:
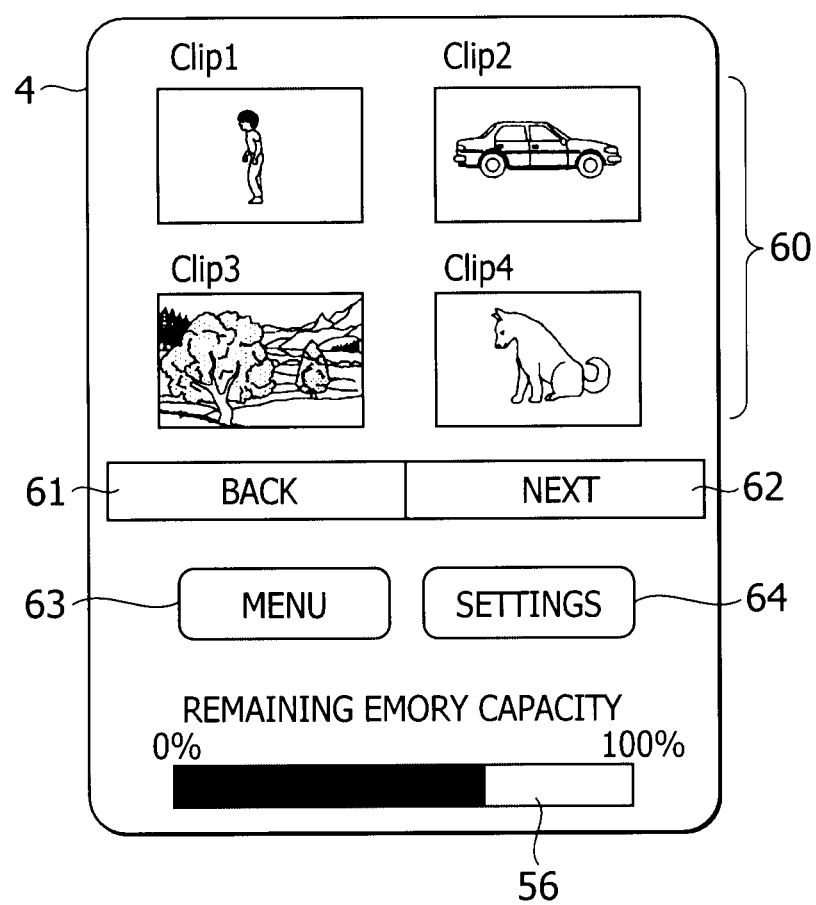
FIG. 38 is a diagram illustrating a clip selecting screen of a cover display according to the embodiment.

When the clips have been downloaded, the main controller 20 causes the cover display 4 to display a clip selecting screen such as shown in, e.g., FIG. 38.

The clip selecting screen includes a thumbnail display 60 for the downloaded clips. A single thumbnail picture represents a single clip.

Additionally, "Back", "Next", "Menu", "Set" are displayed as operation buttons 61, 62, 63, 64, for example.

A remaining memory capacity display 56 for the nonvolatile memory 22 is also displayed.

The "Back" and "Next" operation buttons 61, 62 are operation images used to instruct forwarding/rewinding of pages of the thumbnail display 60 when a single screen is not enough to display thumbnail pictures for all the downloaded clips.

The "Menu" operation button display 63 is an operation image used to instruct moving to various other operation menu screens.

The "Set" operation button display 64 is an operation image used to instruct moving to various setting operation screens, such as basic settings, display settings, and editing operation settings.

This clip selecting screen is displayed to allow the user to select a clip for editing or image checking through thumbnail pictures. That is, the user can select a clip for editing or content checking by specifying a corresponding thumbnail picture.

The main controller 20 recognizes a touch operation on the thumbnail picture as a clip selecting operation.

When the user has selected a clip, the main controller 20 performs processing of unfolding the selected clip on the sheets 7, 7 . . . .

If the user has selected, e.g., a clip "Clip 1" on the thumbnail display 60 of FIG. 38, an image corresponding to "Clip 1" is unfolded on the sheets 7, 7 . . . .

Figure 40:
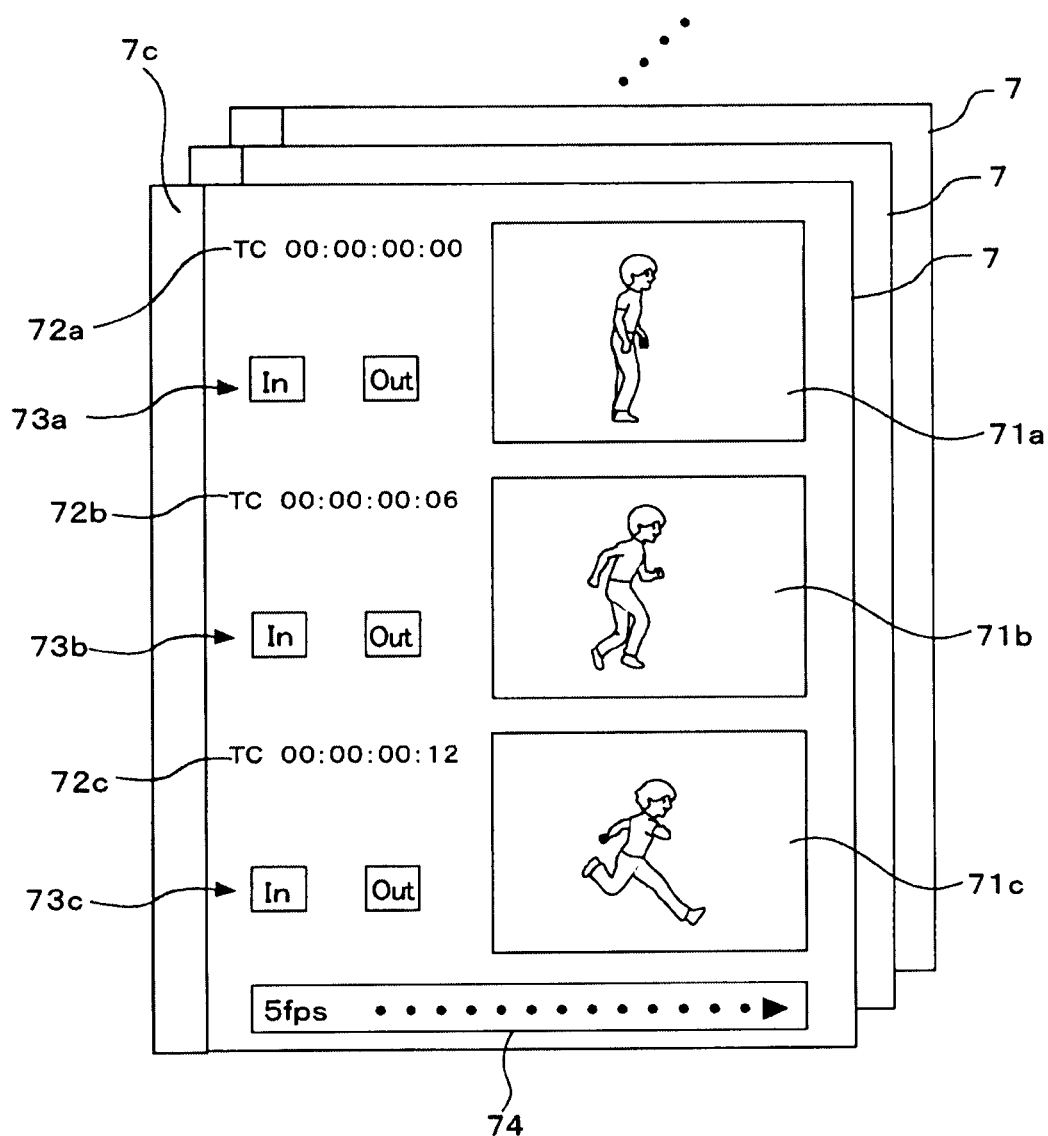
FIG. 40 is a diagram illustrating a display example on sheets according to the embodiment.

FIG. 40 shows a display example in sheets 7.

In FIG. 40, an example is shown, in which three frame images 71a, 71b, 71c of many frames forming a clip are displayed on a single sheet 7.

For the frame image 71a, a time code 72a and an operation button display 73a are displayed. Likewise, for the frame image 71b, a time code 72b and an operation button display 73b are displayed, and for the frame image 71c, a time code 72c and an operation button display 73c are displayed.

The operation button displays 73a, 73b, 73c are operation images allowing the user to perform operation for specifying IN/OUT points in cut-editing the corresponding frame images 71, 71b, 71c, respectively.

Furthermore, the frame images 71a, 71b, 71c displayed on the sheet 7 are images extracted from the frame image data forming the clip, continuously or in decimation along the time axis of the animation.

For example, the time codes 72a, 72b, 72c for the frame images 71a, 71b, 71c of FIG. 40 are set to "00:00:00:00", "00:00:00:06", "00:00:00:12", respectively. These time codes are based on an fps (Frame Per Sec) being "5". In a case where, e.g., clip video is an animation formed of thirty frames per second, five frames are extracted per second, i.e., one frame is extracted every six frames for display on the sheet 7.

In this case, on a sheet 7 (page) following this sheet 7 shown, frame images are to be displayed whose time codes are "00:00:00:18", "00:00:00:24", "00:00:00:30", respectively.

That is, frame images are displayed one after another along the time axis of the animation, within each sheet 7 and in a sheet (page) forwarding direction.

As a result, the user can check the contents of clip video on the sheets 7, 7 . . . , as if he or she were reading, e.g., a comic.

An image 74 indicating an interval between frame images for display is displayed at a lower portion of the sheet 7. For example, an arrow image indicating that frame images are decimated is displayed, along with a frame rate of "5 fps".

If the time codes 72a, 72b, 72c and the operation button displays 73a, 73b, 73c are displayed on a binding margin 7c side, and if the frame images 71a, 71b, 71c are displayed opposite to the binding margin 7c in the sheet 7 as shown in the figure, the user is allowed to visibly check the contents of the images with ease when skimming the sheets 7, 7

Figure 42:
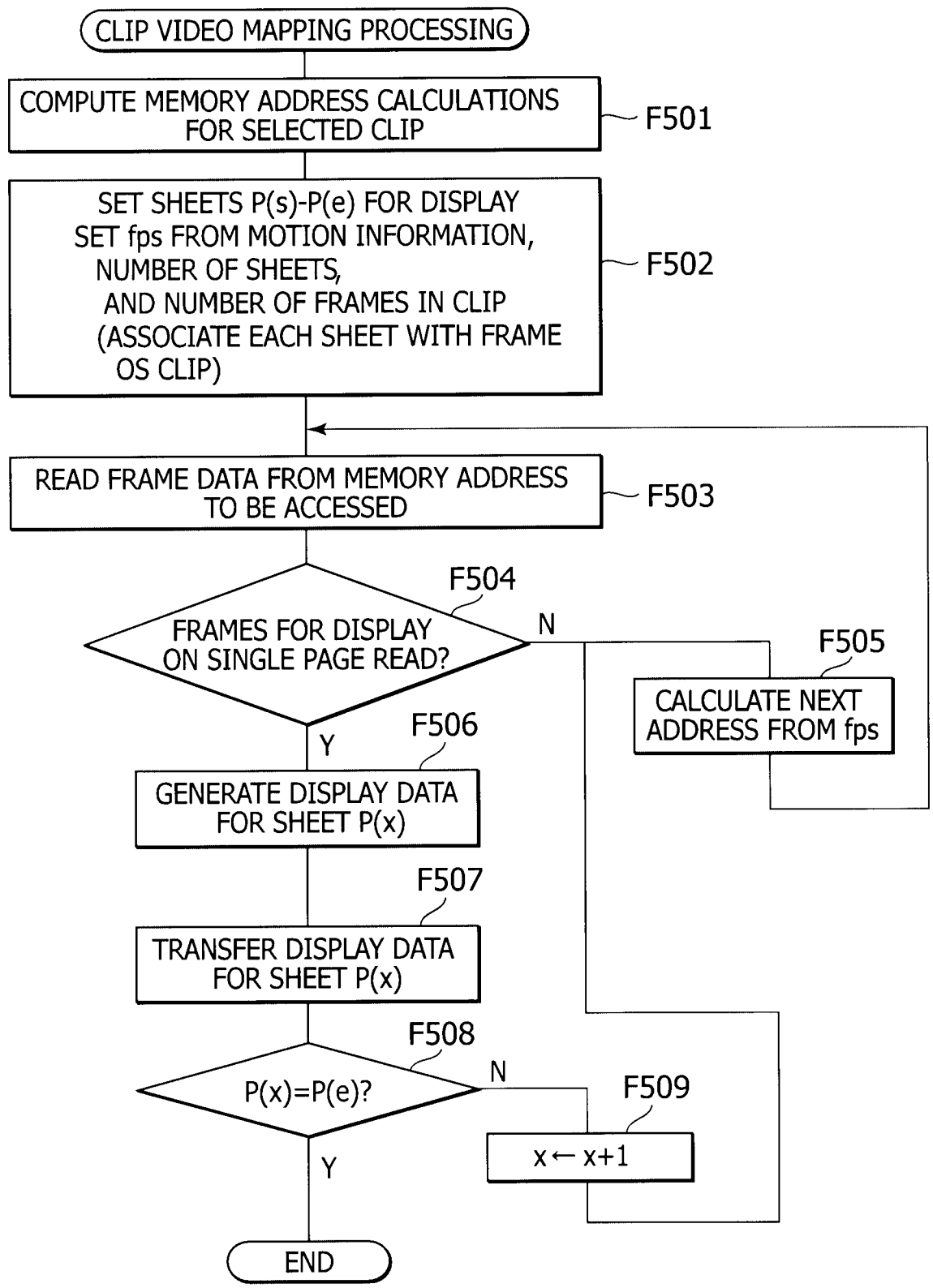
FIG. 42 is a flowchart for clip video unfolding processing according to the embodiment.

Referring to FIG. 42, processing by the main controller 20 for unfolding clip video on the sheets 7 in this way will be described.

For example, when a certain clip has been selected by a user operation on the thumbnail display 60 of FIG. 38, the main controller 20 starts the processing of FIG. 42.

First, in step F501, the main controller 20 calculates an address to be accessed for reading frame image data about the selected clip from the nonvolatile memory 22. For example, an address at which starting frame image data about the clip is stored is calculated.

Next, in step F502, the main controller 20 sets a range of sheets 7 for display as sheets P(s)-P(e), and also sets the above-mentioned fps as a rate at which frame images are displayed on the sheets.

Typically, the range of sheets for display may equal the total number of sheets 7 bound to an editing book 1. If, e.g., fifty sheets 7 are bound to allow a display of fifty pages, the first to the fiftieth sheets 7 may be set as the range of sheets for display. The sheet P(s) means a sheet as a starting page, while the sheet P(e) means a sheet as an ending page. For example, if images are unfolded on the fifty sheets 7, it may be set such that the sheet P(s)=1 and the sheet P(e)=50.

It is noted that clip images could be unfolded without using all the sheets, e.g., if clip video is very short or if the frame interval is wide. Accordingly, the sheet P(s) and the sheet P(e) may be set according to the total number of frames of a clip, the fps for unfolding, and the number of pages as sheets 7.

The fps for images for unfolding is set by using motion information, the number of sheets for display, the total number of frames of a clip, or the like. There could be various fps setting techniques.

The fps may be set such that the frame images can be displayed at equal intervals (or almost equal intervals) according to, e.g., the total number of frames of a clip and the number of sheets for display.

Alternatively, by allowing the user to specify a frame interval, the fps may be set as the specified frame interval, irrespective of the total number of frames and/or the number of sheets for display.

Still alternatively, if motion information is contained in clip data downloaded from the nonlinear editor 100, the fps may be set according to this motion information ME. The motion information means information indicating a degree of motion of an animation.

For example, the fps is set on the basis of average motion information about a clip.

Alternatively, the fps may be variably set every some frame segments, such as setting different fps values for segments in large motion and for segments in small motion.

When having set the sheets P(s)-P(e) as the range of sheets 7 for display and the fps, the main controller 20 proceeds to step F503, and first performs control to read frame image data at the calculated address of the nonvolatile memory 22.

First, the main controller 20 performs reading control at the address set in step F501, at which starting frame image data of the clip is stored, and transfers the frame image data read from the nonvolatile memory 22 to the display data generator 24.

In step F504, the main controller 20 judges whether or not all images for display on a single page of the sheets 7 have been read. If the three frame images are to be displayed on a single page as shown in FIG. 40, the reading of images for display on a single page completes upon reading the three frame images.

Accordingly, the main controller 20 proceeds to step F505 upon reading frame image data for a single page, and calculates a next address to be accessed. The next address to be accessed is an address at which next frame image data for display on the basis of the fps setting is stored. If, e.g., fps=5 as in the example of FIG. 40, an address at which frame image data on the seventh frame is stored is set as the next address to be accessed. Then, returning to step F503, the main controller 20 performs control to read data at the address to be accessed from the nonvolatile memory 22, and then transfers the frame image data read from the nonvolatile memory 22 to the display data generator 24.

Upon reading the frame image data for three images through steps F503-F505, the display data generator 24 can generate display data for a single sheet 7. Thus, upon completion of reading frame image data for display on a single page, the main controller 20 proceeds its processing from step F504 to step F506, and instructs the display data generator 24 to generate display data for a sheet P (x). An initial value for "x" in the sheet P(x) equals "s" in the sheet P(s) set in step F502. That is, first, display data for the initial sheet 7 (first page) for display is to be generated.

The display data generator 24 generates display data having contents such as shown in, e.g., FIG. 40, i.e., display data containing the three frame images 71a, 71b, 71c, the time codes 72a, 72b, 72c, the operation button displays 73a, 73b, 73c, and the image 74 indicating the fps, as instructed by the main controller 20.

Then, in step F507, the main controller 20 transfers the display data generated by the display data generator 24 as the display data for the sheet P(x) (first, the sheet P(s) being the first page) to the sheet display controller 29, and causes the sheet display controller 29 to execute display on the sheet P(x). By this operation, display such as shown in FIG. 40 is executed in the sheet P(x), i.e., the sheet 7 as the first page.

In step F508, the main controller 20 judges if P(x)=P(e) That is, this is to check if the main controller has finished display on all the sheets.

If P(x)≠P(e), the main controller increments the variable x in step F509, and proceeds to step F505. Then, returning to step F503, the main controller repeats the above-mentioned processing.

Thus, in steps F503-F507, the main controller 20 performs similar processing on a sheet 7 as a second page by setting an M sheet P (x), making a display on the sheet 7 as the second page. Similarly, the main controller 20 further performs the display processing for other sheets 7, as a third page, a fourth page, and so on.

When the display processing has been performed up to the sheet P(e) as the last page for display, it is judged in step F508 that P(x)=P(e), so that the main controller 20 judges that display on all the sheets has been completed, thereby finishing the processing of FIG. 42, i.e., the clip image unfolding processing on the sheets 7, 7 . . . .

In the editing master book 1M, the above processing allows a clip animation to be displayed in the form of continuous or decimated frame images in a sequence of pages formed of the sheets 7, 7 . . . . Thus, the frame images (still images) forming the clip animation are unfolded on the pages like a comic book. Accordingly, the editing operator is now ready to check the contents of the animation as the clip as if he or she were taking a look at a book.

It is noted that how the fps for frame images for display on a sheet 7 is set has been mentioned above. However, for example, after clip images have been unfolded on the sheets 7,7 . . . , it may also be acceptable to alter the fps and re-unfold the clip images using the altered fps.

For example, the user may be allowed to execute operations of re-unfolding a clip and setting the fps. Then, if, e.g., intending to view frame images "more finely" or "more roughly", the user may be allowed to re-unfold the frame images on the sheets 7, 7 . . . through the processing of FIG. 42 according to his or her intention. In that case, in step F502, the fps is set, of course, responsive to any user operation.

Meanwhile, the user may also be allowed to specify two different frame images through a glance at the sheets 7, 7 . . . , and perform processing of re-unfolding frames between these specified frame images, e.g., in a finer mode.

In any case, various display ranging from continuous display sequentially displaying all the frames to decimated display displaying frames at various frame intervals can be realized by varying the frame interval, i.e., by varying the fps setting in the unfolding processing. Thus, it may be suitable to unfold and display frames at various fps settings responsive to user operation.

Frame image data from an IN point to an OUT point may be re-unfolded after such IN/OUT points have been set by later-described editing processing.

As described above, after frame images of a specified clip have been unfolded on the sheets 7, 7 . . . , editing for IN/OUT points of the clip and other more detailed editing can be performed.

For example, the user performs operation input for cut-editing by setting an IN point as a start point and an OUT point as an end point, while checking an animation as if he or she were taking a look at a book. For example, while turning pages, the user specifies "an IN point to this image on this page", "an OUT point to this image on this page" with a simple operation.

The main controller 20 generates edit data on the IN/OUT points responsive to such an operation.

Furthermore, the main controller 20 can display a clip animation on its cover display 4, so that the user can perform various setting operations while checking the display on the cover display 4. The setting operations include, e.g., adjustment of video levels (luminance level, chrominance level) and image effect settings. The main controller 20 generates edit data responsive also to such setting operations.

In the following, editing processing using the sheets 7, 7 . . . and the cover display 4 will be described as image editing using the editing master book 1M.

First, cut-editing for a clip will be described, referring to a state in which clip images are unfolded and displayed on the sheets 7, 7 . . . as mentioned above. That is, this is an editing operation for specifying IN/OUT points for defining a video segment used for video content, within a clip.

The IN/OUT points can be specified with extreme ease. As mentioned above, the user can check the video of a clip on the sheets 7, 7 . . . as if he or she were taking a look at a book. Thus, from among frame images forming that video, the user may specify an arbitrary frame image as an IN point and another arbitrary frame image as an OUT point.

Figure 41:
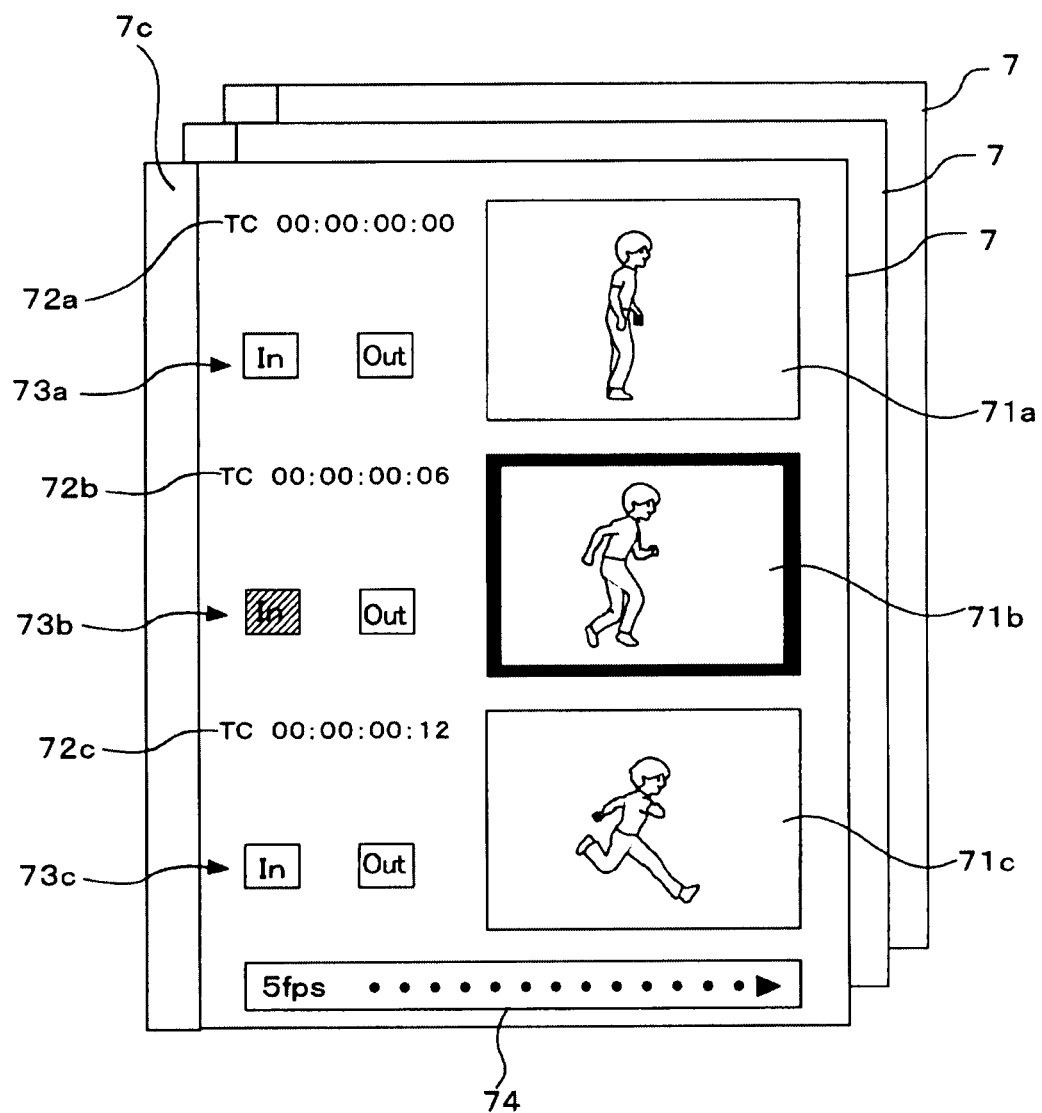
FIG. 41 is a diagram illustrating a display example on the sheets according to the embodiment.

If wishing to specify the second-layer frame image 71b in the sheet 7 of, e.g, FIG. 41 as the IN point, the user may only have to touch "In" of the operation button display 73b corresponding to that frame image 71b. As mentioned above, the sheet touch sensor 28 is provided on each sheet 7, thereby detecting a position touch-operated by the user, and the input processor 26 notifies the main controller 20 of the touch-operated position. When judging that the touch-operated position is a position corresponding to the "In" operation button display 73b, the main controller 20 may process that operation as an IN point specifying operation. That is, when having detected a touch operation on the "In" operation button display 73b, the main controller 20 generates edit data as recognizing that the frame image 71b having the time code="00:00:00:06" has been specified as the IN point.

The OUT point is processed similarly. Responsive to a touch operation on "Out" of the operation button display 73b corresponding to a certain frame image on a sheet 7 being a certain page, the main controller 20 judges that an OUT point specifying operation has been performed on that frame image, so that it may only need to generate edit data therefor.

Figure 43:
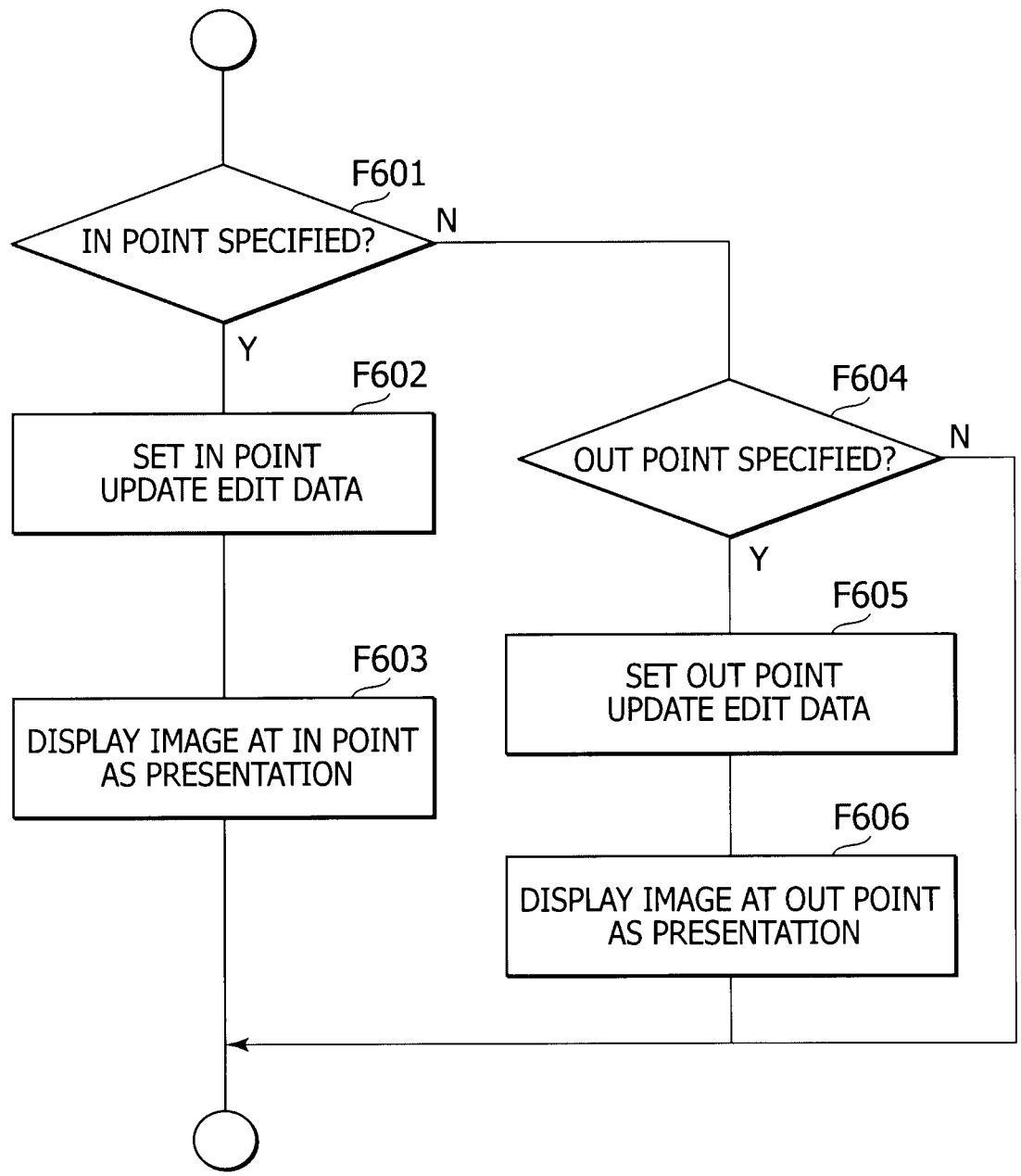
FIG. 43 is a flowchart for sheet editing processing according to the embodiment.

FIG. 43 shows processing by the main controller 20 for realizing such editing processing using the sheets 7, 7.

The main controller 20 monitors an IN point specifying operation in step F601, and also monitors an OUT point specifying operation in step F604.

When having sensed the IN point specifying operation, the main controller 20, proceeding from step F601 to step F602, generates (updates) edit data such that a time code for a frame image corresponding to that IN point specifying operation is set as the IN point.

Then, in step F603, the main controller performs display control for highlighting the IN point specification to the user. As shown in, e.g., FIG. 41, the main controller 20 changes the "In" operation button display 73b on which the IN point specifying operation has been performed to a specific color, e.g., to red, and further displays the frame image 71b specified as the IN point, e.g., by framing in red. The main controller 20 instructs the display data generator 24 to make such display changes, and causes the sheet display controller 29 to change part of display colors and add framing, in display on a sheet of interest.

When having sensed the OUT point specifying operation, the main controller 20, proceeding from step F604 to step F605, generates (updates) edit data such that a time code for a frame image corresponding to that OUT point specifying operation is set as the OUT point.

Then, in step F606, the main controller performs display control for highlighting the OUT point specification to the user. For example, the main controller 20 changes the "Out" operation button display on which the OUT point specifying operation has been performed to a specific color, e.g., to blue, and further displays a frame image specified as the OUT point, e.g., by framing in blue. The main controller 20 instructs the display data generator 24 to make such display changes, and causes the sheet display controller 29 to change part of display colors and add framing, in display on a sheet of interest.

The IN point and the OUT point are specified as described above. Then, the main controller 20 generates edit data indicating the IN point and the OUT point for the clip currently being unfolded, responsive to the specifying operation by the user.

Also, on the sheets 7, 7 . . . , the IN point is highlighted to the user through the operation button display in red and the frame image framed in red, and the OUT point is also highlighted to the user through the operation button display in blue and the frame image framed in blue.

It is noted that the IN point highlighted in red and the OUT point highlighted in blue are merely an example. They may be highlighted in different colors, or the IN/OUT points may be presented in a plain way to the user by changing the contents of the display, instead of colors.

Next, editing using the cover display 4 will be described.

Figure 39A:
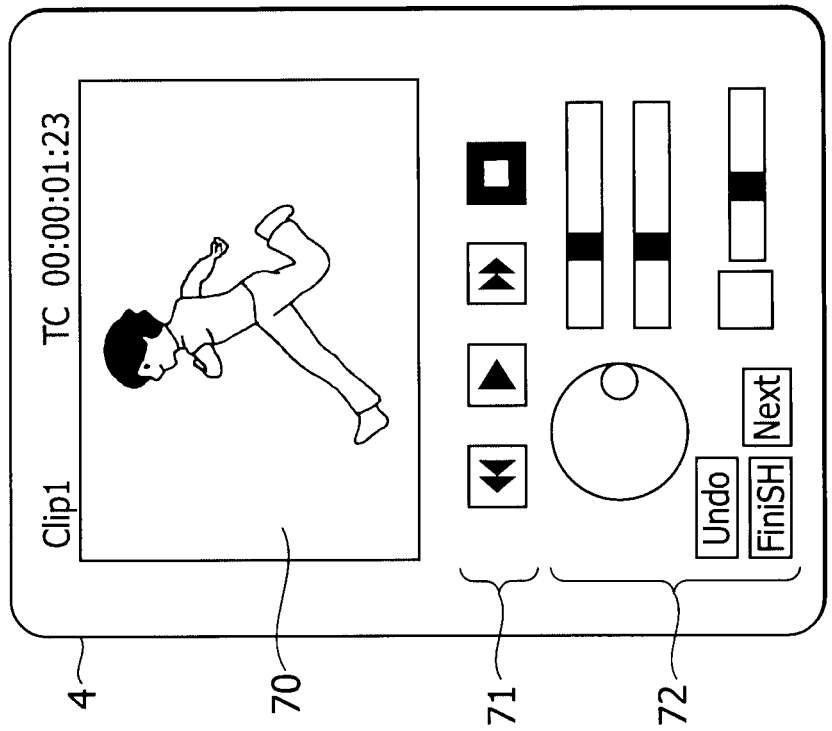
FIGS. 39A, 39B are diagrams illustrating a screen for editing and a screen after editing of the cover display according to the embodiment.

After a certain clip has been selected and then its clip images have been unfolded on the sheets 7, 7 as mentioned above, it is designed to display an editing screen such as shown in FIG. 39A on the cover display 4.

An image of a clip selected as a clip image display 70 is displayed on this editing screen. Also, as various operator displays, operator images 71 regarding animation playback and operator images 72 used for editing operation are displayed.

The operator images 71 include, e.g., operation button images for operations, e.g., playback, fast rewind, fast forward, and stop are displayed, allowing the user to give animation playback-related instructions via touch operation. The user can instruct playback, fast rewind, fast forward, and stop for an animation as the clip image display 70 by operating the operator images 71. The main controller 20 performs animation playback control for a selected clip, responsive to touch operation on the operator images 71.

The operator images 72 used for editing operation include a dial image, fader images, and button images, allowing the user to perform various editing operation via touch operation.

For example, the user can perform adjustment operation for luminance and chrominance levels as video levels, motion control (animation speed setting) operation, image effect operation such as reverse video and fade-in/out, and operations such as undo, end, and forward of editing operation.

Accordingly, the user can make various edit setting inputs such as video levels and image effects, while viewing animation video for a clip.

Figure 44:
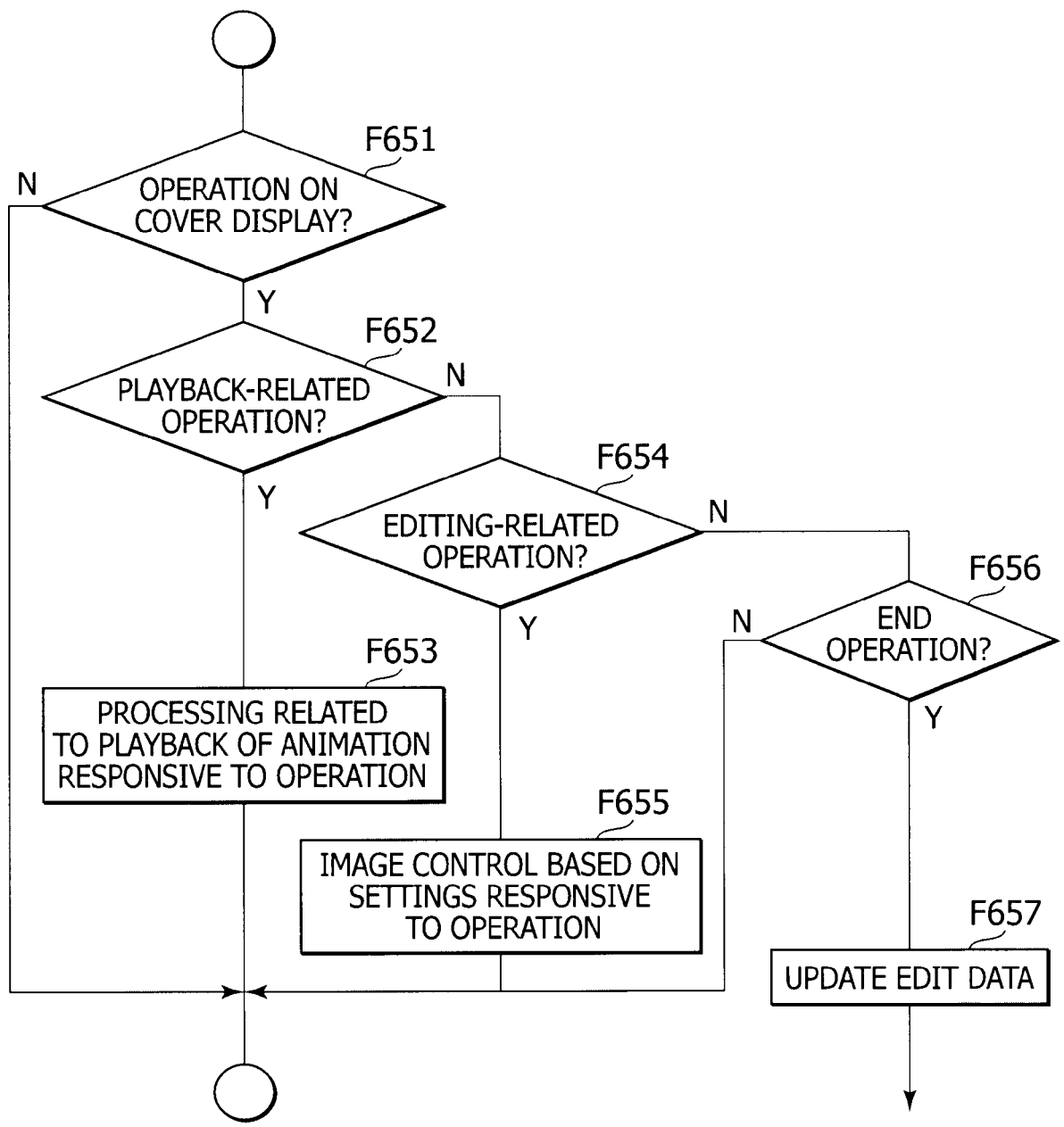
FIG. 44 is a flowchart for cover editing processing according to the embodiment.

FIG. 44 shows processing by the main controller 20 during display of such an editing screen.

The main controller 20 proceeds from step F651 to step F652 when having sensed a touch operation on an editing screen such as shown in FIG. 39A.

If the sensed touch operation is an operation for one of the operator images 71 regarding animation playback, the main controller 20, proceeding from step F652 to step F653, performs animation playback control responsive to the operation.

If, e.g., a playback button has been pressed, the main controller 20 starts animation playback for a selected clip. In this case, the main controller 20 causes the nonvolatile memory 22 to read frame image data about the clip one item after another and transfer the read data to the display data generator 24. The display data generator 24 performs display processing such that the frame image data is displayed as the clip image display 70 at its original frame rate one item after another, thereby displaying the animation in playback.

In a fast rewind or a fast forward operation, the main controller 20 performs playback in a fast rewind or a fast forward mode. For example, for playback in the fast forward mode, the main controller 20 causes the nonvolatile memory 22 to sequentially read frame image data in decimation, and then causes the display data generator 24 to sequentially display the read data as the clip image display 70, thereby executing playback in the fast forward mode.

When having sensed a stop operation, the main controller 20 stops the playback, and keeps displaying a frame image at the instance of the stop.

When the sensed operation corresponds to an operator image 72 used for editing operation (except for an edit end operation), the main controller 20 proceeds from step F654 to step F655, and performs image control using settings based on the operation.

For example, if an operation for video level adjustment has been performed, the main controller 20 holds luminance/chrominance values based on the operation as edit values, and also delivers the luminance/chrominance levels as the edit values to the display data generator 24, to change the luminance/chrominance levels in the clip image display 70 displayed as an animation during playback or as a still image during stop.

By this operation, the user can make proper adjustment of a video level such as the chrominance level, while viewing the clip image display 70.

Even when operations such as an image effect control operation and a motion control operation have been performed, the main controller 20 stores edit values and also reflects them in the clip image display 70, responsive to these operations.

When having sensed an edit end operation performed by the user, the main controller 20 proceeds its processing from step F656 to step F657, and updates the edit data on the basis of the edit values so far held, and then ends the editing processing.

Figure 39B:
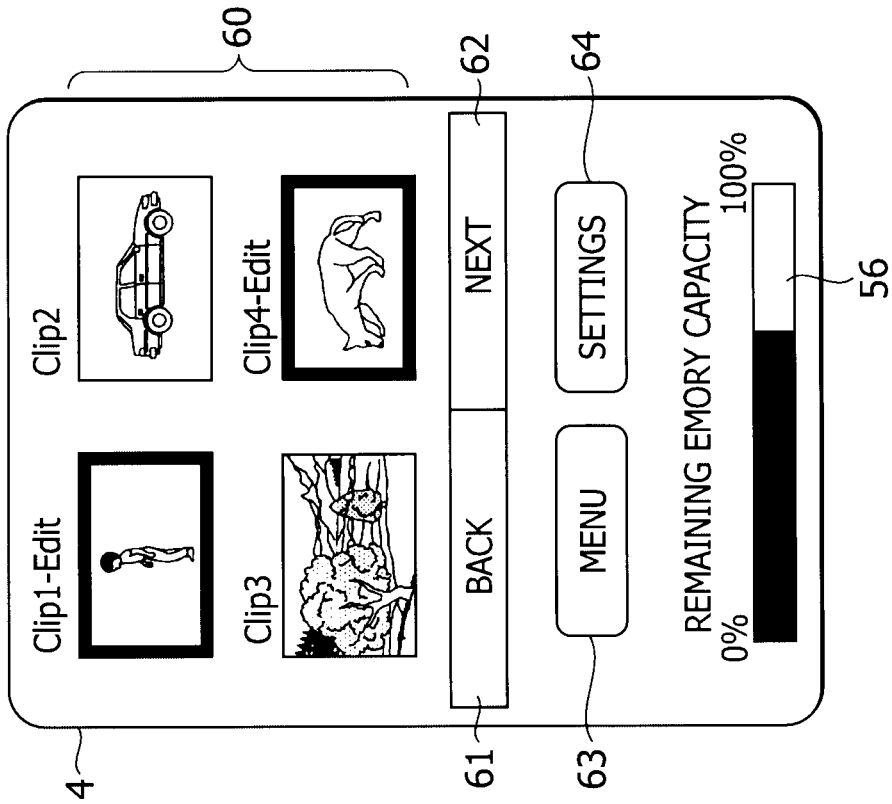

FIG. 39B shows a display example in which thumbnail pictures are displayed on the cover display 4, after the editing operator has performed cut-editing by using the sheets 7, 7 . . . and editing by viewing an animation in playback on the cover display 4.

This thumbnail display screen after editing may be switched by, e.g., a screen switching operation by the user from the editing screen of FIG. 39A. Alternatively, when ending its editing processing of FIG. 44, the main controller 20 may automatically switch the image on the cover display 4 to thumbnail pictures such as shown in FIG. 39B.

In this thumbnail display 60 after editing, clips already edited at least once by the user are so indicated. Here, an example is shown in which edited clips are highlighted by adding a word "Edit" to the names of the clips and by framing the thumbnail pictures.

The above is the editing operations performed after the user has specified a certain clip and then unfolded the clip on the sheets 7, 7 . . . .

The user can continuously select a next arbitrary clip, cut-edit it, and perform other editing thereon similarly to the above. By selecting a clip not yet selected in the thumbnail display 60 of, e.g., FIG. 39B, the user can unfold the selected clip on the sheets 7, 7 . . . and perform editing using the sheets 7 and the cover display 4.

Of course, the user may select any edited clip again to check its contents and/or perform editing operations thereon.

The user may also specify a plurality of IN points and OUT points for a single clip.

It is noted that clip editing such as above can be executed not only in the editing master book 1M but also similarly in any of the editing books 1.

[III-4. Editing Procedure]

So far, clip editing using the editing master book 1M has been described. In the following, editing for joining clips in a time-axis sequence using editing books 1 and the editing desk 300 will be described.

Figure 45:
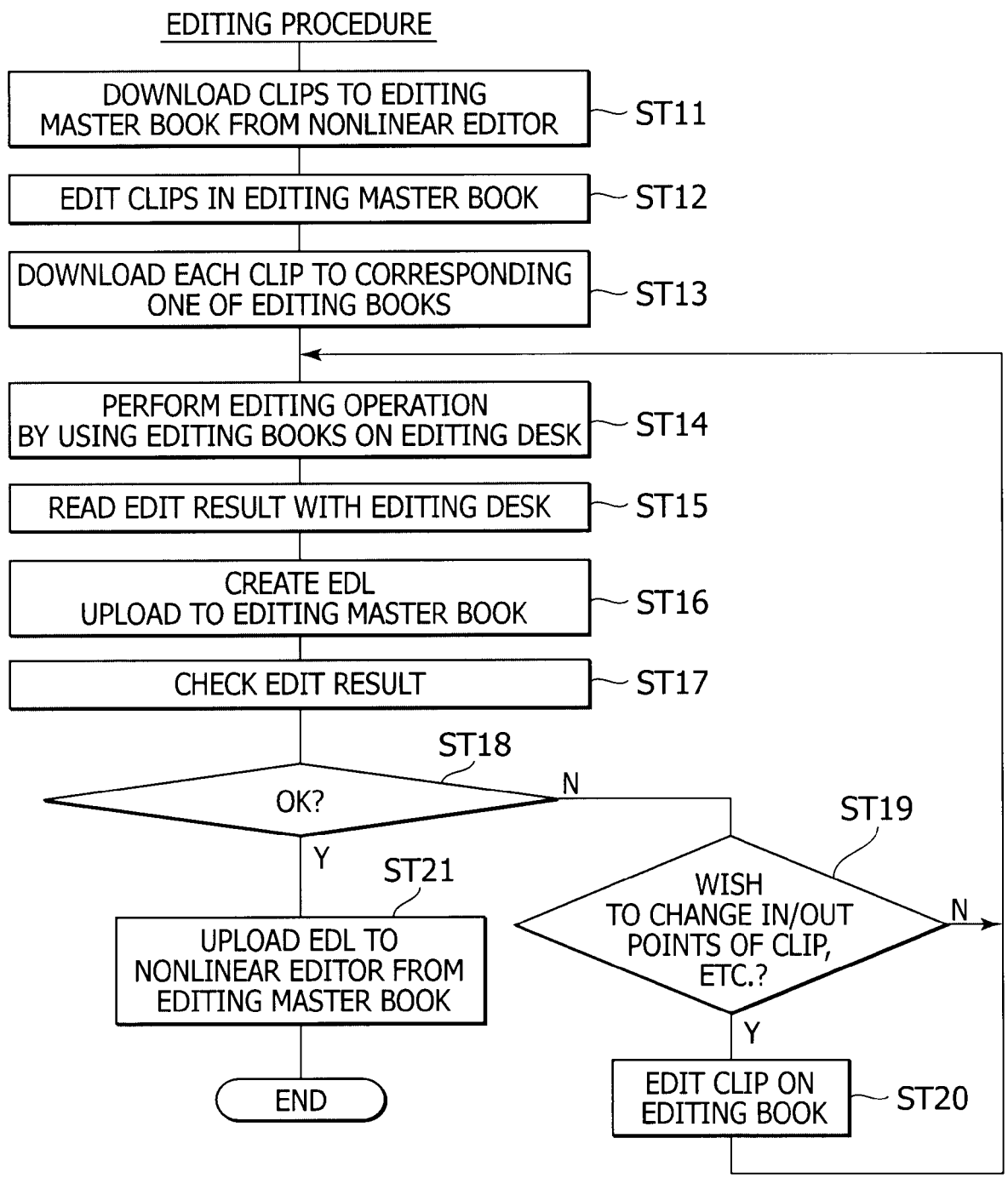
FIG. 45 is a flowchart for an editing procedure according to the embodiment.

FIG. 45 shows an editing operation procedure performed using the nonlinear editor 100, editing master book 1M, editing books 1, and editing desk 300 described above, as steps ST11-ST21.

In step ST11, as mentioned earlier, many clips used for content production are downloaded to the editing master book 1M from the nonlinear editor 100.

Then, in step ST12, clip editing is performed in the editing master book 1M. This includes the setting of IN/OUT points using the sheets 7, 7 . . . and the editing operation on the cover display 4, as mentioned above.

After the clips have been edited in the editing master book 1M, then, in step ST13, the editing operator causes the editing master book 1M to download each single clip information to a corresponding one of the editing books, with the connection of FIGS. 34A, 34B established.

The contents of the clip information downloaded to each editing book 1 includes the clip number (clip identifier), time codes at the IN/OUT points, and frame image data (e.g., still image data obtained by JPEG-compressing all frame images) forming a clip animation.

For example, single clip information is supplied to a single editing book 1, such that clip information about a clip CL1 is downloaded to an editing book 1, and clip information about a clip CL2 is downloaded to another editing book 1.

Figure 47:
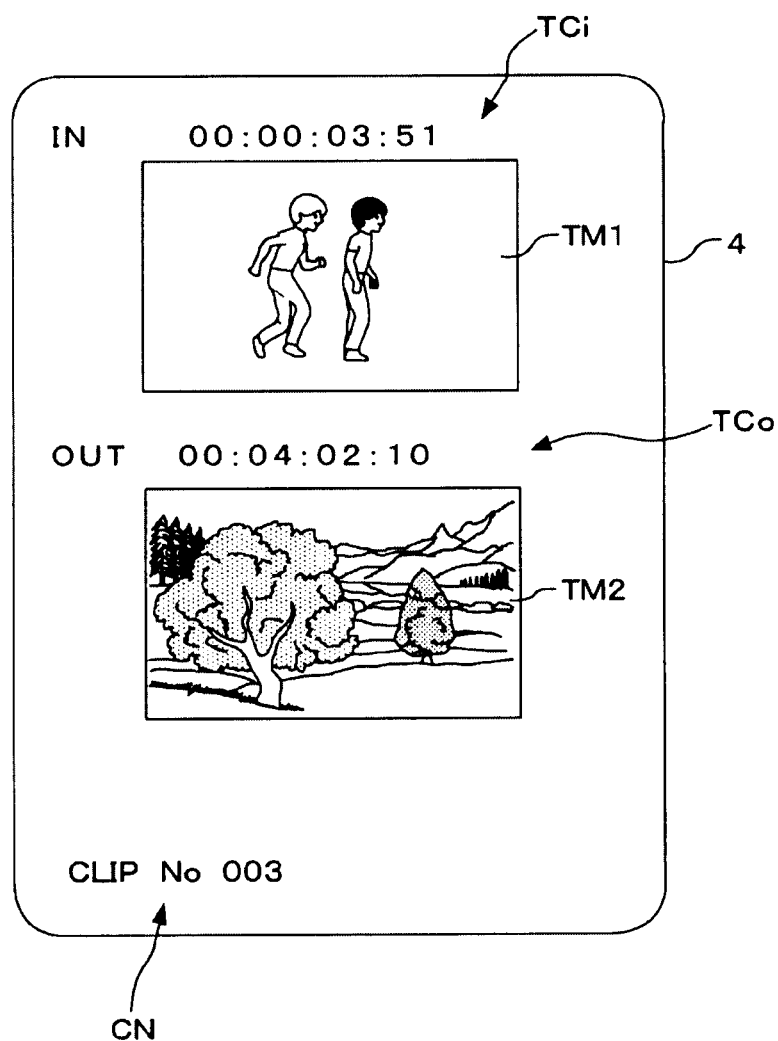
FIG. 47 is a diagram illustrating a display on the cover display of the editing book according to the embodiment.

Each editing book 1, when having the clip information downloaded thereto, makes a display such as shown in FIG. 47 on its cover display 4, representing the contents of the corresponding clip.

For example, for a clip with its IN/OUT points set, a thumbnail picture TM1 based on a frame image at the IN point, a time code TCi at the IN point, a thumbnail picture TM2 based on a frame image at the OUT point, a time code TCo at the OUT point, a clip number CN appended for clip management in the nonlinear editor 100 and the editing master book 1M are displayed as shown in the figure.

As a result of such a display, the editing operator can recognize which editing book 1 corresponds to which clip having what video contents.

The main controller 20 of the editing book 1 performs clip video unfolding processing of FIG. 42 upon having single clip information downloaded, thereby unfolding and displaying frame images forming the clip on the sheets 7, 7 . . . . By this processing, the operator can view on a single editing book 1 the video contents of a corresponding clip in detail.

Next, in step ST14, the editing operator arranges such editing books 1 in the horizontal and/or vertical directions on the editing desk 300, in a desired sequence.

After having finished arranging the editing books 1 as desired, the editing operator instructs the editing desk 300 to read their arranging sequence.

In step ST15, the editing desk 300 reads the sequence of the editing books 1 arranged in the horizontal and/or vertical directions on the editing surface 301.

Then, in step ST16, the editing desk 300 creates edit data (EDL) on the basis of the read time sequence, and uploads the created edit data to the editing master book 1M.

In step ST17, the editing operator checks an edit result. For example, the editing operator plays back clip video in the cover display 4 of the editing master book 1M, on the basis of the edit data uploaded from the editing desk 300, and then checks it. That is, the operator plays back video content obtained by joining many clips in a sequence specified by the edit data, and checks the edit result.

When the editing operator OKs in step ST18, the editing master book 1M uploads the edit data to the nonlinear editor 100 in step ST21.

Then, the nonlinear editor 100 captures the edit data transmitted thereto into the storage 102, and also reflects that edit data as an edit result about the clips in a manner handling the edit data as if it were edit data operated by the nonlinear editor 100 itself. By this operation, the nonlinear editor 100 has created video content as, e.g., complete packet data.

The above completes a series of editing operations.

Meanwhile, if the editing operator does not OK the edit result checked in step ST17, the processing proceeds to step ST19. The editing operator judges whether or not he or she needs to change IN/OUT points for a certain clip in step ST19. If not, the operator redoes the operation from step ST14. That is, by using the editing books 1 as they are, the operator re-considers their sequence again on the editing desk 300.

If wishing to change IN/OUT points of the clip itself or change effects, for example, the editing operator can re-edit the clip using the editing book 1 representing that clip, in step ST20. That is, the editing operator can update the edit data on the clip itself using the editing book 1 similarly to the editing master book 1M, by performing, on the editing book 1, editing operations such as setting IN/OUT points using the sheets 7, 7 . . . and editing various video effects on the cover display 4 which are supposed to be performed by the editing master book 1M as mentioned above. The main controller 20 of the editing book 1 may only need to perform the processing of FIGS. 43, 44, responsive to operations by the editing operator.

Then, after having re-edited the clip, the operator redoes the operation from step ST14.

Although not shown in FIG. 45, if the editing operator does not wish to change the clip sequence but wishes to change, e.g., IN/OUT points of a certain clip at a timing after the check of step ST17, the editing operator may redo clip editing such as above by specifying the clip on the editing master book 1M at that timing, and thereafter proceed to step ST21.

[III-5. Clip Downloading Operation to Editing Books]

The above is the series of editing operation procedure.

Here, an operation by each component during downloading of the clip information to the editing books 1 in step ST13 of FIG. 45 will be described.

Figure 46:
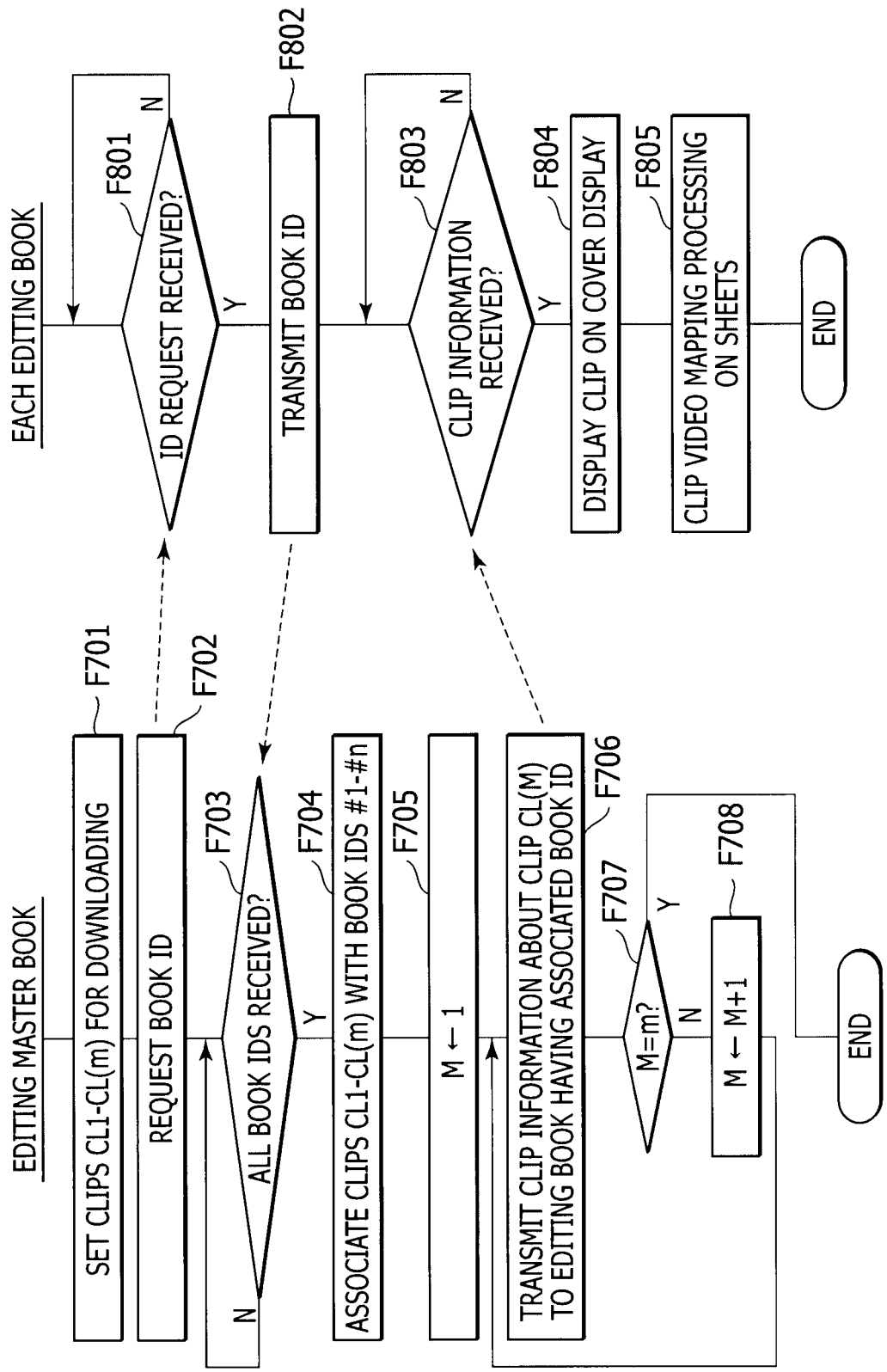
FIG. 46 is a flowchart for clip downloading processing according to the embodiment.

FIG. 46 shows a processing example during downloading of clip information performed by the main controller 20 of the editing master book 1M and the main controller 20 of each editing book 1.

First, on the editing master book 1M side, the editing operator performs operations of, e.g., selecting a plurality of clips for which IN/OUT points have been set as mentioned above, and instructing downloading of clip information about these clips.

Responsive thereto, first, in step F701, the main controller 20 of the editing master book 1M sets the plurality of selected clips about which the clip information is to be downloaded, to clips CL1-CLm.

Then, in step F702, the main controller 20 of the editing master book 1M transmits ID request information to each of the plurality of editing books 1 connected as shown in FIGS. 34A, 34B, requesting the editing book 1 to transmit its book ID thereto.

When having received the ID request information, the main controller 20 of each editing book 1 proceeds from step F801 to step F802, and transmits its book ID to the editing master book 1M.

By this operation, the editing master book 1M acquires the book IDs from all the editing books connected thereto.

When having received the book IDs of all the editing books 1 connected thereto, the main controller 20 of the editing master book 1M proceeds from step F703 to step F704, and associates the book IDs with the m clips set for downloading in step F701.

This is processing similar to the association described earlier with reference to FIG. 26. That is, the book IDs associated with the clips CL1-CLm are stored on the editing master book 1M side.

After having finished associating the clips with the book IDs, the main controller 20 of the editing master book 1M starts downloading the clip information in step F705 forward.

First, in step F705, the main controller 20 of the editing master book 1M sets the variable M=1. Then, in step F706, the main controller 20 transmits clip information about a clip CL(M) to an editing book 1 having a book ID associated therewith.

If, e.g., an editing book 1 whose book ID=#1 is associated with the clip CL1, the clip number, time codes at IN/OUT points, frame image data forming an animation corresponding to the clip CL1 are transmitted to an editing book 1 whose book ID=#1.

In this case, when having received the clip information in step F803, the main controller 20 of the editing book 1 whose book ID=#1 proceeds to step F804, and causes its cover display 4 to execute display such as shown in FIG. 47 representing the contents of the clip.

Then, in step F805, the main controller 20 of the editing book 1 whose book ID=#1 performs the processing of FIG. 42 for the received clip CL1, unfolding clip images on the sheets 7, 7 . . . .

The above completes downloading for the editing book 1 whose book ID=#1.

After having finished transmitting single clip information, the main controller 20 of the editing master book 1M checks the variable M and the number m of clips in step F707 to check whether or not the clip information has been transmitted for all the clips for downloading.

If not, the main controller 20 increments the variable M in step F708, and returns to step F706. Accordingly, the main controller 20 then transmits clip information about the clip CL2 to an editing book 1 having an associated book ID (e.g., the book ID=#2).

The main controller 20 of the editing book 1 whose book ID=#2, which has received the clip information proceeds from step F803 to steps F804, 805, and makes a display on the cover display 4 representing the contents of the clip and unfolds clip images on the sheets 7, 7 . . . , after which it completes the downloading operation.

The editing master book 1M repeats the processing of step F706 until the variable M=the number m of clips for downloading in step F707. That is, the editing master book 1M transmits clip information to editing books 1 one after another.

Then, when having finished transmitting the clip information for as many as m clips CL1-CLm, the main controller 20 of the editing master book 1M ends its downloading processing.

By such processing of FIG. 46, the clip information about each of the plurality of clips CL1-CLm has been downloaded to a corresponding one of as many as m editing books 1.

Then, each editing book 1 executes display representing the contents of the clip on its cover display 4 and sheets 7, 7 . . . , thereby allowing the editing operator to recognize the contents of the clip.

Thereafter, the editing operator starts the operation of arranging the editing books 1 in the horizontal and/or vertical directions on the editing desk 300.

It is noted that the editing operator arranges the editing books 1 on the editing desk 300 in step ST14 of FIG. 45. Since clip images are in display on the sheets 7, 7 . . . on each editing book 1 at this time, the editing operator can continue his or her editing operations while checking their video content in great detail and with extreme ease.

It is noted that each editing book 1 keeps its power turned on in order to maintain the display on the cover display 4. However, if performing editing operation on the editing desk 300 some time after having clip information downloaded, the editing operator may temporarily turn off the power of the editing books 1 after the downloading operation and then turn on the power again when performing operation on the editing desk 300. Any editing book 1 having the downloaded clip information has its power turned on, resumes the display of FIG. 47 on the cover display 4, and also unfolds clip images again on the sheets 7, 7 . . . .

[III-6. Operation During Editing by Editing Desk]

Next, processing performed by the editing desk 300 and the editing books 1 in steps ST15, ST16 of FIG. 45 will be described.

Figure 48:
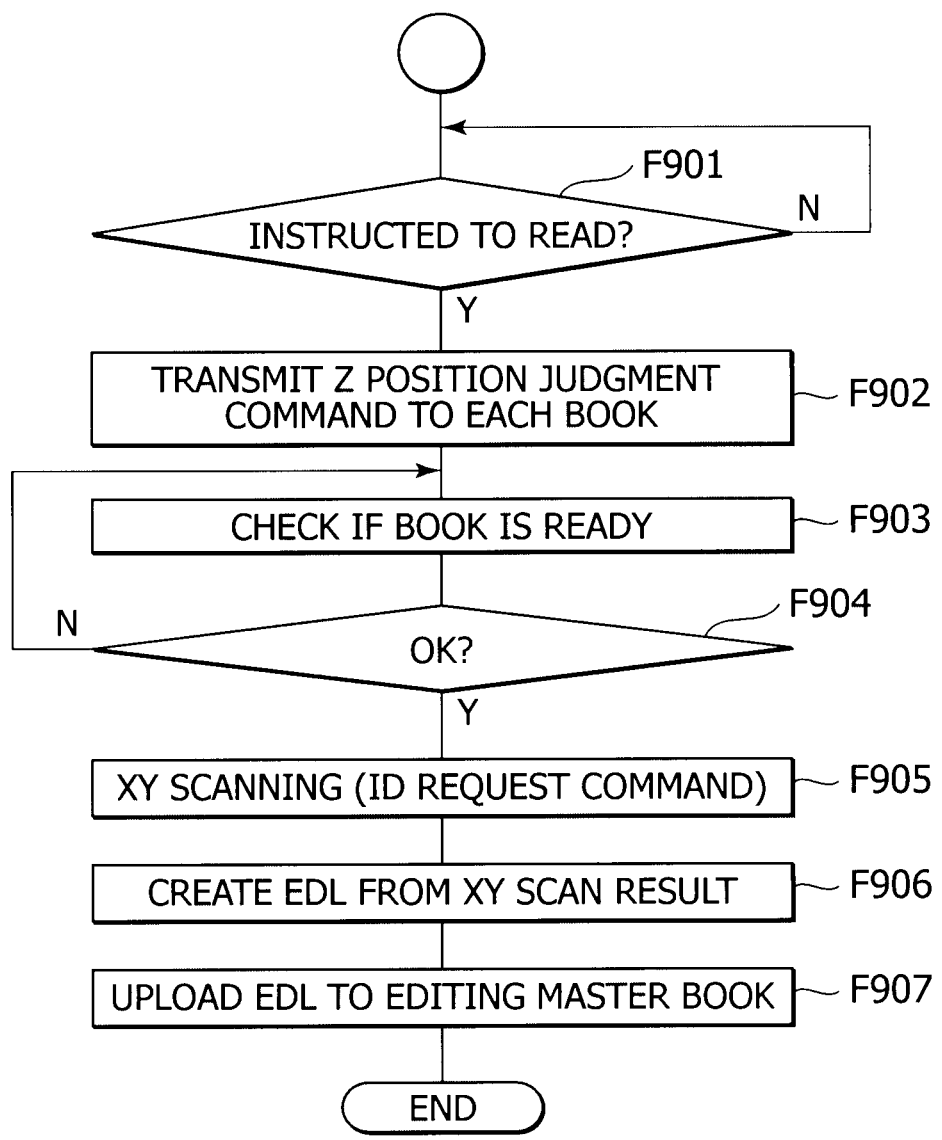
FIG. 48 is a flowchart for processing during editing by the editing desk according to the embodiment.

FIG. 48 shows processing performed by the desk controller 310 when the editing operator has finished arranging the editing books 1 on the editing desk 300 and then has performed the operation of instructing the editing desk 300 to read.

Responsive to the editing operator having performed the operation of instructing reading of the arranging sequence of the editing books 1 through the operation section 302, the desk controller 310 proceeds the processing of FIG. 48 from step F901 to step F902.

First, in step F902, the desk controller 310 causes the control judging section 314 to transmit a Z position judgment command (command for judging a position in a pile) to each of the editing books 1 on the editing surface 301 via noncontact wireless communication.

In this case, either the X-axis antenna array 320 or the Y-axis antenna array 321 is selected, and all (or part of) the antennas of the selected antenna array are driven, so that the Z position judgment command is transmitted to all the editing books 1 on the editing surface 301.

Then, in step F903, the desk controller 310, while transmitting a "check if ready" command to all the editing books 1 via noncontact wireless communication, waits until it is confirmed that all the editing books 1 are "ready" in step F904 through their responses.

Figure 49:
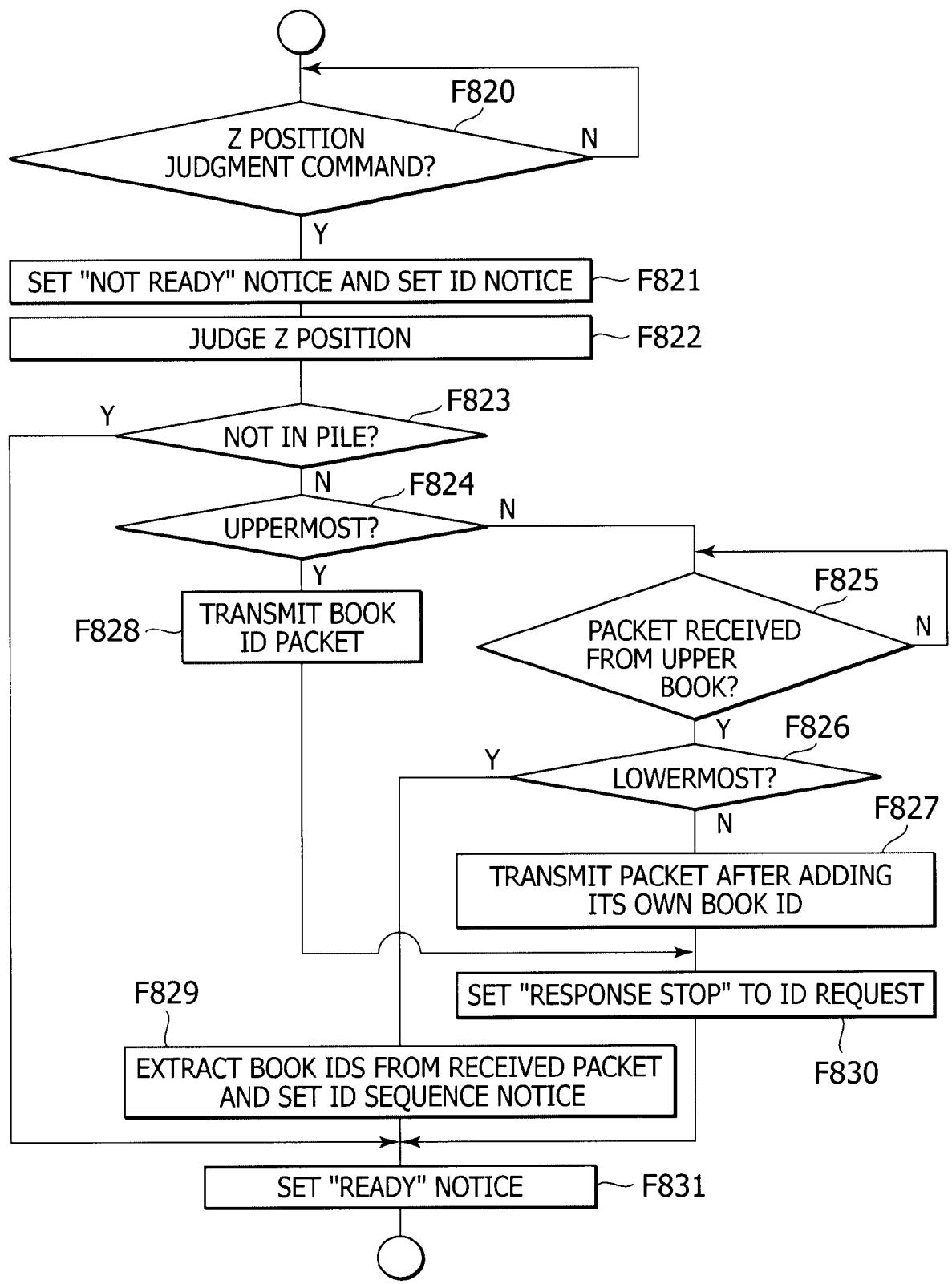
FIG. 49 is a flowchart for processing by the editing book during reading by the editing desk according to the embodiment.

If having received the Z position judgment command from the editing desk 300 through the memory tag 30, each of the editing books 1 arranged on the editing surface 301 informs the main controller 20 of the Z position judgment command from the tag controller of the memory tag 30, so that the main controller 20 starts processing of FIG. 49.

When having received the Z position judgment command, the main controller 20 proceeds from step F820 to step F821 of FIG. 49, and first instructs the tag controller of the memory tag 30 to set a notice for conveying a "not ready" response to the editing desk 300.

That is, while the editing desk 300 repeatedly issues a "check if ready" request command in step F903, the main controller 20 instructs the tag controller of the memory tag 30 to transmit information indicating "not ready" as its response.

Also, as a response setting to the ID request command from the editing desk 300, the main controller 20 sets such that its book ID will be transmitted.

The editing desk 300 transmits an ID request command during XY scan in later-described step F905 of FIG. 48. However, this response setting means a setting for returning its book ID to this ID request command. The tag controller of the memory tag 30 makes a response setting such that its card ID will be transmitted to the ID request command.

Then, in step F822, the main controller 20 of the editing book 1 checks magnetism detection signals from the predetermined number of Hall elements 31, and thus judges the Z-direction position (position in a pile) of the self editing book 1. That is, the main controller 20 recognizes from the results detected by the Hall elements 31 whether or not the self editing book 1 is in a pile with other editing books 1, and, if it is in a pile, where it is positioned, uppermost, in between, or lowermost in the pile.

If the self editing book 1 is not in a pile with other editing books 1, the main controller 20 proceeds from step F823 to step F831, and sets a notice for conveying a "ready" response to the editing desk 300. That is, the main controller 20 instructs the tag controller of the memory tag 30 to transmit information indicating "ready" as a response to the "check if ready" request command in step F903 from the editing desk 300. The tag controller of the memory tag 30 re-writes the "not ready" information so far set with "ready" information on the semiconductor memory, as response data to the "check if ready" request command.

If the self editing book 1 is in a pile with other editing books 1, the main controller 20 proceeds from step F823 to step F824.

Then, if the self editing book 1 is positioned uppermost, the main controller 20 proceeds to step F828, and performs book ID packet transmission control. The main controller 20 generates a packet in which its book ID is written to the data area AR1, and outputs the packet from the light emitting system 34 as an optically modulated signal.

Then, after having finished the optical transmission, the main controller 20 proceeds to step F830, and sets "response stop" to the ID request command from the editing desk 300.

This is to set, when the editing desk 300 has issued an ID request command during XY scan in later-described step F905 of FIG. 48, if the editing book 1 is positioned uppermost, such that the memory tag 30 will not react with (or reply with invalid data to) that ID request command.

In the above step F821, a basic setting for transmitting its book ID to the ID request command has been made. However, in this case, the memory tag 30 invalidates the setting for transmitting its card ID made in step F821, and sets "response stop" to the ID request command, responsive to an instruction for setting "response stop" form the main controller 20.

Thereafter, the main controller 20 proceeds to step F831, and sets a notice for conveying a "ready" response to the editing desk 300, to the tag controller of the memory tag 30.

If the self editing book 1 is in a pile with other editing books 1, but is not positioned uppermost, the main controller 20 proceeds to step F825, and waits to receive a packet by optical communication from the uppermost editing book 1.

When having received the packet from the upper most editing book 1 through the light receiving system 33, the main controller 20 branches the processing in step F826, on the basis of whether it is positioned in between or lowermost in the pile.

If the self editing book 1 is positioned in between in the pile, the main controller proceeds to step F827, and performs card ID packet transmission control. The main controller 20 generates a packet such as shown in, e.g., FIGS. 22C, 22D, in which its book ID is added to the received packet format, and outputs the packet as an optically modulated signal from the light emitting system 34.

Then, in step F830, the main controller 20 instructs the memory tag 30 to set "response stop" to the ID request command from the editing desk 300. In step F831, the main controller 20 also instructs the memory tag 30 to set a notice for conveying a "ready" response to the editing desk 300.

If the self editing book 1 is positioned lowermost in the pile, the main controller 20 proceeds from step F826 to step F829 responsive to the optically communicated packet in step F825, and sets ID sequence data by extracting the card IDs conveyed in the received packet from the upper editing book 1 and then adding its card ID thereto. That is, the main controller 20 generates ID sequence data in which the book IDs are arranged in a descending sequence from top of the pile. Then, the main controller 20 informs the tag controller of the memory tag 30 of this data so that the tag controller will set this ID sequence data as response data to the ID request command from the editing desk 300. The memory tag stores the ID sequence data in the semiconductor memory, thereby setting this data as a response to the ID request command.

Thereafter, in step F831, the main controller 20 instructs the memory tag 30 to set a notice for conveying a "ready" response to the editing desk 300.

In step F903 of FIG. 48, the desk controller 310 repeatedly issues a "check if ready" request command to each editing book 1 via noncontact wireless communication, and receives a "not ready" or a "ready" notice from the editing book 1 as a response thereto.

The desk controller 310 OKs in step F904 when all the responses are "ready".

Then, responsive to the fact that all the editing books 1 are "ready", the desk controller 310 proceeds to step F905, to perform XY scan with transmission of ID request commands.

That is, as described with reference to FIGS. 14A, 14B, the desk controller 310 sequentially drives the antennas of the X-axis antenna array 320, the Y-axis antenna array 321. At this time, an ID request command is transmitted from each antenna. Responsive thereto, any editing book 1 not in a pile replies its card ID, while any editing book 1 in a pile, if positioned uppermost or in between, does not reply due to a "response stop" setting made to the ID request command, and if positioned lowermost, returns ID sequence data about the editing books in the pile.

At this time, the card position detector 312 judges the XY coordinates of the editing books 1 (and the editing books in the pile) on the basis of the book IDs (and the ID sequence data) as their responses and their electric field strengths detected during reception of the book IDs, and notifies the desk controller 310 of a judgment result.

The desk controller 310 judges a time sequence of the book IDs on the basis of the book IDs (and the ID sequence data) received as the responses and the XY coordinate values for the book IDs (and the ID sequence data).

When having finished the XY scan, the desk controller 310 causes the EDL creator 311 to create edit data (edit list EDL) in step F906 on the basis of a scan result (being the time sequence of the book IDs), e.g., such as above.

Then, in step F907, the desk controller 310 causes the external interface 304 to upload the created edit data to the editing master book 1M.

The editing master book 1M associates each clip with a book ID in step F704 of FIG. 46. Thus, when having received, e.g., the edit data indicating the card ID sequence, the editing master book 1M can replace this with a clip sequence.

Accordingly, edit data indicating an actual clip sequence can be generated from the edit data uploaded from the editing desk 300, and this can be used as edit data for video content, for example.

In step ST17 of FIG. 45, an edit result is checked. By causing the editing master book 1M to play back the clips in this clip sequence on the cover display 4, the editing operator can recognize video content being the edit result obtained using the editing desk 300, actually as video.

<IV: Advantages and Modified Examples of the Embodiment>

According to the above-described embodiment, the editing operator can perform animation editing in which clips are joined along a time axis, by an extremely intuitive operation such as arranging and/or piling, on the editing desk 300, editing cards 200 or editing books 1 each representing the contents of a clip on the basis of inputted clip information.

That is, the operator may only have to perform the operation of arranging the editing cards 200 or the like in sequence, while merely recognizing the contents of the clips, without complicated operation, so that the operator can perform efficient video editing without skill in the device. This also permits the operator to concentrate exclusively on the contents of video and the details of editing.

When using editing cards 200, the operator can check clip images corresponding to an editing card 200 on the nonlinear editor 100 in the form of an animation, by, e.g., specifying the editing card 200.

If using editing books 1, the operator can check the contents of a clip instantly since an editing book 1 itself takes the form of a book representing the clip. Of course, not only by checking the contents in the form of time-sequential still images on the sheets 7, 7 . . . , but also by displaying the clip animation itself in playback on, e.g., the cover display 4, the operator can even check the actual animation.

Since the operator can continue editing while capable of checking an animation corresponding to each clip with extreme ease, the operator can continue editing, while thinking about the composition of animation content more accurately.

Furthermore, the editing cards 200 or editing books 1 can be arranged on the editing desk 300 not only horizontally but also vertically in a pile, no surface area wider than necessary need be provided as the editing surface 301.

For example, by piling editing cards 200 or editing books 1 in a fixed sequence, the area of the editing surface 301 can be utilized effectively, thereby accommodating the need for production of full-length video content formed of a huge number of clips.

The unit video representing device as an editing card 200 or an editing book 1 makes a display representing the contents of unit video on the basis of inputted unit video information.

Thus, the device requires no cumbersome preparation, such as preparing, e.g., image-printed cards, nor entails waste such as discarding the printed cards after editing as these cards are no longer needed, thereby reducing time, cost, and environmental loads.

Of course, the editing card, the editing book is used to represent a clip every time the clip is downloaded, and thus can be used repeatedly for a very long period of time.

Furthermore, the need for re-editing is also accommodated with ease.

Changes in IN/OUT points of a clip, changes in a clip joining sequence, and the like can further be flexibly and easily accommodated.

Furthermore, in the editing book 1, a sheet 7 is formed of electronic paper. Once the electronic paper has displayed an image thereon, it can keep the image for some time (e.g., for about a week, depending on the type of electronic paper) even with the power turned off.

Accordingly, after having unfolded clip images on the sheets 7, 7 . . . , the images can be checked on the sheets 7 with the power turned off. For example, even when the user turns off the power to save the battery while he or she is out of home or office or moving, when the battery has run out, or the like, the user can still check the images of a clip.

Furthermore, in the editing card 200, thumbnail pictures representing a clip and the like are displayed on the electronic paper section 201. This display is kept with no power supplied. Thus, the user can turn off the power during normal use, thereby realizing a longer service life of the incorporated battery.

By using the editing master book 1M, editing of a clip itself is greatly facilitated. For a downloaded clip, the editing master book 1M can unfold frame images forming its animation on the sheets 7, 7 . . . such that they are arranged on pages sequentially in the time-axis direction. This allows the user to check the contents of the clip as if he or she were taking a look at a book. In this sense, the user or the like trying to produce video content is allowed to check the contents of a clip as a video material easily. In addition, unlike the operation of checking the contents of video using a dedicated editing machine requiring complicated operation such as the nonlinear editor 100, the contents of video can be checked with extreme ease. Thus, even those who are not skilled in editing can handle the device.

Furthermore, the user can check the contents of animated video as if he or she were turning pages one after another. The user can also check the animation as if skimming frame images like a comic. In that case, the user can experience such a realistic feeling of viewing the animation, which could be extremely suitable for checking the contents of the animation and searching edit points.

Furthermore, even regarding the operation of specifying IN/OUT points using the sheets 7, 7 . . . , the user may only have to specify an image fixedly displayed on the sheet, thereby allowing the user to operate intuitively. Thus, anyone will be allowed to perform cut-editing easily without skill.

Still furthermore, the user can perform not only cut-editing, but also various editing while viewing an animation on the cover display 4. This accommodates the need for high-level editing operations.

The present invention is not limited to the above-described embodiment, but may include various modifications.

In the editing card 200 and the cover display 4 of the editing book 1, clip representations include not only images at IN/OUT points, but also other thumbnail pictures. Also, a single thumbnail picture or three or more thumbnail pictures may be displayed.

The images at the IN/OUT points displayed on the editing card 200 and the editing book 1 may be re-written via noncontact wireless communication from the editing desk 300.

Also, the clip information may include textual data or the like explaining the contents of the clip, so that the text may be displayed in the editing card 200 and the editing book 1.

Additionally, the clip information may include audio data. In that case, an audio playback function may be provided in the editing card 200 and the editing book 1, so that the contents of the clip can be represented even by outputting the audio data in playback, responsive to an operation by the editing operator.

The display section inside the editing card 200 may be constructed as a display device (a liquid crystal panel, an organic EL panel, or the like) capable of displaying animations, such as the cover display 4 of the editing book 1, so that a clip animation can be displayed on that display section.

Furthermore, communication is implemented by a cable connection based on a communication method, such as the USB or IEEE 1394 device, between equipment such as the nonlinear editor 100, editing cards 200, card binder 150, editing desk 300, editing master book 1M and editing books 1 in the embodiment. However, each equipment may incorporate a communication unit for wireless LAN, Bluetooth, optical communication, or the like, so that downloading and transfer of edit data may be performed via wireless communication.

Furthermore, communication between the card binder 150 (editing cards 200) and the nonlinear editor 100, communication between the editing desk 300 and the nonlinear editor 100, communication between the editing master book 1M and the nonlinear editor 100, and the like may be implemented by communication via a network such as the Internet.

In that case, clips can be downloaded and edit data can be transmitted by communication with the nonlinear editor 100 at a remote location. For example, an editing operator engaged in broadcasting can edit video materials by accessing the nonlinear editor 100 belonging to a broadcasting station outside the broadcasting station.

There may be various antenna structure and scan operation for the XY scan in the editing desk 300. Any structure and operation may be acceptable as long as the ID and position of each of editing cards 200 or editing books 1 arranged on the editing surface 301 can be judged.

While the editing desk 300 is configured to read the card ID of an editing card 200 or the book ID of an editing book 1 in the embodiment, it may also be configured such that the editing card 200 or the editing book 1 transmits a corresponding clip number to the editing desk 300 via noncontact wireless communication.

That is, the editing card 200 or the editing book 1 sets the clip number as a response to an ID request command from the editing desk 300 responsive to corresponding clip information being downloaded, and transmits the response during XY scan in the editing desk 300.

The editing desk 300 generates edit data by arranging clip numbers in a time sequence according to a sequence of the editing cards or the editing books on the editing surface 301, and uploads the generated edit data to the nonlinear editor 100 or the editing master book 1M.

By doing so, the nonlinear editor 100 or the editing master book 1M no longer needs to associate the card IDs (book IDs) with the clip numbers when downloading the clips to the editing cards 200 or the editing books 1, respectively.

While clip information is downloaded from the editing master book 1M to each editing book 1 in the embodiment using the editing master book 1M and the editing books 1, there may be a configuration in which the editing master book 1M is not used.

That is, this is a configuration in which the nonlinear editor 100 downloads, e.g., clip information about each clip with IN/OUT points already set to a corresponding one of the editing books 1, an editing operation is performed on the editing desk 300 using each editing book 1, and then the editing desk 300 uploads edit data to the nonlinear editor 100.

It may further be configurable such that the editing master book 1M downloads clip information to many editing cards 200, and editing is performed by arranging the editing cards 200 on the editing desk 300.

While the editing desk 300 reads the position of an editing card 200 (or editing book 1) in a fixed state and reflects the read position in generating edit data, the editing desk 300 may detect an editing card 200 (or editing book 1) moving over the editing surface 301, for example.

By utilizing this, editing forgiving, e.g., wipe effects to video can be realized by moving the editing card 200 in real time and calculating its locus.

For example, when the editing operator has superposed two spaced-apart editing cards, the editing desk 300 detects this superposing movement, so that edit data for video effects, such as wiping two clips in real time, can be generated.

To implement this, it may be configured to arrange Hall elements in a matrix form on the editing surface 301, move the editing cards 200 (each incorporating a magnet therein) thereover, calculate their moving directions, velocities, and accelerations from changes in the voltages of the Hall elements by using application software of the editing machine, and utilize the calculated values for video effects.

Alternatively, by turning an editing card 200 upside down and detecting this movement, the detected movement may be applied to give reversal effects.

While a single editing card 200 (or editing book 1) represents a single clip in the embodiment, unit video represented by the editing card 200 (or editing book 1) is not limited to the so-called "clip".

For example, a plurality of clips which have been join-edited may be handled as single unit video, and downloaded to the editing card 200 (or editing book 1).

For example, when composing video content for a single broadcasting program of a first part, a second part, many advertisement video, and the like, first, an operator downloads many clips to editing cards 200, edits the first part on the editing desk 300, then, downloads many clips again to the editing cards 200, and edits the second part on the editing desk 300.

Thereafter, the operator downloads video in the first part and video in the second part to two editing cards 200 as two unit video items, further, downloads advertisement video items to other editing cards 200, respectively, and edits the downloaded video on the editing desk 300 using these editing cards 200, thereby producing the video content as the single broadcasting program.

That is, one may consider a video unit represented by a single editing card 200 (or editing book 1) as a series of video having a fixed time sequence.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-303050 filed in the Japanese Patent Office on Nov. 22, 2007, the entire content of which being incorporated herein by reference.

What is claimed is:

1. A unit video representing device comprising:
    an input section to input unit video information corresponding to a unit video which includes an animation;
    a display section;
    a control section to cause the display section to display a representation of contents of the unit video, on the basis of the unit video information inputted by the input section; and
    an identification information notifying section to cause an external editing console to recognize identification information identifying the unit video representing device when the unit video representing device is placed on the editing console.

2. The unit video representing device according to claim 1, wherein the unit video representing device is formed into a shape such that a plurality of unit video representing devices are piled.

3. The unit video representing device according to claim 2, further comprising:
    a piling position detecting section to detect, in a pile of the plurality of unit video representing devices, where the unit video representing device is positioned, a detected position including lowermost, uppermost, or in between.

4. The unit video representing device according to claim 3, further comprising:
    an identification information up-down communication section to notify, in the pile of the plurality of unit video representing devices, the identification information identifying the unit video representing device to another unit video representing device in the pile.

5. The unit video representing device according to claim 4, wherein the identification information up-down communication section is formed as an optical communication device section.

6. The unit video representing device according to claim 2, wherein the unit video representing device is approximately rectangular-shaped.

7. The unit video representing device according to claim 2, wherein the unit video representing device is formed by binding a cover section having the display section and a plurality of sheets formed as flexible paper-like display devices along a spine, and having a book structure in which the sheet section form each page.

8. The unit video representing device according to claim 7, wherein
    the unit video information inputted by the input section includes frame image data forming the unit video, and
    the control section generates display image data for each sheet using the frame image data, and causes the each sheet section to execute still-image display based on the generated display image data.

9. The unit video representing device according to claim 8, wherein each of the sheets is formed of electronic paper which maintains the display even without power supply.

10. The unit video representing device according to claim 1, wherein
    the unit video information inputted by the input section includes an identification information of the unit video as the animation, and the identification information identifying the unit video representing device is the identification information of the unit video inputted by the input section.

11. The unit video representing device according to claim 1, wherein the identification information notifying section is formed as a noncontact wireless communication device section performing noncontact wireless communication with the editing console.

12. The unit video representing device according to claim 1, wherein
the unit video information inputted by the input section includes information about a starting point and an end point of the unit video as the animation, and
the control section causes the display section to display the information about the starting point and the end point of the unit video as the representation the contents of the unit video.

13. The unit video representing device according to claim 1, wherein the display section is formed of electronic paper which maintains the display even without power supply.

14. The unit video representing device according to claim 1, wherein the unit video information is an animated portion of the unit video.

15. An editing system including a plurality of unit video representing devices and an editing console, wherein
each of the unit video representing devices includes:
an input section to input unit video information about a unit video which includes an animation;
a display section;
a control section to cause the display section to display a representation of contents of the unit video, on the basis of the unit video information inputted by the input section; and
an identification information notifying section to cause the editing console to recognize identification information identifying the unit video representing device when the unit video representing device is placed on the editing console, and
the editing console includes:
an editing surface on which the plurality of unit video representing devices are arranged;
an arranging sequence detecting section to detect an arranging sequence of the plurality of unit video representing devices arranged on the editing surface; and
an edit information generating section to generate edit information in which a time sequence is set, on the basis of the arranging sequence detected by the arranging sequence detecting section.

* * * * *